United States Patent
Yang et al.

(10) Patent No.: US 8,574,311 B2
(45) Date of Patent: Nov. 5, 2013

(54) VERSATILE BIODEGRADABLE ELASTIC POLYMERS FEATURED WITH DUAL CROSSLINKING MECHANISM FOR BIOMEDICAL APPLICATIONS

(75) Inventors: Jian Yang, Arlington, TX (US); Dipendra R. Gyawali, Arlington, TX (US); Minh-Tuan R. Tran, Forth Worth, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 12/991,409

(22) PCT Filed: May 7, 2009

(86) PCT No.: PCT/US2009/043199
§ 371 (c)(1),
(2), (4) Date: Feb. 3, 2011

(87) PCT Pub. No.: WO2009/137715
PCT Pub. Date: Nov. 12, 2009

(65) Prior Publication Data
US 2011/0124765 A1      May 26, 2011

Related U.S. Application Data

(60) Provisional application No. 61/051,256, filed on May 7, 2008.

(51) Int. Cl.
*A61F 2/02* (2006.01)
(52) U.S. Cl.
USPC ........... 623/23.75; 522/87; 424/422; 424/423

(58) Field of Classification Search
USPC .................. 623/23.75; 522/87; 424/423, 422
See application file for complete search history.

(56) References Cited

U.S. PATENT DOCUMENTS

| | | | |
|---|---|---|---|
| 6,368,356 B1 | 4/2002 | Zhong et al. | |
| 6,380,294 B1 * | 4/2002 | Babinec et al. | 524/440 |
| 6,720,363 B2 * | 4/2004 | Subramonian et al. | 521/81 |
| 7,005,136 B2 * | 2/2006 | Nathan et al. | 424/423 |
| 2002/0006976 A1 * | 1/2002 | Subramonian et al. | 521/79 |
| 2002/0132905 A1 * | 9/2002 | Babinee et al. | 524/495 |
| 2003/0185871 A1 * | 10/2003 | Nathan et al. | 424/426 |

FOREIGN PATENT DOCUMENTS

| | | |
|---|---|---|
| KR | 20000040847 A | 7/2000 |
| KR | 20040054542 A | 6/2004 |

OTHER PUBLICATIONS

Atiyeh, Bishara S., et al., "New Technologies for Burn Wound Closure and Healing—Review of the Literature," Burns, (2005), 31:944-956.

Bajpai, S. K., "Swelling-Deswelling Behaviior of Poly(acrylamide-co-maleic acid) Hydrogels," Journal of Applied Polymer Science, (2001), vol. 80, pp. 2782-2789.

(Continued)

*Primary Examiner* — James J Seidleck
*Assistant Examiner* — Peter A Salamon
(74) *Attorney, Agent, or Firm* — John P. Zimmer; Smith Moore Leatherwood LLP

(57) ABSTRACT

The present invention provides a dual crosslinked biodegradable polymer and methods of making and using the polymer. The dual crosslinked biodegradable polymer composition includes a multifunctional monomer; a diol; and an unsaturated di-acid at least partially polymerized to form a network and photocrosslinked into a dual crosslinked polymer network.

20 Claims, 19 Drawing Sheets

(56) References Cited

OTHER PUBLICATIONS

Bashir, Rashid, "BioMEMS: State-of-the-Art in Detection, Opportunities and Prospects," Advanced Drug Delivery Reviews, (2004), 56:1565-1586.

Bettinger, Christopher J., et al., "Microfabrication of Poly (Glycerol-sebacate) for Contact Guidance Applications," Biomaterials, (2006), 27:2558-2565.

Boyce, S.T., "Design Principles for Composition and Performance of Cultured Skin Substitutes," Annals of Burns and Fire Disasters, (Dec. 2002), vol. XV, No. 4, 2 pages.

Breunig, M., et al., "Polymers and Nanoparticles: Intelligent Tools for Intracellular Targeting?" European Journal of Pharmaceutics and Biopharmaceutics, (2008), 68:112-128.

Bryant, Stephanie J., et al., "Crosslinking Density Influences Chondrocyte Metabolism in Dynamically Loaded Photocrosslinked Poly(ethylene glycol) Hydrogels," Annals of Biomedical Engineering, Mar. 2004, vol. 32, No. 3, pp. 407-417.

Chun, Ki Woo, et al., "Controlled Release of Plasmid DNA from Photo-Cross-Linked Pluronic Hydrogels," Biomaterials, (2005), 26:3319-3326.

Cook, Alonzo D., et al., "Characterization and Development of RGD-Peptide-Modified Poly(Lactic Acid-co-Lysine) as an Interactive, Resorbable Biomaterial," Journal of Biomedical Research, (1997), vol. 35, pp. 513-523.

Dey, Jagannath, et al., "Development of Biodegradable Crosslinked Urethane-Doped Polyester Elastomers," Biomaterials, Dec. 2008, 29(35): 4637-4649.

Ding, Tao, et al., "Synthesis Characterization and in vitro Degradation Study of a Novel and Rapidly Degradable Elastomer," Polymer Degradable Elastomer, Polymer Degradation and Stability, (2006), 91:733-739.

Eisenbud, David, et al., "Skin Substitutes and Wound Healing: Current Status and Challenges," Wounds: A Compendium of Clinical Research and Practice, Jan. 2004, vol. 16, No. 1, pp. 3-17.

Elisseeff, J., et al., "Photoencapsulation of Chondrocytes in Poly(ethylene oxide)-Based Semi-Interpenetrating Networks," Photoencapsulation of Chondrocytes, (2000), 51:164-171.

Fisher, John P., et al., "Photoinitiated Cross-Linking of the Biodegradable Polyester Poly(propylene fumarate). Part II. In Vitro Degradation.,"Biomacromolecules, (2003), 4:1335-1342.

Glawe, John D., et al., "Influence of Channel Width on Alignment of Smooth Muscle Cells by High-Aspect-Ratio Microfabricated Elastomeric Cell Culture Scaffolds," J. Biomed. Mater Res., (2005), 75A:106-114.

Guan, Jianjun, et al., "Biodegradable Poly(ether ester urethane)urea Elastomers Based on Poly(ether ester) Triblock Copolymers and Putrescine: Synthesis, Characterization and Cytocompatibility," Biomaterials, (2004) 25:85-96.

He, Chaoliang, et al., "In Situ Gelling Stimuli-Sensitive Block Copolymer Hydrogels for Drug Delivery," Journal of Controlled Release, (2008), 127:189-207.

Jo, Seongbong, et al., "Synthesis and Characterization of Oligo(poly(ethylene glycol) Fumarate) Macromer," Macromolecules, (2001), 34:2839-2844.

Kesim, Hande, et al., "Functional Bioengineering Copolymers. II. Synthesis and Characterization of Amphiphilic Poly (N-Isopropyl acrylamide-c0-maleic anhydride) and its Macrobranched Derivatives," Polymer, (2003), 4:2897-2909.

Kim, Sin-Hee, et al., "Synthesis and Characterization of Dextran-Maleic Acid Based Hydrogel," J. Biomed. Mater. Res, (1999), 46:160-170.

Kretlow, James D., et al., "Injectable Matrices and Scaffolds for Drug Delivery in Tissue Engineering," Advanced Drug Delivery Reviews, (2007), 59:263-273.

Levental, Ilya, et al., "Soft Biological Materials and Their Impact on Cell Function," Soft Matter, (2006), 2:1-9.

Liu, Xiaohua, et al., "Surface Modification of Interconnected Porous Scaffolds," Biomed Mater Res A,. (2005), 74(1):84-91.

Martens, P., et al., "Characterization of Hydrogels Formed from Acrylate Modified Poly(vinyl alcohol) Macromers," Polymer, (2000), 41:7715-7722.

Metters, A.T., et al., "Fundamental Studies of a Novel, Biodegradable PEG-b-PLA Hydrogel," Polymer, (2000), 41:3993-4004.

Nijst, Christiaan L.E., et al., "Synthesis and Characterization of Photocurable Elastomers from Poly(glycerol-co-sebacate)," Biomacromolecules, Oct. 2007, 8(10):3067-3073.

Nitschke, Mirko, et al., "Low Pressure Plasma Treatment of Poly (3-hydroxybutyrate): Toward Tailored Polymer Surfaces for Tissue Engineering Scaffolds," J Biomed Mater Res, (2002), 59(4): p. 632-638.

Nivasu, Venkata M., et al., "In Situ Polymerizable Polyethyleneglycol Containing Polyesterpolyol Acrylates for Tissue Sealant Applications," Biomaterials, (2004), 25:3283-3291.

Padmavathi, N. Ch., et al., "Structural Characteristics and Swelling Behavior of Poly(ethylene glycol) Diacrylate Hydrogels," Macrocolecules, (1996), 29:1976-1979.

Pfister, Pascal M., et al., "Surface-Textured PEG-Based Hydrogels with Adjustable Elasticity: Synthesis and Characterization," Biomaterials, (2007), 28:567-575.

Ratner Buddy D., et al., "Biomaterials: Where We Have Been and Where We Are Going," Annu. Rev. Biomed. Eng., (2004), 6:41-75.

Sawhney, Amarpreet S., et al., "Optimization of Photopolymerized Bioerodible Hydrogel Properties for Adhesion Prevention," Journal of Biomedical Materials Research, (1994), vol. 28, pp. 831-838.

Sen, Murat, et al., "Determination of Average Molecular Weight Between Cross-Links (MC) From Swelling Behaviours of Diprotic Acid-Containing Hydrogels," Polymer, (1999), 40, pp. 2969-2974.

Shi, Peng-Jie, et al., "Block and Star Block Copolymers by Mechanism Transformation X. Synthesis of Poly(ethylene oxide) Methyl Ether/Polystyrene/poly(L-lactide) ABC Miktoarm Star Copolymers by Combination of RAFT and ROP," European Polymer Journal, (2004), 40:1283-1290.

Tanodekaew, Siriporn, et al., "Xylan/Polyvinyl Alcohol Blend and Its Performance as Hydrogel," Journal of Applied Polymer Science, (2006), vol. 100, pp. 1914-1918.

Timmer, Mark D., et al., "Evaluation of Thermal-and Photo-Crosslinked Biodegradable Poly(Propylene Fumarate)-Based Networks," J Biomed Mater Res A, (2003), 66(4): p. 811-8.

Timmer, Mark D., et al., "In Vitro Degradation of Polymeric Networks of Poly(propylene Fumarate) and the Crosslinking Macromer Poly(propylene fumarate)-Diacrylate," Biomaterials, (2003), 24:571-577.

Wang, Yadong, et al., "A Tough Biodegradable Elastomer," Nature Biotechnology, Jun. 2002, vol. 20, pp. 602-606.

Yang, Jian, et al., "Synthesis and Evaluation of Poly(diol citrate) Biodegradagle Elastomers," Biomaterials, (2006), 27:1889-1898.

Yang, Jian, et al "Modulating Expanded Polytetrafluoroethylene Vascular Graft Host Response via Citric Acid-Based Biodegradagble Elastomers," Adv. Mater., (2006), 18:1493-1498.

Yang, Jian, et al., "Novel Citric Acid-Based Biodegradable Elastomers for Tissue Engineering," Adv. Mater., (Mar. 18, 2004), vol. 16, No. 6, pp. 511-516.

Yang, Jian, et al., "Plasma-Treated, Collagen-Anchored Polylactone: Its Cell Affinity Evaluation Under Shear or Shear-Free Conditions,", J Biomed Mater Res A, (2003), 67(4):1139-1147.

Ye, Peng, et al., "Adsorption and Activity of Lipase from Candida Rugosa on the Chitosam-Modified Poly(acrylonitrile-co-maleic acid) Membrane Surface," Colloids and Surfaces B: Biointerfaces, (2007), 60:62-67.

Zhu, Wen, et al., "Synthesis and Characterization of a Redox-Initiated, Injectable, Biodegradable Hydrogel," Journal of Applied Polymer Science, (2006), vol. 99, pp. 2375-2383.

International Search Report and Written Opinion for PCT/US2009/043199. dated Dec. 24, 2009, 11 pages.

* cited by examiner

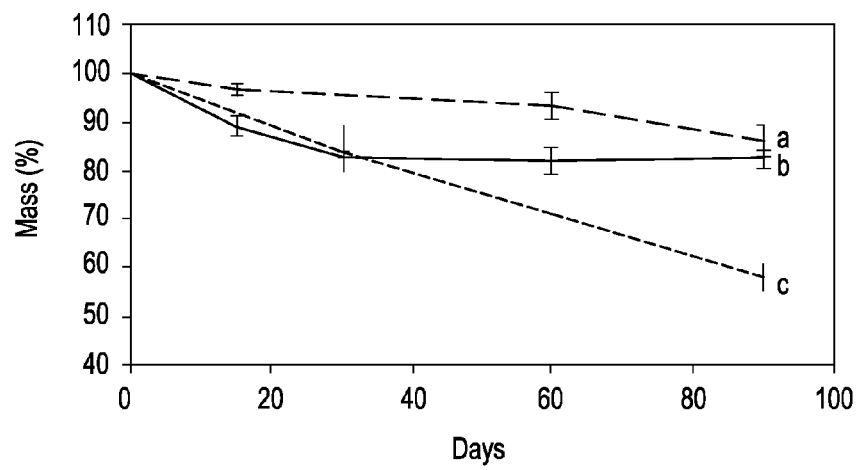
FIG. 18
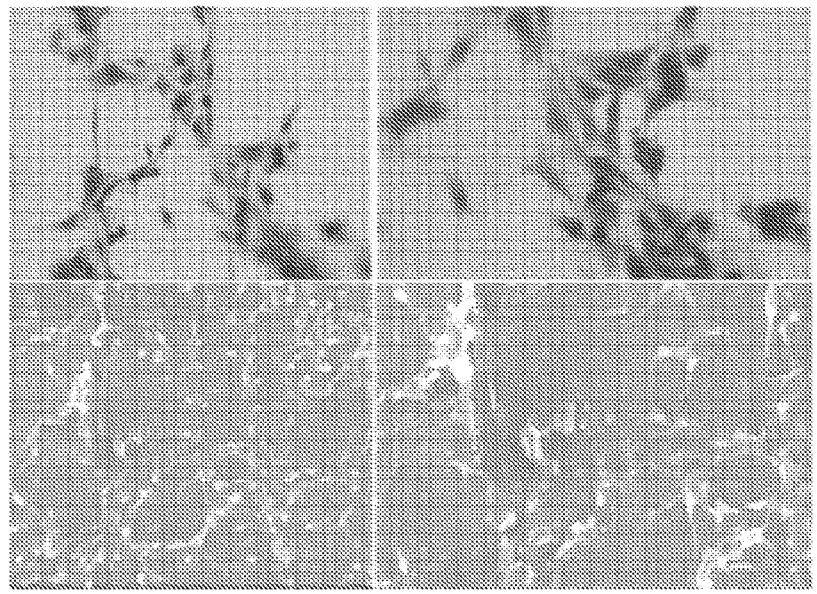
FIG. 19A
FIG. 19B
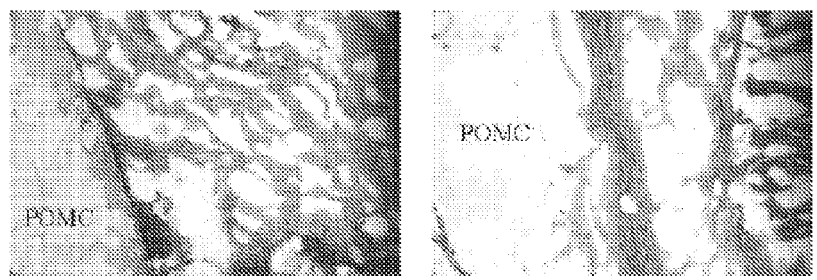
FIG. 20

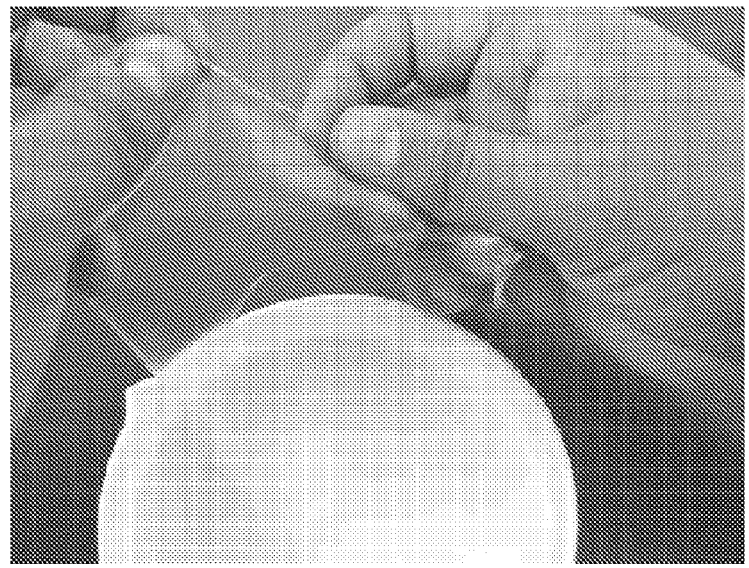
FIG. 26
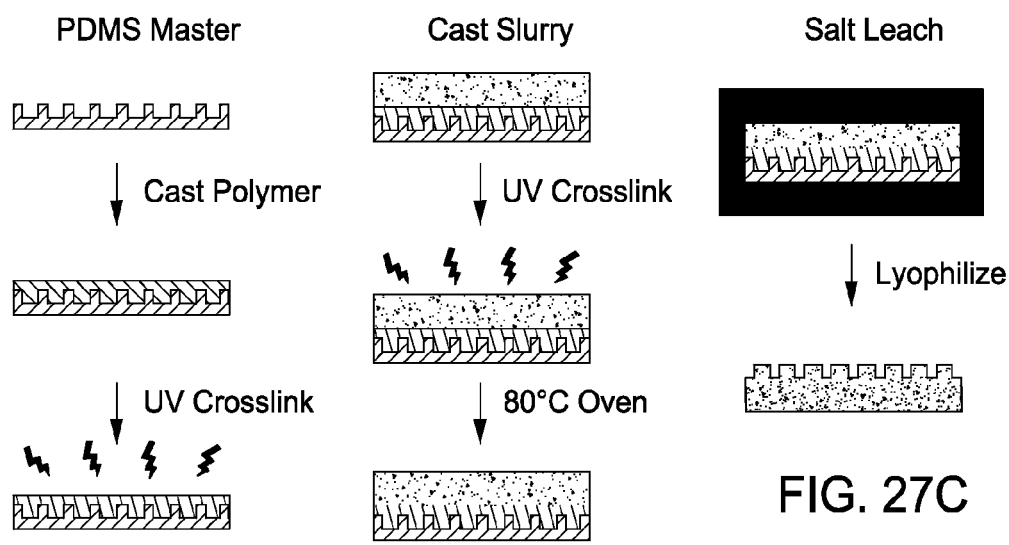
FIG. 27A
FIG. 27B
FIG. 27C

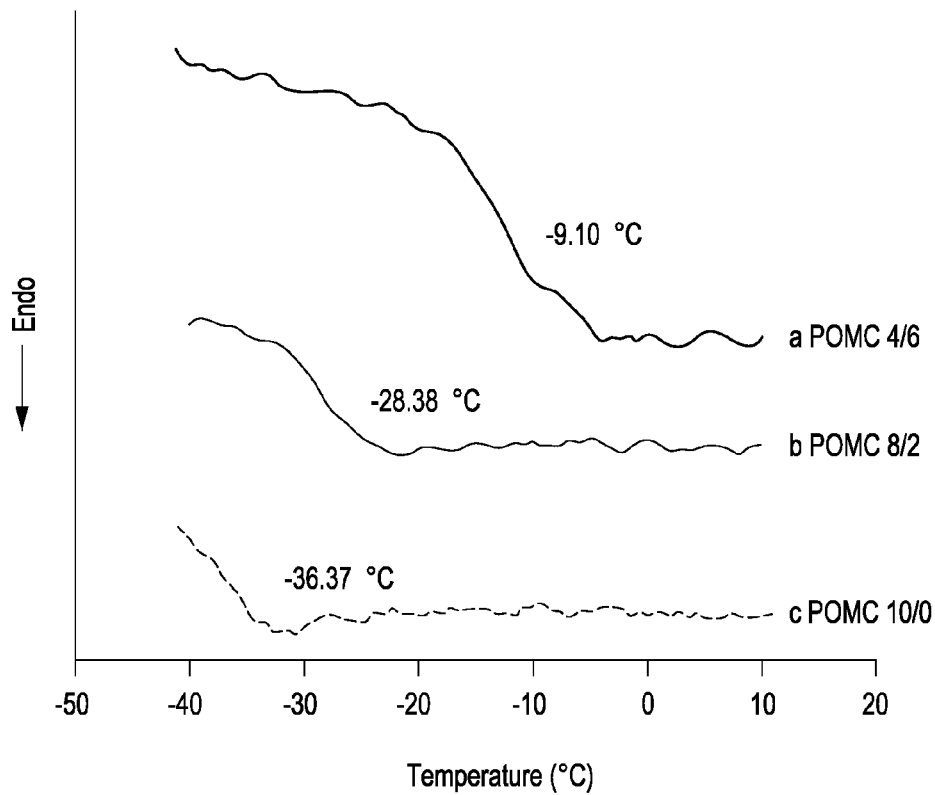
FIG. 32
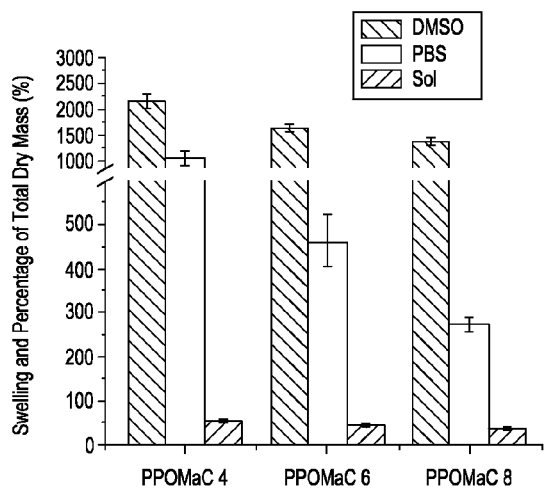 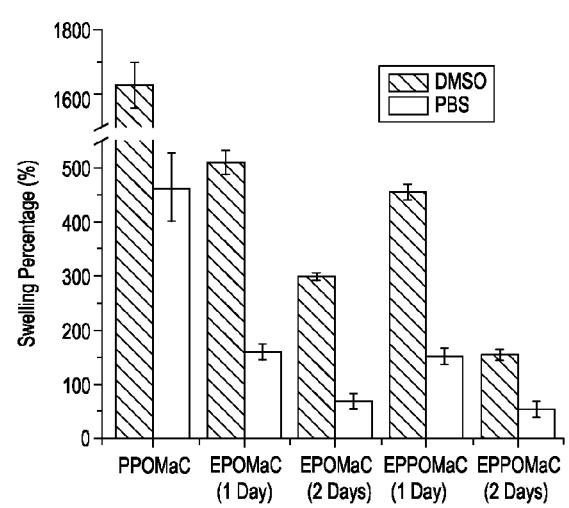
FIG. 33A          FIG. 33B

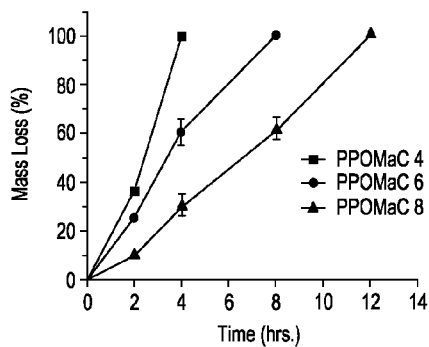
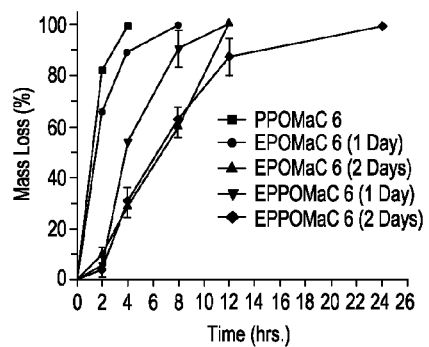
FIG. 36A  FIG. 36B
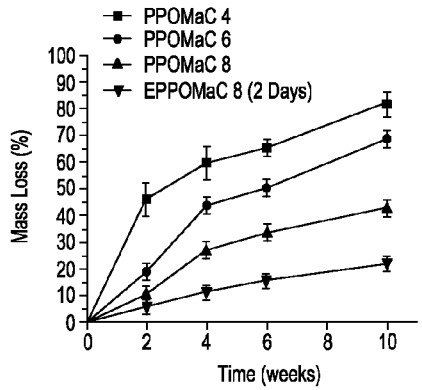
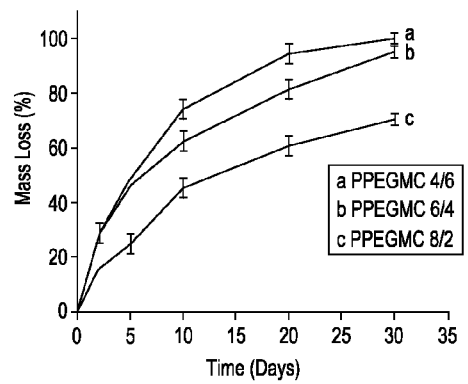
FIG. 36C  FIG. 36D
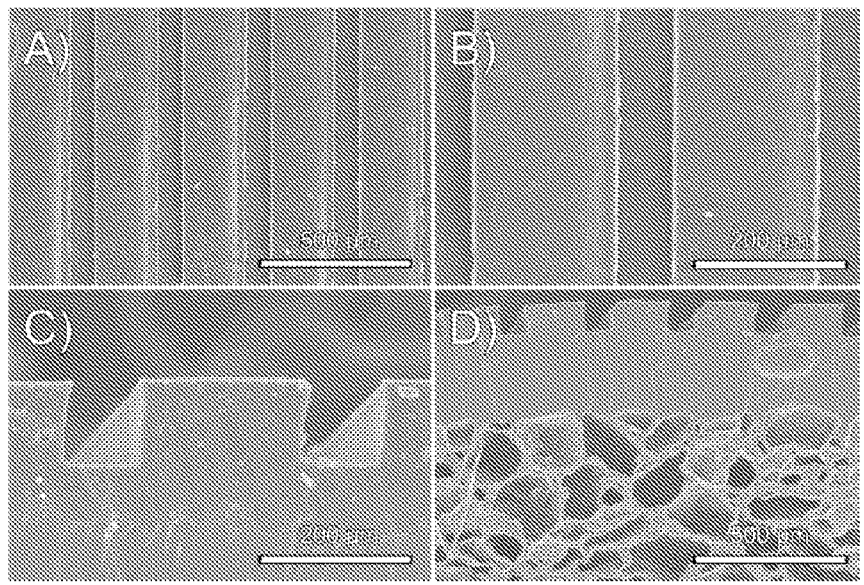
FIG. 37

VERSATILE BIODEGRADABLE ELASTIC POLYMERS FEATURED WITH DUAL CROSSLINKING MECHANISM FOR BIOMEDICAL APPLICATIONS

FIELD OF INVENTION

The present invention relates in general to the field of biodegradable elastic polymers with dual crosslinking mechanism for biomedical applications.

BACKGROUND ART

It is estimated that about 70,000 people each year suffer serious burns in the United States. The prevalence of venous leg ulcers is between 600,000 and 1,500,000. 10 to 20% of people with diabetes eventually suffer a chronic foot wound. In US, the direct cost of wound dressing is estimated more than $5 billion per year [17]. A significant number of soldiers are evacuated from battlefield because of severe burn injuries. Skin wounds are less severe than the large burns but can potentially result in the temporary loss of soldiers from their unit. Current skin grafts in the hospital include the limited available autografts and costly tissue-engineered grafts (AP-LIGRAF®, DERMAGRAFT®).

In the past decades, extensive research has been made in the field of in situ crosslinkable materials. The use of these materials is not only limited to the formation of hydrogels [1], thin films, scaffolds [2, 3], and nanoparticles, but also used as fluid sealants [4, 5], post-surgical adhesives [6], cell and biomolecules encapsulation [3, 7], localized drug delivery [8], gene delivery [9], and sutures [10]. The phenomenon of in situ polymerization can be initiated by the means of redox initiators or photo initiators in presence of electromagnetic wave of various wave lengths from gamma rays to ultraviolet rays. These materials show great promise in the field of drug delivery and tissue engineering.

There is an increasing need for suitable biomaterials to address unmet clinical problems. Biodegradable polymers have been long recognized for their uses in tissue engineering and drug delivery applications. However, current FDA approved biodegradable polymers such as Poly(L-lactide) (PLLA) and its copolymers cannot meet all the needs for tissue engineering and regenerative medicine. For example, the stiff PLLA is incompliant with soft tissues such as blood vessels, bladders, and cardiac tissues. Therefore, there is an increasing need for a soft, elastic, and degradable polymer that can be used for such applications.

SUMMARY OF THE INVENTION

The present invention describes, a new family of biodegradable polymers referred to as poly(alkylene maleate citrates) (PAMCs) that has been created with many advantages over the current materials. The novelties of this invention disclosure are: A) It is the first time biodegradable elastomeric polymers featured with a dual-crosslinking mechanism: carbon-carbon crosslinking via Ultraviolet (UV) photopolymerization and ester-bond crosslinking via polycondensation have been developed. It should be considered as a new contribution to the biomaterial science; B) Utilizing the dual-crosslinking mechanism, one can fine tune the mechanical properties, degradability and functionalities of the polymer to meet the versatile needs of tissue engineering and drug delivery. One of the major advantages of PAMCs is that after crosslinking via radical polymerization initiated by UV initiator or Redox initiator, the polymer remains saturated with functional groups (—COOH, —OH), which can be used for further ester-bond crosslinking via polycondensation or bioconjugation. The mechanical properties, degradation rate, and functionality can be balanced by controlling the secondary crosslinking (ester bond crosslinking) reaction and bioconjugation reaction. Thus, PAMCs can be treated as platform biomaterials for various application as needed; C) PAMC pre-polymers can be water soluble or solvent soluble thus expanding their applications in many ways; UV crosslinking is a mild polymerization process which would allow for in situ polymerization. Thus PAMCs can potentially be used as injectable scaffolds for in situ tissue engineering. It will also allow for an unharmful process thus rendering it useful for potential drug encapsulation applications, especially helpful when sensitive proteins are encapsulated in the polymers; For examples, drugs can be mixed with PAMC prepolymers and then encapsulated into the in situ formed micro or nanoparticles under UV crosslinking reactions in aqueous solutions; D) All the monomers for polymer synthesis are inexpensive and non-toxic monomers; E) Carbon-carbon crosslinking can help maintain the wet mechanical properties for the polymers, which is very important when the biomaterials are used in a wet environment such as in vivo, unlike many other reported elastomers such poly(diol citrates) and poly(glycerol sebacates) which lose their mechanical strength significantly in a wet environment. This should be a critical significance in using such biomaterials to fabricate the temporary scaffolds for tissue engineering applications which require the scaffold should possess certain mechanical strength before new tissue formation. Hydrolyzable ester bonds are introduced into the polymer backbone to confer the degradability to the polymers. F) The synthesis of this new family of polymers is simple, cost-effective, and can be precisely controlled without the use of any toxic chemicals. G) PAMC pre-polymers can be water soluble or solvent soluble thus expanding their applications in many ways; H) Due to the low molecular weight pre-polymers, PAMC prepolymers can be utilized without the addition of any solvent system as required by the specific application; I) Free radical polymerization is a mild crosslinking process which would allow for in situ applications. Thus PAMCs can potentially be used as injectable scaffolds for in situ tissue engineering. This crosslinking method would also allow for the avoidance of any harsh processing conditions rendering it useful for the potential encapsulation of sensitive proteins or drugs. For example, drugs can be mixed with PAMC pre-polymers and then encapsulated into the in situ formed micro or nanoparticles under free radical crosslinking reactions in aqueous solutions; J) Hydrolyzable ester bonds are introduced into the polymer backbone to confer the degradability to the polymers. Tissue engineered scaffolds made of PAMCs are soft, elastic, display excellent biocompatibility, and are able to retain their mechanical properties when hydrated. PAMCs would trigger minimal mechanical irritation to the surrounding tissues when implanted in the body. Mechanical cues can be transmitted easily to cells seeded on this type of soft and elastic material. The degradation rates and mechanical properties of PAMCs can be controlled by varying the combination of the monomers used during synthesis, and by the polymerization conditions under the dual crosslinking mechanism. Complex tissue grafts can be created by using this new family of polymers to create soft, elastic, and thin scaffold sheets to stack them through a layer-by-layer scaffold sheet engineering strategy. The potential applications of this novel family of polymers can be, but are not limited to tissue-engineering blood vessels, cardiac tissues, heart valves, orthopedic applications, skin, bladder, cell encapsulation, and drug delivery. PAMCs can quickly form a soft and elastic film on the skin via radical polymerization initiated by UV initiators or redox initiators. The soft and elastic PAMC films can be quickly-peeled off without sacrificing their integrity. Thus PAMCs can also be used as a compliant wound dressing material with a great convenience for uses in the battle field.

The present invention provides a dual crosslinked biodegradable polymer composition having a multifunctional monomer; a diol; and an unsaturated di-acid at least partially polymerized to form a network and photocrosslinked into a dual crosslinked polymer network. The multifunctional monomer includes citric acid, the diol comprises poly(ethylene glycol) and the unsaturated diacid comprises maleic anhydride. The multifunctional monomer is end capped with a vinyl group from acroylchloride. The network may be crosslinked by polycondensation or free radical polymerization and one or more crosslinkers may be optionally added.

The present invention also includes a method of making a dual crosslinked biodegradable tissue composition by forming a tissue engineering scaffold; adding a pre-polymer mixture to the tissue engineering scaffold, wherein the a pre-polymer mixture comprises a multifunctional monomer; a diol; and an unsaturated diacid; photocrosslinking at least a portion of the pre-polymer mixture to form a partially photocrosslinked network; polymerizing the partially photocrosslinked network to form a dual crosslinked polymer network to form a dual crosslinked biodegradable tissue. The tissue engineering scaffold forms a blood vessel, a cardiac tissue, heart valves, a ligament, a tendon, a lung, a bladder, skin, a trachea, a urethral, micro-fibers or nano-fibers.

The present invention provides a method of making a dual crosslinked biodegradable polymer composition by forming a pre-polymer mixture comprising a multifunctional monomer; a diol; and an unsaturated diacid; photocrosslinking at least a portion of the pre-polymer mixture to form a partially photocrosslinked network; and polymerizing the partially photocrosslinked network to form a dual crosslinked polymer network.

BRIEF DESCRIPTION OF THE DRAWINGS

Further benefits and advantages of the present invention will become more apparent from the following description of various embodiments that are given by way of example with reference to the accompanying drawings:

FIG. 18 is a graph of the effects of different PPOMC monomer ratios on the degradation rate in PBS (pH 7.4) at 37° C. where a) 1.0 POMC, b) 0.8 POMC, c) 0.6 POMC.

FIG. 19a is an image of a H&E staining of mouse SMCs on PPOMC 0.8 film and FIG. 19b is a SEM picture of mouse 3T3 cells on PPOMC 0.8 film.

FIG. 20 is an image of a foreign body response of POMC implanted subcutaneously in Sprague-Dawley rats. Impants and surrounding tissues were harvested after (FIG. 20a) 1 week; and (FIG. 20b) 4 weeks implantation for H&E staining.

FIG. 26 is an image of UV crosslinked PPOMC film.

FIG. 27a is a schematic representation of the microchannel fabrication process. FIG. 27b is a schematic representation of the scaffold addition process. FIG. 27c is a schematic following post-polymerization.

FIG. 32 is a DSC thermograph.

FIG. 33a is a graph of the degree of swelling and sol content as a function of the ratio of maleic anhydride in pre-POMaC. FIG. 33b is a graph of the degree of swelling in solvent and PBS as a function of the dual crosslinking mechanism.

FIG. 36a is a plot of the In vitro degradation in 0.05 M NaOH as a function of the ratio of maleic anhydride in pre-POMaC. FIG. 36b is a plot of the In vitro degradation in 0.05 M NaOH as a function of the dual crosslinking mechanism. FIG. 36c is a plot of the In vitro degradation of POMaC networks in PBS (pH 7.4; 37° C.). FIG. 36d is a plot of the In vitro degradation of PPEGMC networks in PBS (pH 7.4; 37° C.).

FIG. 37 is a representative SEM image of the PPOMaC microchannel negatives produced from PDMS molds.

DESCRIPTION OF THE INVENTION

Figure 1:
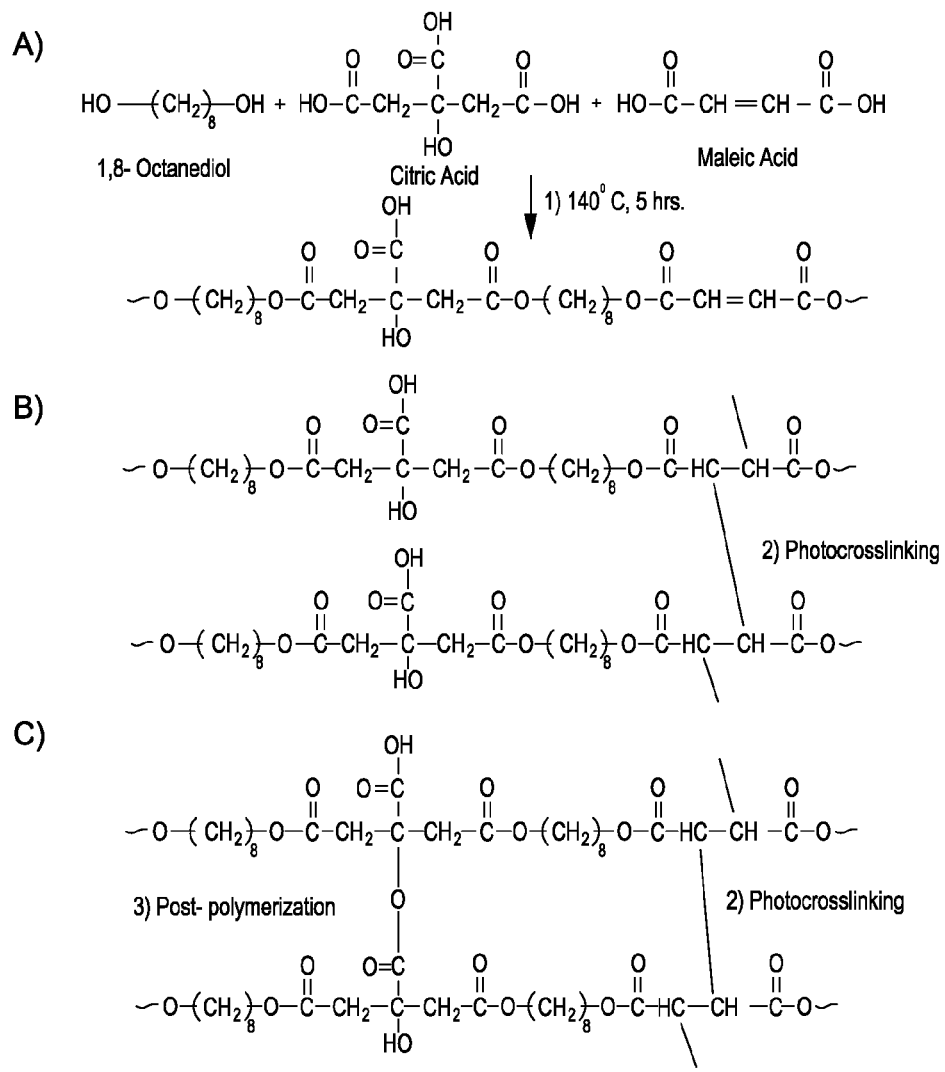
FIG. 1A is a representative schematic of the synthesis of pre-POMC.
FIG. 1B is a representative schematic of the photocrosslinking with available hydroxyl and carboxylic functional groups shown.
FIG. 1C is a representative schematic of POMC with further post-polymerization through the ester-bond crosslinking.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

In the context of tissue engineering, several hydrogel materials have been investigated in order to achieve good biocompatibility, tunable biodegradability and mechanical properties, and easy processability. Examples of these materials include acrylated sebacic acid based poly(glycerol sebacate) Acrylate (PGSA) [2], fumaric acid based poly(propylene fumarate) (PPF) [1], acrylated ethylene glycol based Poly (ethylene glycol) dimethacrylate (PEGDM) [11]. PGSA shows tunable wet mechanical properties depending on the degree of acrylation. However, the synthesis of PGS has to be carried out under harsh conditions (high temperature and high vacuum). Also, there are lack of available functional groups on the backbone of PGSA for further bioconjugation.

Similarly, extensive work has been done with the polymer PPF. This polymer shows a great promise in orthopedic applications with ability to photo crosslink or chemically crosslink using redox initiator. However, the polymer needs to be subjected to ultraviolet light for as long as one hour to achieve crosslinking.[1] The long photo crosslinking time makes the use of polymers inconvenient. Apart from this, suitable biomaterials should allow cell to attach, proliferate, and differentiate [12]. In order to fulfill the goal of tissue regeneration, surface modification of the synthetic scaffold often needs to be performed to improve its biocompatibility. Different approaches have been adopted to modify the polymeric biomaterials such as bulk chemical modification [13], surface modification (plasma treatment) [14], and molecule entrapment [15]. Werner and co-workers showed the use of low pressure ammonia plasma treatment for the modification of poly(3-hydroxybutyrate) (PHB). This technique gained much interest in immobilizing proteins to hydrophobic surfaces. However, its use is limited for thin porous scaffold applications since the gaseous plasma treatment can only reach a certain depth of a 3-D porous scaffold. The conjugation efficiency was relatively low due the low number of functional groups available on the polymers.

Drug delivery systems have been appreciated for their high drug loading capacity, low systemic toxicity, and targeted delivery. For example, extensive research has been done on the nanoparticle drug delivery system due to their high drug loading capacity [16]. A good polymeric system should be non-toxic, and easy for further functionalization. The drug loading process should be mild or gentle without affecting the drug bioactivity, especially when some sensitive and expensive protein drugs such growth factors are loaded. However, current polymer based carriers such as PLA have limited available functional groups for further functionalization and the drug loading process always involves toxic solvent or hash conditions (rigorous stirring, sonicating etc) [16].

Despite the advances in burn care, the mortality rate of wound injuries continues to be high. It is highly significant in developing off-the-shelf, cost-effective skin grafts and wound dressing to treat the acute and chronic wounds which should impact both the military and the civilian healthcare. For wound treatment, an economical, easy to apply and peel off, compliant (soft and elastic), well-conformed to the anatomy and readily available dressing or method of coverage is applied to the wound, which can provide good pain relief, protect the wound from infection, promote healing, prevent heat and fluid loss, be elastic, compliant, and non-antigenic and adhere well to the wound while waiting for spontaneous epithelialization or skin grafts.[18, 19] This early wound closure applied to a wound can help to reduce pain associated with wound care, number of operations, and infective complications. However, none of current wound dressings/barriers or bandages can meet all the above requirements for wound treatment. A biocompatible, soft and elastic polymer may be considered as viable and compliant wound dressing material.

In order to meet the versatile needs for suitable biomaterials, our group has been motivated to design an appropriate polymeric biomaterial platform for various biomedical applications. The choice of monomer for polymer synthesis is very important since it may affect the biocompatibility, biodegradability, and the cell affinity of polymers to be synthesized. Monomers such as citric acid [20-22], fumaric acid [1] maleic acid [23-26], maleic anhydride [27], 1,8-octanediol [21, 22], and PEG [11, 28, 29], have been extensively used in the field of biomaterials. The monomers used in the current invention disclosure for synthesizing new biomaterials, PAMCs are: 1) citric acid is used as a key multifunctional monomer for PAMC synthesis, which can form crosslinking network with other difunctional monomers; Citric acid is a kreb cycle product, widely available, and already used in consumer products such as shampoo, skin products, food and beverages. The sodium form of citric acid has been used as an anti-coagulant in the hospital. 2) various unsaturated diacids or anhydrides such as fumaric acid, maleic acid, maleic anhydride; 3) various diols including saturated aliphatic diols such as C2-C12 diols and macrodiols such as poly(ethylene glycol) (PEG).

FIG. 1A is a representative schematic of the synthesis of pre-POMC. FIG. 1B is a representative schematic of the photocrosslinking with available hydroxyl and carboxylic functional groups shown. FIG. 1C is a representative schematic of POMC with further post-polymerization through the ester-bond crosslinking. PAMCs are synthesized by reacting citric acid, diol and unsaturated di-acid such as maleic acid to form a prepolymer. The prepolymer can be further crosslinked through photocrosslinking and/or polycondensation. (See FIG. 1).

The rational behind the biomaterial design are: 1) Finding clues from nature, the components of the extracellular matrix (ECM) such as collagen and elastin are crosslinked polymers and elastic within certain deformation. Thus, we chose crosslinking as a mechanism to confer elasticity to the biomaterials; 2) Due to the advantages of using inexpensive monomers and a cost-effective synthesis, we chose polycondensation for pre-polymer synthesis simply under heating without using any catalyst. Citric acid, maleic acid, various aliphatic diols, and macrodiols (Polyethylene oxide) are all inexpensive, commercially available, and have been used in many other biomaterial syntheses for tissue engineering uses. 3) The feeding ratio of the monomers, choices and combination of aliphatic and macro-diols, and polymerization degree can be varied to tune the mechanical and degradation properties and functionality of the resulting polymers. 4) The dual-crosslinking mechanism is the first time introduced for elastomer designs. Maleic acid introduces photocrosslinkable double bonds in the prepolymers. Citric acid is a multifunctional monomer with side —COOH and —OH. Photocrosslinking provides strong C—C crosslinking bond in the polymer network leaving the polymer rich in unreacted —COOH and —OH groups for further bioconjugation or polycondensation crosslinking through degradable ester bonds formed by —COOH and —OH.

We have previously developed ester-bond crosslinked biodegradable elastomers, poly(diol citrates), synthesized by reacting citric acid and various diols, which exhibit excellent biocompatibility and mechanical properties with potential for blood vessel tissue engineering. However, poly(diol citrates) scaffolds significantly lose mechanical properties in wet conditions, such as in vivo, due to the hydrophilicity of the weak crosslinking polymer network formed via ester bonds. We expect with additional strong C—C crosslinking bonds, our PAMCs network should exhibit excellent mechanical properties at both dry and wet conditions, while keeping all the benefits of poly(diol citrates). For ester-bond crosslinked poly(diol citrate), increasing crosslinking degree is at the price of sacrificing of available —COOH and —OH that may be used for potential conjugation. In PAMCs, the dual crosslinking mechanism allows one to balance the photocrosslinking and polycondensation to obtain polymers with a high crosslinking degree still rich in unreacted functional groups. Thus, PAMCs allow a wide control on the mechanical properties, degradation, and functionalities.

The material properties such as swelling, thermal behavior, mechanical properties, and degradation rate are dependent on polymer compositions, molecular weights, crosslinking degree etc. [30, 31]. It has been shown that for photocrosslinking reaction, the choice and concentration of the photoinitiator, the light intensity, and the amount and locations of reactive double bonds in the formulation also affect the rate of polymerization [32, 33]. This manuscript will show a detailed characterization on PAMCs to understand the polymers. PAMC polymers are platform biomaterials which should find their utilities in many biomedical applications. In this disclosure, we will demonstrate the potentials of PAMCs on their uses in tissue engineering, drug delivery and wound dressing applications. This disclosure describes a new type of biodegradable crosslinked polyester network family, which can be used as platform biomaterials for a variety of bioengineering applications.

Synthesis of pre-poly(alkylene maleate citrates) (PAMCs)
Synthesis of pre-Poly(Octamethylene maleate (acid) citrate) (POMC): The synthesis of POMCs can be achieved by the reaction represented in FIG. 1. Citric acid, 1,8-octanediol, and maleic acid were added into a 250 mL three necked round bottom flask, which was fitted with an inlet adapter and an outlet adapter. The mixture was melted within 20 minutes by stirring the contents in the flask, placing in a silicon oil bath maintained at a temperature of 160° C., and exposing to a flow of nitrogen gas. Once the constituents melted, the temperature of the oil bath was reduced to 140° C. and the reaction was allowed to progress for an additional 125 minutes under a nitrogen purge to create the pre-polymer. This prepolymer was dissolved in 1,4-dioxane, and precipitated in deionized water in order to remove any of the unreacted monomers and oligomers. In case of water soluble polymers, removal of the unreacted monomers and oligomers were done by dialyzing with a cut off molecular weight of 1000 Da membrane. Following the precipitation step, the polymer solution was freeze-dried to obtain pre-POMCs. To investigate the effects of the reactant ratio, five different molar ratios of citric acid to maleic acid were studied (0.0:1.0, 0.2:0.8, 0.4:0.6, 0.6:0.4, and 0.8:0.2) respectively. The ratio of acids over diols (representatively, 1,8-octanediol) for the reaction was kept as 1:1.

For the above pre-polymer synthesis, the diol choice can be varied (C2-C14 diols) to make a family of polymers with a wide range of properties. In addition to this, various molecular weight of PEG can also be used as the diol to confer the polymer's solubility in water. Other vinyl containing diacids including maleic anhydride, fumeric acid, itaconic acid, and allylmalonic acid can also be used to synthesize these polymers using a similar path as described above.

Synthesis of pre-Poly(Octamethylene maleate(anhydride) citrate) (POMaC): The synthesis of POMaCs can be achieved by conducting a controlled condensation reaction between citric acid, 1,8-octanediol, and maleic anhydride. The three monomers were added into a 250 ml three necked round bottom flask, which was fitted with an inlet adapter and an outlet adapter. The mixture was melted within 20 minutes by stirring the contents in the flask, placing in a silicon oil bath maintained at a temperature of 160° C., and exposing to a flow of nitrogen gas. Once the constituents melted, the temperature of the oil bath was reduced to 140° C. and the reaction was allowed to progress for an additional 125 minutes under a nitrogen purge to create the pre-polymer. This pre-polymer was dissolved in 1,4-dioxane, and precipitated in deionized water in order to remove any of the unreacted monomers and oligomers. Following the precipitation step, the polymer solution was freeze-dried to obtain pre-POMaCs.

Synthesis of pre-Poly(Octamethylene fumarate acid citrate) (POFC): The synthesis of POFCs can be achieved through two distinct steps. Step 1: Citric acid and 1,8-octanediol were added in a molar ratio of 1.0:1.1 to a 250 mL three neck round bottom flask, which was fitted with an inlet adapter and an outlet adapter. The mixture was melted within 20 minutes by stirring the contents in the flask, placing in a silicon oil bath maintained at a temperature of 160° C., and exposing to a flow of nitrogen gas. Once the constituents melted, the temperature of the oil bath was reduced to 140° C., and the reaction was allowed to progress for another 75 minutes under a nitrogen purge to create the pre-polymer. This prepolymer was dissolved in 1,4-dioxane, and precipitated in deionized water in order to remove any of the unreacted monomers and oligomers. Following the precipitation step, the polymer solution was freeze-dried.

Step 2: The freeze-dried pure polymer was dissolved in tetrahydrofuran (THF). The vinyl group was then introduced into the pre-polymer solution by adding fumaric acid (FA), N,N'-dicyclohexyl-carbodiimide (DCC), and 4-dimethylaminopyridine (DMAP) into the flask in a 1.0:1.5:1.5:0.29 molar ratio respectively. Once all the reactants were dissolved, the reaction was allowed to proceed for 48 hours. After the reaction was complete, the solution was filtered to remove the by-products formed during the reaction. After filtration, the polymer solution was then precipitated in deionized water in order to remove any unreacted monomers and oligomers. Following precipitation, the polymer solution was freeze-dried.

Synthesis of pre-Poly(poly(ethylene glycol)maleate citrate) (PPEGMC): The synthesis of PPEGMCs can be achieved by reacting poly(ethylene glycol) 200, citric acid, and maleic acid in a 0.1:0.02:0.08 molar ratios respectively. All three monomers were added in a 250 mL three neck round bottom flask, which was fitted with an inlet adapter and an outlet adapter. The mixture was melted within 20 minutes by stirring the contents in the flask, placing in a silicon oil bath maintained at a temperature of 160° C., and exposing to a flow of nitrogen gas. Once the constituents melted, the temperature of the oil bath was reduced to 130° C. and the reaction was allowed to progress for another 365 minutes under nitrogen purge to create the pre-polymer. The synthesized pre-polymer was purified using a dialysis tube with a cut off molecular weight of 1000 Da, and freeze-dried. The ratio between the citric acid and maleic acid investigated are 0.2:0.8 and 0.4:0.6 whereas PEG 200 and PEG 400 were used as diol.

For the above pre-polymer synthesis, we can vary the diols, such as C2-C14 diols to make a family of such polymers. The synthesis procedures for these polymers follow the similar path as described above. When the above pre-polymers are polymerized into crosslinked polymers via the following photocrosslinking, redoxinitiated crosslinking and/or ester-bond crosslinking through polycondensation, they are all referred to as PAMCs.

Photocrosslinking of POMC (PPOMC): The pre-polymer of POMC has been crosslinked by free radical polymerization. The purified pre-polymer was dissolved in dimethylsulfoxide (DMSO) to make a 50% polymer by weight concentration. To generate free radicals, the photo initiator (PI) 2-hydroxy-1-[4(hydroxyethoxy)phenyl]-2-methyl-1 propanone (Irgacure 2959) was dissolved in the polymer solvent solution. Next, the solution was poured into a Teflon mold and placed under a UVP 365 nm Long Wave Ultraviolet Lamp (Upland, Calif.) for 3 minutes.

Figure 2:
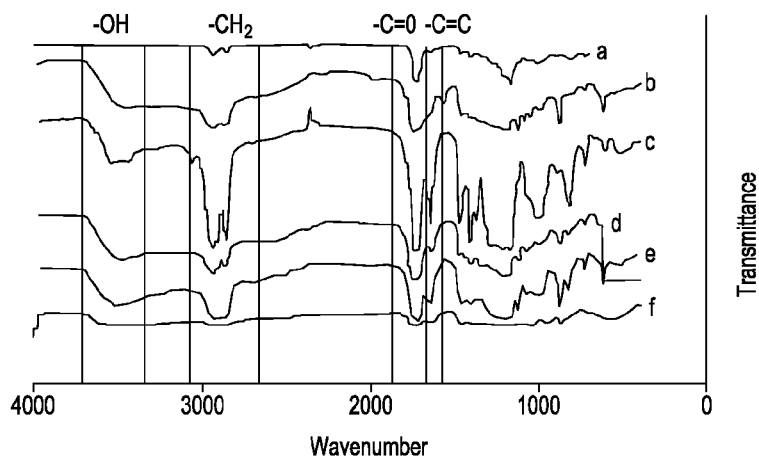
FIG. 2 is a graph of the FTIR transmittance spectra of PAMC pre-polymers where line (a) is Photopolymerized PPOMC; line (b) is POFC; line (c) is POMC; line (d) is POMaC; line (e) is POM; and line (f) is PPEGMC.

FIG. 2 is a graph of the FTIR transmittance spectra of PAMC pre-polymers where line (a) is Photopolymerized PPOMC; line (b) is POFC; line (c) is POMC; line (d) is POMaC; line (e) is POM; and line (f) is PPEGMC. The thermoset hydrogel achieved through this process is shown in FIG. 2. The hydrogel was placed in an excess amount of DMSO for forty-eight hours to remove any unreacted polymer, and was placed in water for twenty-four hours to exchange DMSO. Finally, the purified crosslinked polymer was freeze-dried for 3 days.

Redox-initiated Crosslinking of POMaC (RIPOMaC): In addition to the photocrosslinking method, the pre-polymer of POMaCs can also be crosslinked by a redox-initiated system. The purified pre-polymer was dissolved in dimethylsulfoxide (DMSO) to make a 50% polymer by weight concentration. To observe crosslinking, the redox initiator (RI) ammonium persulfate, and ascorbic acid was also dissolved in the polymer solvent solution. The solution was kept at 37° C. for 6 hours to achieve a thermoset hydrogel. The hydrogel was placed in an excess amount of DMSO for forty-eight hours to remove any unreacted polymer, and was placed in water for twenty-four hours to exchange DMSO. Finally, the purified crosslinked polymer was freeze-dried for 3 days.

Ester-bond crosslinking of PAMCs (EPAMCs): One of the advantages to this new family of polymers is that PAMCs offer a dual crosslinking mechanism. Following the photo-crosslinking or redox process, the polymer still contains many unreacted hydroxyl and carboxylic groups available for further post-polymerization via ester-bond formation, which allows for continued control over the mechanical properties of the polymer. The photocrosslinked polymer can be heated at a temperature range from 60-120° C. for times ranging from 7 hours to one week with or without vacuum in an oven to further crosslink the network. All the pre-PAMCs can be crosslinked directly via ester-bond crosslinking even without a pre-photocrosslinking. Thus, this dual-crosslinking mechanism offers a great flexibility to generate a family of PAMC polymers with wide controls on material properties.

Photocrosslinking of PAMC with additional alkene crosslinker Prepolymer of PAMCs can be crosslinked in presence of alkene crosslinkers such as acrylic acid, allylamine and 2-Propene-1-thiol. Basically, the purified prepolymer was dissolved in organic solvent or water to make a 20% polymer by weight concentration. Then pre-PAMC solution was mixed thoroughly with various amount of one or combination of the above crosslinkers. PI was then added to the polymer solution to initiate polymerization under UV light for less than 1 minute. The use of additional crosslinkers can significantly lower down the amount of initiators and UV exposure time.

Characterization of poly(alkylene maleate citrates) (PAMCs). Fourier Transform Infra Red Spectroscopy (FT-IR): To analyze the functional groups present in the pre-polymer, FT-IR spectroscopy measurements were recorded at room temperature using a Nicolet 6700 FT-IR (Thermo Scientific, Waltham, Mass.) for the POMC polymer. Pre-polymer samples were prepared by a solution-casting technique. Briefly, a 5% pre-polymer solution in 1,4-dioxane was placed on a potassium bromide crystal and dried overnight in a vacuum hood.

Proton Nuclear Magnetic Resonance (1H-NMR): A 1H NMR (250 MHz JNM ECS 300, JEOL, Tokyo, Japan) has analyzed the actual composition of the PAMC pre-polymers for all ratios. The pre-polymers were purified twice as mentioned above and then dissolved in dimethyl sulfoxide-d6 (DMSO-d6) to make a 3% pre-polymer solution and placed inside a 5-mm-outsidediameter tube. The chemical shifts for the 1H-NMR spectra were recorded in partsper-million (ppm), and were referenced relative to tetramethylsilane (TMS, 0.00 ppm) as the internal reference.

Differential Scanning calorimetry (DSC) and Thermogravimetric Analysis (TGA): The thermal behavior of the polymer of different ratios has been studied on a DSC550 (Instrument Specialists Inc., Spring Grove, Ill.) and TGA (Thermogravimetric Analysis, Mettler Toledo, Columbus, Ohio). For the DSC analysis, samples are first scanned up to 150° C. with a heating rate of 10° C./min under nitrogen purge (50 ml/min) to remove any trace water from the sample. Thereafter, the sample was cooled with a cooling rate of −40° C./min to −60° C. The sample was then scanned a second time up to 230° C. The glass transition temperature (Tg) is determined as the middle of the recorded step change in heat capacity from the second heating run. TGA thermograms have been observed under the flow of nitrogen gas (50 ml/min) at a scanning speed of 101° C./min in the range of 50-600° C. The decomposition temperature (Td) was defined as the temperature at which 10% weight loss of the samples occurred.

Tensile Mechanical Properties: Tensile mechanical properties have been studied according to the ASTM D412a standard on an MTS Insight II mechanical tester equipped with a 500 N load cell (MTS, Eden Prairie, Minn.). Crosslinked POMC films were cut using a dog-boneshaped (26 mm×4 mm×1.5 mm; length×width×thickness) aluminum die. The dog-bone-shaped films were then subjected to the stress of 500 N at a rate of 500 mm/min. Obtained values were converted to a stress-strain curve and the initial slope (0-20% of the curve) has been used to calculate the Young's modulus. A detailed study of the effect of different ratios of the monomers, the amount of PI, and concentration of the polymer in solvent on mechanical properties of the polymer were studied.

Swelling Properties: PAMC hydrogels have been fabricated according to the process mentioned above. In order to investigate the effect of the amount of PI on the swelling properties, different concentrations of Irgacure 2959 (1%, 2%, 3%, 4% and 5% by weight) have been used to photocrosslink the polymer. In order to observe the effect of polymer concentrations in solvent, different polymer concentrations (20%, 50% and 100% by weight) has been used in the study. DMSO was used as the swelling agent in this study due to its high boiling point, and deionized water was used to observe the water uptake of the polymer. Different ratios of the polymer have been used to study the swelling in phosphate buffered solution (PBS pH 7.4) at 37° C. with 2% of PI and 50% concentration of polymer in solvent. Six polymer discs (7 mm in diameter) were cut from the crosslinked films using a cork borer. The discs were allowed to swell in DMSO until the equilibrium state has been achieved (48 hours). The surface of the swollen discs was gently blotted with filter paper to remove any excess swelling agent, and the sample was then weighed (Mw). The discs were then placed in water to exchange the DMSO for twenty-four hours and freeze-dried for seventy-two hours. The samples were then weighed to determine the dry weight (Md). Equilibrium swelling ratio was calculated as (Mw−Md)/Md. The experiment was repeated three times and the average value was reported. Similarly, water uptake and swelling in PBS has been done using the same procedure.

Sol Gel Fraction: Six polymer discs (7 mm in diameter) were cut from the crosslinked films using a cork borer. The discs were weighed to find the initial mass (Mi), and suspended in DMSO for twenty-four hours. The DMSO was changed every six hours. Next, the gels were placed in water to exchange DMSO for twenty-four hours and freeze-dried for seventy-two hours. The dried samples, absent of unreacted polymer, were weighed to obtain (Md). The sol gel fraction was calculated as (Md−Mi/Mi)*100. The experiment was repeated three times and average value was reported.

PAMC Degradation: Six polymer discs (7 mm in diameter) were cut from crosslinked films using a cork borer. The discs were weighed to find the initial mass (Mi), and suspended in PBS (pH 7.4) and kept at 37° C. The pH was monitored regularly to maintain a constant pH. At the desired time point, the samples were rinsed with deionized water, freeze-dried, and weighed to find the remaining mass (Mt). Percent mass loss was calculated as [(Mi−Mt)/Mi]*100. In addition to PBS, an accelerated degradation study using 0.05M NaOH was also used to degrade the polymer films.

Biocompatibility of poly(alkylene maleate citrates) (PAMCs) In vitro cell culture: Six polymer discs (7 mm in diameter) were cut from crosslinked films using a cork borer. The discs were soaked in DMSO to remove the sol fraction, soaked in water to remove the DMSO, and freeze-dried. The discs were then sterilized in 100% ethanol for 30 minutes, and placed under UV light for another 30 minutes. The disks were seeded with 5,000 cells/cm2 (NIH 3T3 Fibroblasts). The cells were allowed to proliferate in DMEM culture media with 10% fetal bovine serum (FBS) for 3 days. The cells were then fixed in gluteraldehyde and H&E stained. Other samples were fixed in gluteraldehyde, freeze-dried, gold sputter coated, and viewed under a Hitachi S-3000N SEM (Hitachi, Pleasanton, Calif.).

Foreign body response: POMC disks (7 mm in diameter, 2 mm of thickness) were implanted in 7-week-old female Sprague-Dawley rats by blunt dissection under deep isoflurane-O2 general anesthesia. Animals were cared for in compliance with the regulations of the animal care and use committee of The University of Texas at Arlington. POMC samples were implanted symmetrically on the upper and lower back of the same animal. The rats were sacrificed and tissue samples surrounding the implants were harvested with intact implant at 1 week and 4 weeks. The samples were sectioned and stained with hematoxylin and eosin (H&E).

Nanoparticle Fabrication Dissolve the POMC prepolymer in acetone with the concentration of 5% (W/V). Drop the polymer solution dropwisely into the stirred DI water. Stir the mixture for 6 hours to let the solvent evaporate. Dynamic Laser scattering test was used to measure the size and size distribution of the nanoparticles. The Transmission electron microscope (TEM) was used to observed the morphology of the nanoparticle solution.

Scaffold Fabrication Sheet: Scaffold sheets were fabricated using 5×5 cm teflon molds. Representatively, the POMaC pre-polymer was dissolved in 1,4-dioxane to form a 30% solution. Sieved salt (106-150 microns) was added in a 1:9 pre-polymer:salt weight ratio to form a thick slurry, which was cast into the teflon mold. After solvent evaporation, the mold was placed under a UV lamp for 30 minutes, and then placed into an oven maintained at 80° C. for a period of 24 hours. The salt was removed by leaching in de-ionized water for a period of 72 hours with water changes at every 12 hours. The scaffolds obtained after leaching were freeze-dried for 48 hours to remove all traces of water. The scaffold was then freeze fractured using liquid nitrogen, and the cross section of the fractured sample was examined under a Hitachi S-3000N scanning electron microscope (Hitachi, Pleasanton, Calif.).

Data are expressed as the mean±standard deviation. Statistical analysis was performed using a one way-ANOVA with post hoc Neuman-Keuls testing to ensure statistically different groups. The swelling data, water uptake, PBS swelling, and mechanical properties of the polymer were compared with repeated measures of ANOVA. Data were taken to be significant, when a p-value of 0.05 or less was obtained.

PAMC synthesis: Equimolar amounts of the carboxylic acid and alcohol have been reacted in this experiment in order to achieve an ester-bond containing polymer backbone. This polycondensation reaction is driven forward by removal of water through the addition of heat. In order to prepare a linear pre-polymer of low molecular weight, the reaction has been subjected to heat for limited amount of time to achieve the desired viscosity. As tabulated in Table 1, nine different pre-polymers have been synthesized in this study. While conducting the reaction, as amount of citric acid increased, the reaction time decreased. This can also be explained with the concept of 1st and 2nd acid dissociation constant (pka) values of both acids. The 1st pka values of maleic acid and citric acid are 1.97 and 3.15 respectively, and the 2nd pka values are 6.07 and 4.77 respectively. As both of the acids need to take part in the reaction, the low 2nd pka value of the citric acid will become more reactive than the maleic acid.

TABLE 1

| Polymer Name | CA:MA:OD (moles) | Polymer Name | CA:MA:PEG (moles) |
|---|---|---|---|
| 1.0 POMC | 0.00:0.10:0.1 | PPEGMC2000.8 | 0.02:0.08:0.1 |
| 0.8 POMC | 0.02:0.08:0.1 | PPEGMC2000.6 | 0.04:0.06:0.1 |
| 0.6 POMC | 0.04:0.06:0.1 | PPEGMC4000.8 | 0.02:0.08:0.1 |
| 0.4 POMC | 0.06:0.04:0.1 | PPEGMC4000.6 | 0.04:0.06:0.1 |
| 0.2 POMC | 0.08:0.02:0.1 | | |

The solubility of pre-POMC is poor in water, where as pre-PPEGMC easily dissolves in water. This is due to the presence of the hydrophobic methyl groups in the pre-POMC where as pre-PPEGMC has hydrophilic PEG as part of the repeating units. By using different alcohols, the goal of synthesizing a water-soluble and a water-insoluble pre-polymer has been achieved by incorporating the vinyl groups of maleic acid into citric acid based polymers. Thus the water-solubility of pre-PPEGMC renders its capability as injectable materials for in situ tissue engineering and drug delivery.

It was observed that PAMCs can be crosslinked with or without crosslinker. However, the introduction of crosslinker decreases the polymerization time and amount of initiator uses significantly. Furthermore, various functional groups such as carboxylic acid, amine and thiol carrying crosslinkers can be used in order to introduce wide variety of functionality to the hydrogel. In biomedical applications, significantly reducing the amount of initiator uses can greatly lower down the concerns on the toxicity of initiators. Rapid polymerization of pre-PAMC would make it feasible to polymerize the PAMC in situ for in vivo use such as using PAMC as injectable cell carriers or forming a PAMC wound dressing/bandage on skin with various contours.

Fourier Transform Infra Red Spectroscopy (FT-IR): The purified pre-polymer was characterized by FT-IR as seen in FIG. 2. The peaks within 1690-1750 cm-1 suggest the presence of carbonyl (C=O) groups. The peaks centered at 2931 cm-1 are evidence of the methylene groups. The broad peaks centered at 3475 and 3215 cm-1 are indicators of the hydroxyl functional group. The peak observed at 1650 cm-1 shows the presence of the alkene group (C=C). As compared to the FTIR spectra of poly(1,8-octanediol citrate) reported by Yang et al,[21] which consists of citric acid and 1,8-octanediol precursors, an additional peak at 1650 cm-1 suggest that maleic acid has been incorporated in the chain of the pre-polymer. As seen in the FTIR spectrum of the photo-crosslinked POMC, the peak located at 1650 cm-1 has been significantly decreased due to the consumption of the double bond in the free radical polymerization. However, the peak within 1690-1750 cm-1 is evidence that the carboxylic acid group of the citric acid is still present in the UV crosslinked film.

Figure 3:
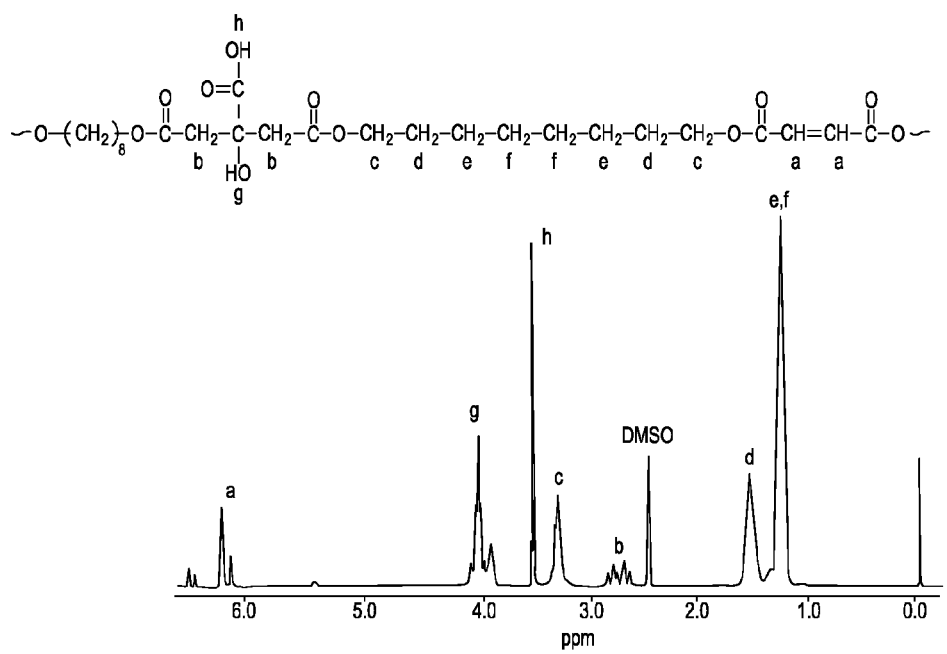
FIG. 3 is a 1H NMR report of POMC pre-polymer.

Proton Nuclear Magnetic Resonance (H-NMR): FIG. 3 is a 1H NMR report of POMC pre-polymer. A typical H-NMR spectrum of one of the ratios of the PAMC can be seen in FIG. 3. The peak located at 1.53 ppm is the characteristic peak of the 1,8-octanediol (d) represented by proton underlined in —O—CH$_2$CH$_2$—. The peak located at 2.79 ppm is the characteristic peak of the methyl group of the citric acid (b) represented by proton underline in —CH$_2$—. The peaks located between 6 and 7 ppm are characteristic peaks of proton in —CH=CH— incorporated into the chain. Compositions were calculated based on the integration of the area under characteristic proton peaks from each monomer, diol (d/4), CA (b/4), and MA (a/2). Copolymer compositions were calculated based on the integration ratio of characteristic proton peaks from each monomer. Monomer feed ratios and polymer compositions are listed in Table 2. These values are proof that the molar ratios can be accurately controlled during the synthesis of PAMCs.

TABLE 2

| Feeding Ratio MA:CA:OD | Composition MA:CA:OD |
|---|---|
| 0.5:0.0:0.5 | 0.43:0.0:0.44 |
| 0.4:0.1:0.5 | 0.38:0.12:0.51 |
| 0.3:0.2:0.5 | 0.29:0.21:0.49 |
| 0.2:0.3:0.5 | 0.19:0.32:0.49 |

Differential Scanning calorimetry (DSC) and Thermo-gravimetric Analysis (TGA): Thermal properties of the PAMCs were analyzed with the aid of DSC and TGA.

Figure 4:
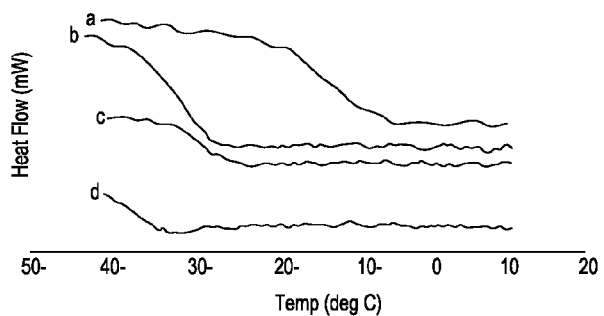
FIG. 4 is a DSC thermogram of PAMC pre-polymers, where line (a) is 0.4 POMC with Tg at −9.100 C; line (b) is 0.8 POMaC with Tg at −29.25 0 C; line (c) is 0.8 POMC with Tg at −28.38 0 C; and line (d) is 1.0 POMC with Tg at −36.370 C.

FIG. 4 is a DSC thermogram of PAMC pre-polymers, where line (a) is 0.4 POMC with Tg at −9.10 0C; line (b) is 0.8 POMaC with Tg at −29.25 0 C; line (c) is 0.8 POMC with Tg at −28.38 0 C; and line (d) is 1.0 POMC with Tg at −36.37 0 C. As seen in FIG. 4, the glass transition temperature (Tg) of all the prepolymers were below 0° C., which indicates that all the polymers are amorphous at room temperature and body temperature, the intended use temperature. The Tg of the polymer with lowest amount of maleic acid was high as −9.10° C. When the amount of maleic acid increased, the Tg has been shown to decrease. In the polymer containing 0.08 mol of maleic acid the Tg was −29.25° C., and the polymer with 0.10 mol of maleic acid had a Tg of −36.37° C. This phenomenon can be explained using the concept of stereochemistry of the polymers.

Figure 5:
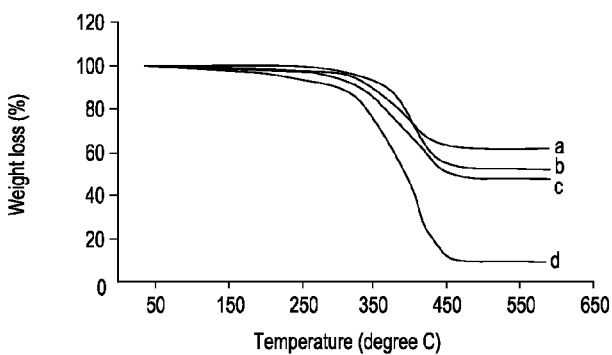
FIG. 5 is a TGA graph of PAMC pre-polymer where line (a) is 0.8 POMC; line (b) is 1.0 POMC; line (c) is 0.4 POMC; line (d) is 0.8 POMaC and line (e) composes 10% of the total mass at 344.04° C., 363.9° C., 310.74° C., 294.61° C.

The thermal stability of the POMC was analyzed by TGA. FIG. 5 is a TGA graph of PAMC pre-polymer where line (a) is 0.8 POMC; where line (b) is 1.0 POMC; where line (c) is 0.4 POMC; where line (d) is 0.8 POMaC decomposes 10% of the total mass at 344.04° C., 363.9° C., 310.74° C., 294.61° C. FIG. 5 shows the graph of decomposition of the pre-polymer as the temperature increased. As the amount of maleic acid decreased, the polymer gained more thermal stability. The pre-polymer containing 0.04 mol of maleic acid has 10% decomposition at 363.6° C. The polymer with 0.10 maleic acid content has a 10% decomposition at 310.74° C. This implies that as the amount of maleic acid content increases, the polymer loses its thermal stability. However, an interesting result has been observed when comparing between the 0.8 POMaC and 0.8 POMC. When the vinyl group containing monomer is switched from maleic acid to maleic anhydride, polymer loses its thermal stability significantly. As seen in FIG. 5, the 0.8 POMC decomposes 10% of its weight at the 344.04° C., whereas 0.8 POMaC lost 10% of its weight at 294.61° C.

higher molecular weight between crosslinks. Similarly, the crosslinking density is also decreased as the maleic acid content is decreased. Thus a wide range of mechanical properties can be obtained and controlled by adjusting the molar ratios, photoinitiator concentration, concentration of polymer in solvent, and post-polymerization. The mechanical properties of PAMCs can be tuned to match those of soft tissues such human bladder (tensile strength: 0.27±0.14 MPa; Modulus: 0.25±0.18 MPa)[34] and other soft tissues in the body. Thus, PAMCs should serve as good candidates for soft tissue engineering such as bladder tissue engineering.

Swelling properties: In order to understand the swelling behavior of the polymer, detailed studies on the effect of

TABLE 3

| Sample Name | Density (g/cm$^3$) | Young's Modulus (KPa) | Tensile Strength (MPa) | Elongation (%) | Crosslink Density (mol/m$^3$) | $M_c$ (g/mol) |
| --- | --- | --- | --- | --- | --- | --- |
| POMC 0.10 | 1.124 ± 0.0019 | 524.69 ± 100.39 | 0.292 ± 0.075 | 55.03 ± 19.62 | 71.27 | 15773.78 |
| POMC 0.08 | 1.119 ± 0.0027 | 1084.62 ± 148.12 | 0.88 ± 0.13 | 72.63.28 ± 7.74 | 147.33 | 7597.24 |
| POMC 0.06 | 1.090 ± .0029 | 278.94 ± 47.08 | 0.35 ± 0.062 | 169.50 ± 36.57 | 37.89 | 28775.62 |
| POMC 0.04 | 1.078 ± 0.0041 | 85.29 ± 36.93 | 0.37 ± 0.067 | 322.10 ± 57.95 | 11.59 | 93084.05 |

Tensile mechanical properties: To understand the elastic properties, tensile mechanical tests on polymer samples were performed. Table 3 shows that, the Young's modulus increased as the elongation decreased. However, the polymer without any citric acid shows a lower value for Young's modulus (524.69 KPa).

Figure 6:
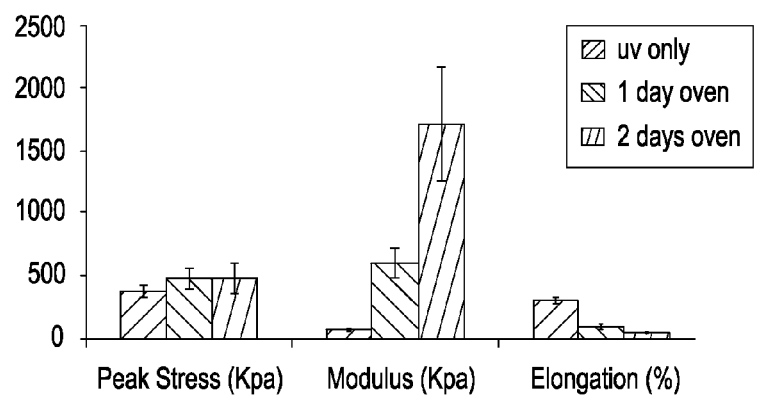
FIG. 6 is a graph of a comparison of the Young's modulus and elongation of PPOMC and EPOMC.

FIG. 6 is a graph of a comparison of the Young's modulus and elongation of PPOMC and EPOMC. FIG. 6 shows the effect of time duration of post polymerization of POMC on Tensile strength, Young's modulus and elongation. It has been observed that duration of POMC exposed to oven help to tune its mechanical properties by increasing the tensile strength and Young Modulus.

Figure 7:
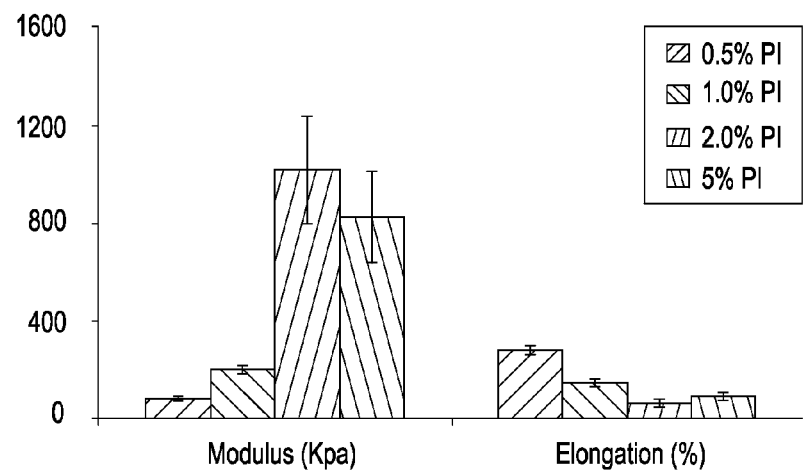
FIG. 7 is a graph of a comparison of the Young's modulus and elongation of PPOMC crosslinked by different photoinitiator concentrations.

FIG. 7 is a graph of a comparison of the Young's modulus and elongation of PPOMC crosslinked by different photoinitiator concentrations. FIG. 7 shows the effect of the PI concentration on the mechanical properties of the polymer. It has been shown that as amount of the photoinitiator increased from 0.5% to 2.0%, the Young's modulus increased while elongation decreased.

Figure 8:
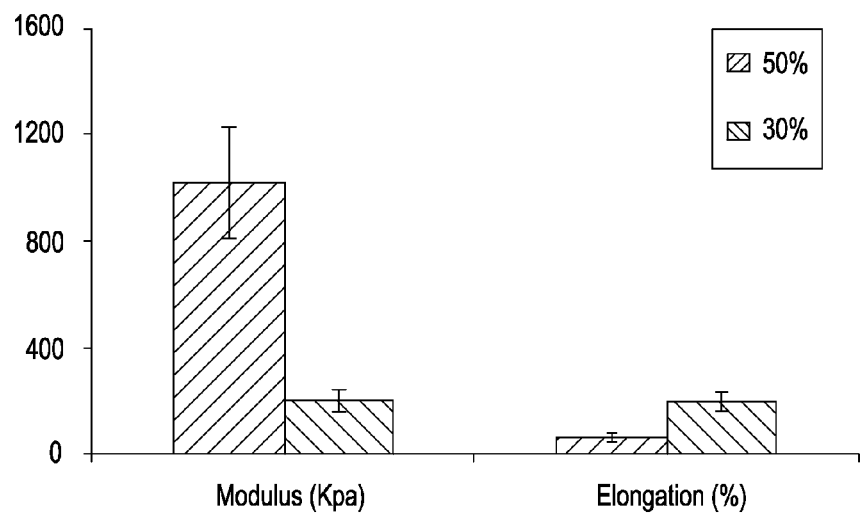
FIG. 8 is a graph of a comparison of the Young's modulus and elongation of PPOMC crosslinked at different solvent concentrations.

FIG. 8 is a graph of a comparison of the Young's modulus and elongation of PPOMC crosslinked at different solvent concentrations. FIG. 8 shows the effect of polymer concentration on the mechanical properties. The data shows that as the concentration of polymer increased, the Young's modulus increased, and the elongation decreased. Furthermore, purified polymer and unpurified POMC has been put in de-ionized water for 24 hour and test for its mechanical properties.

Figure 9:
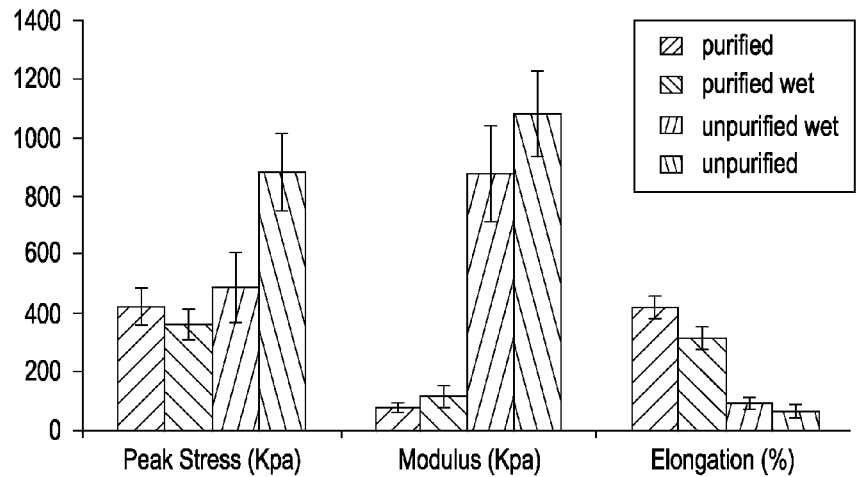
FIG. 9 is a graph of a comparison of mechanical properties of POMC under dry and wet conditions.
Figure 10:
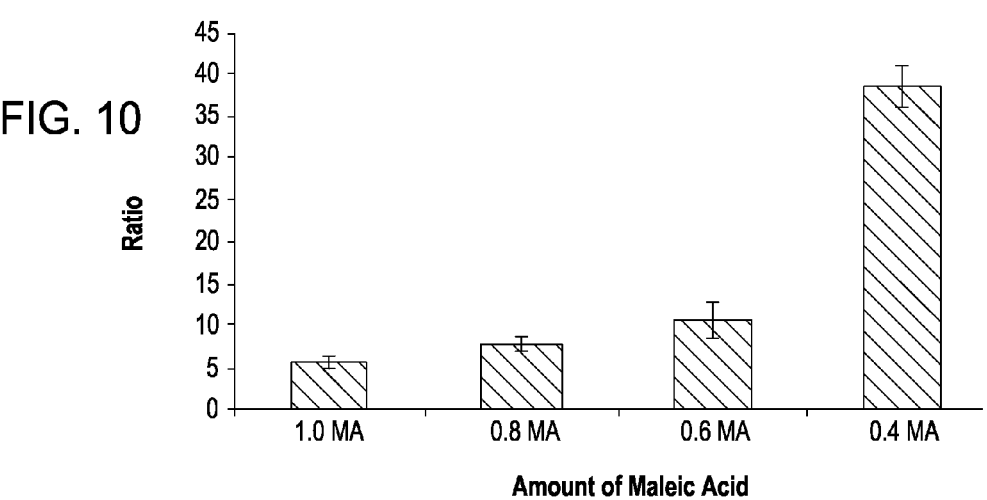
FIG. 10 is a graph of a comparison of the swelling ratio of PPOMC when composed of different monomer ratios.

FIG. 9 is a graph of a comparison of mechanical properties of POMC under dry and wet conditions. As seen in FIG. 9, there is some significant decrease in tensile strength and Young's Modulus of the unpurified polymer however there is no significant different in the purified polymer. The Young's modulus, elongation, density, crosslinking density, and molecular weight between crosslinks of the polymer has been tabulated and presented in Table 3. It shows that as we decrease the amount of maleic acid, molecular weight between crosslink increases and crosslink density decreases. This is due to the fact that as amount of maleic acid decreases, more citric acid will be incorporated in between two conjugated maleic acids. As mentioned earlier, citric acid has a higher molecular weight, which may be responsible for the monomer composition, PI concentration, and polymer concentration in solvent have been completed. FIG. 10 is a graph of a comparison of the swelling ratio of PPOMC when composed of different monomer ratios. As seen in FIG. 10, as the amount of maleic acid was increased, the swelling capacity of the polymer decreased.

Figure 11:
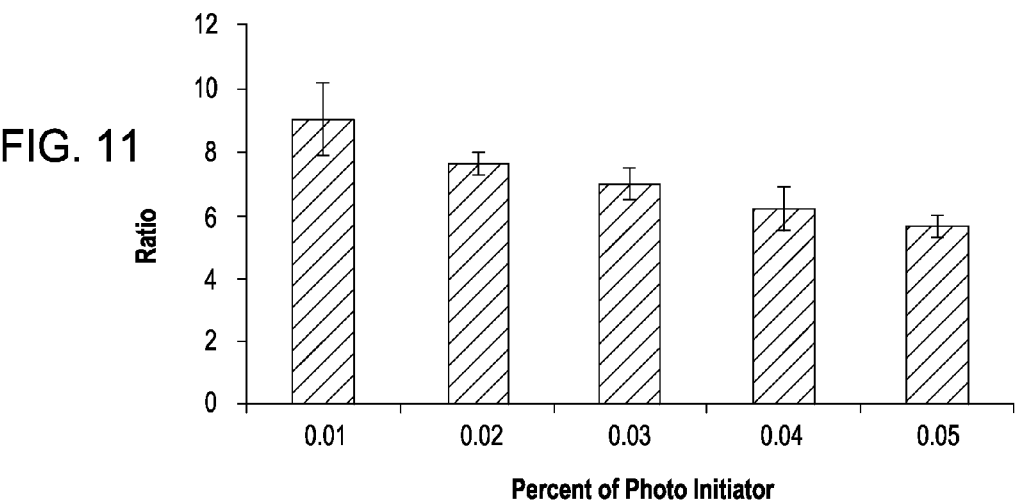
FIG. 11 is a graph of a comparison of the swelling ratio of PPOMC when crosslinked with different photoinitiator concentrations.

FIG. 11 is a graph of a comparison of the swelling ratio of PPOMC when crosslinked with different photoinitiator concentrations. On the other hand, FIG. 11 shows the effect of the PI concentration on the swelling ratio of the polymer. A significant difference in the swelling behavior has been observed when the PI concentration changes. For example, the 1% photoinitiator concentration had a swelling ratio of 9.03%, and the 5% photoinitiator concentration had a swelling ratio of 5.64%.

Figure 12:
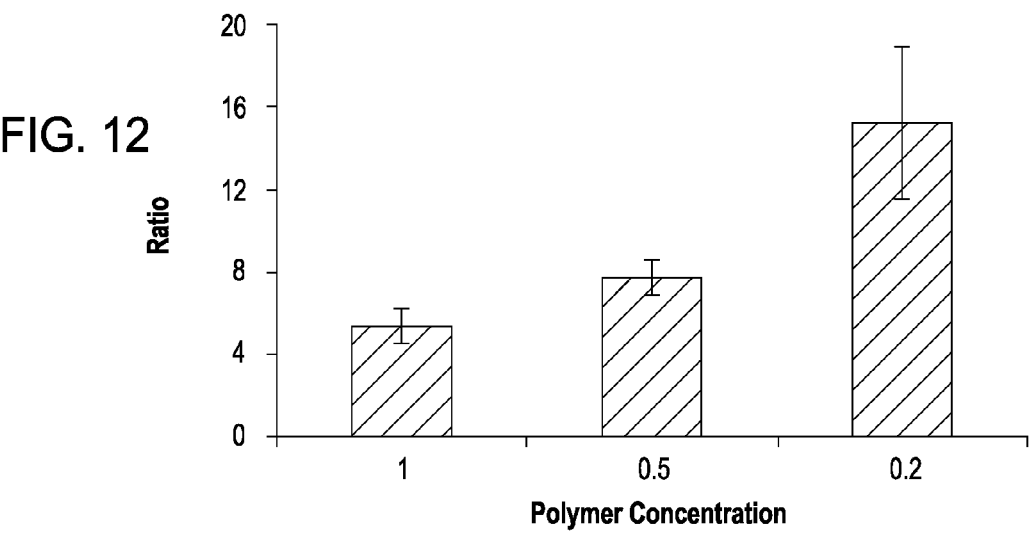
FIG. 12 is a graph of a comparison of the swelling ratios of PPOMC crosslinked at different polymer concentrations.

FIG. 12 is a graph of a comparison rison of the swelling ratios of PPOMC crosslinked at different polymer concentrations. In addition to this, FIG. 12 shows the effects of the polymer concentration in a solvent on the swelling ratio. A significant difference has been noticed on the swelling behavior. As the concentration of polymer increased, there was significant decrease in the swelling ratio. Thus, the swelling properties of PAMCs can be controlled with the crosslinking degree of the polymer.

Figure 13:
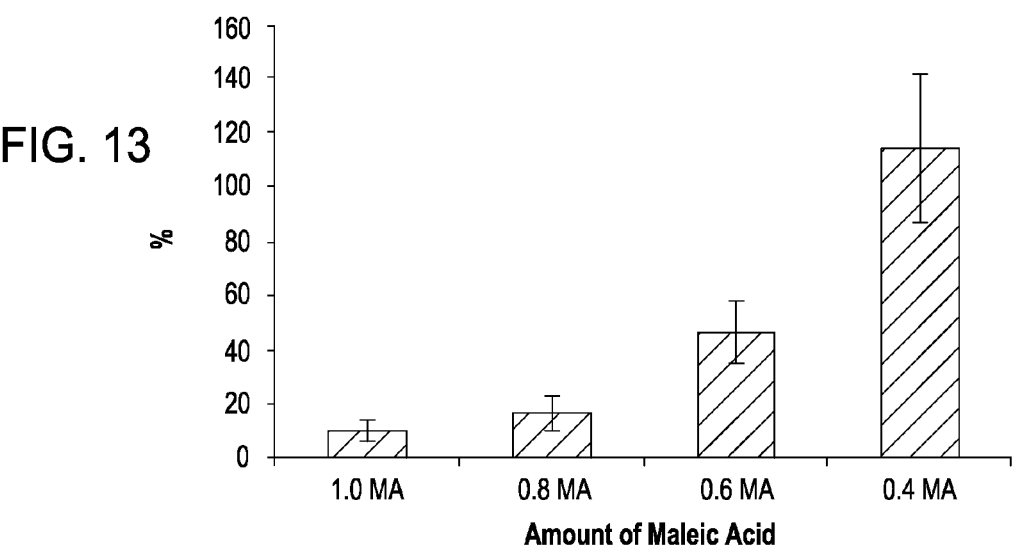
FIG. 13 is a graph of a comparison of the water uptake of PPOMC composed of different monomer ratios.
Figure 14:
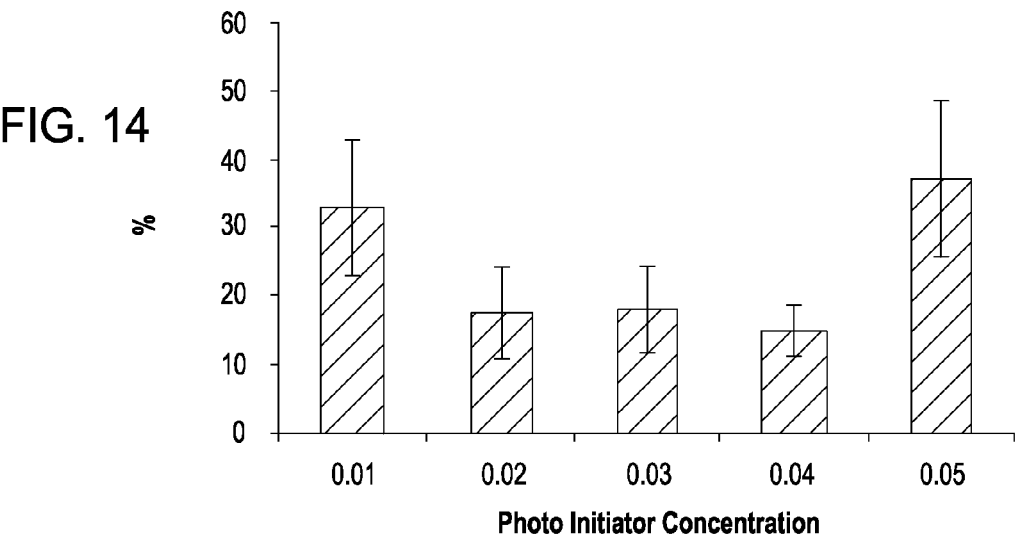
FIG. 14 is a graph of a comparison of the water uptake of PPOMC crosslinked with different photoinitiator concentrations.

Water uptake and swelling in PBS: Deionized water at room temperature has been used to understand the water uptake of the polymer. PBS at 37° C. has been used as a swelling agent to more closely mimic the internal environment of the body. FIG. 13 is a graph of a comparison of the water uptake of PPOMC composed of different monomer ratios. As seen in FIG. 13, the capacity of polymer to uptake water increased as the amount of maleic acid in the polymer decreased. However, an insignificant difference has been observed between polymer containing 100% maleic acid and 80% maleic acid content. On the other hand, no significant difference has been noticed in the water uptake capacity of the polymer due to the change in PI as seen in FIG. 14. FIG. 14 is a graph of a comparison of the water uptake of PPOMC crosslinked with different photoinitiator concentrations.

Figure 15:
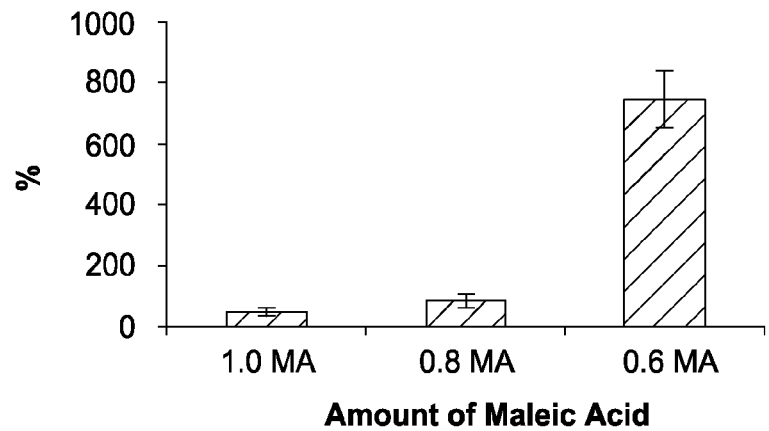
FIG. 15 is a graph of a comparison of the swelling ratio of PPOMC composed of different monomer ratios in PBS at 37° C.

FIG. 15 is a graph of a comparison of the swelling ratio of PPOMC composed of different monomer ratios in PBS at 37° C. In addition, at 37° C., the capacity of polymer to swell in PBS has been shown in FIG. 15. A significant increasing trend of polymer swelling has been observed as the amount of maleic acid is decreased for the swelling in PBS.

Figure 16:
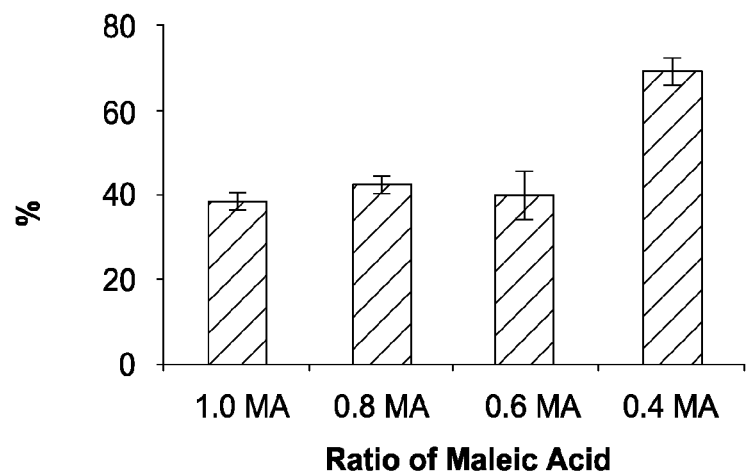
FIG. 16 is a graph of a comparison of the sol gel fraction of PPOMC composed of different monomer ratios.

Sol gel fraction: The sol gel fraction of the crosslinked polymer has been determined by soaking six 7 mm diameter unpurified polymer discs in DMSO for two days. FIG. 16 is a graph of a comparison of the sol gel fraction of PPOMC composed of different monomer ratios. As seen in FIG. 16, a significant difference can be observed when the 40% maleic acid content is used.

Figure 17:
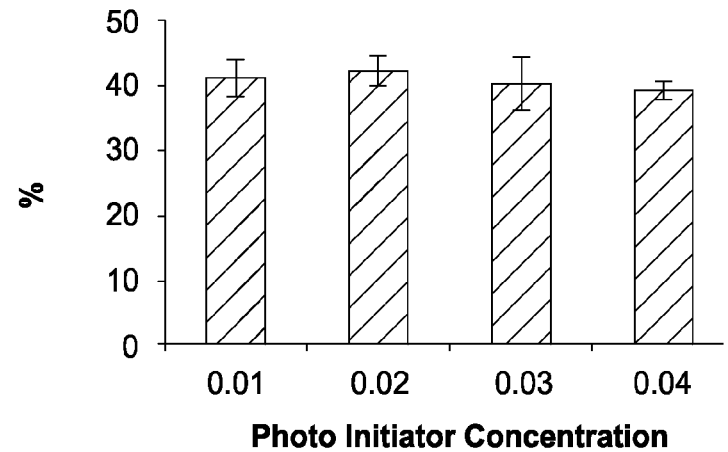
FIG. 17 is a graph of a comparison of the sol gel fraction of PPOMC crosslinked with different photoinitiator concentrations.

In addition, FIG. 17 shows no significant difference in the sol gel fraction when the amount of the photoinitiator concentration is varied. FIG. 17 is a graph of a comparison of the sol gel fraction of PPOMC crosslinked with different photoinitiator concentrations. FIG. 18 is a graph of the effects of different PPOMC monomer ratios on the degradation rate in PBS (pH 7.4) at 37° C. a) 1.0 POMC, b) 0.8 POMC, b) 0.6 POMC. PMAC degradation: FIG. 18 shows the degradation rate of the POMC polymer with different monomer ratios. As the molar ratio of maleic acid is increased, the degradation rate is decreased. This can be explained that as the maleic acid is increased, the polymer is more susceptible to hydrolysis due to its decreased hydrophobicity.

FIG. 19a is an image of a H&E staining of mouse SMCs on PPOMC 0.8 film and FIG. 19b is a SEM picture of mouse 3T3 cells on PPOMC 0.8 film. In vitro cell culture: Initial cell adhesion on POMC was observed after 48 hours of culture with mouse SMC as seen in the H&E stain photomicrograph of FIG. 19A and in the SEM photograph of 3T3 in FIG. 19B. This shows that both cell types are attached and display a normal phenotype on POMC films. These cell culture results establish preliminarily that POMCs can be used for tissue engineering applications.

Foreign body response: The foreign body response of the representative PAMC, POMC was evaluated via subcutaneously implantation in Sprague-Dawley rats. No tissue necrosis around the implants was observed on all the tested animals. FIG. 20 is an image of a foreign body response of POMC implanted subcutaneously in Sprague-Dawley rats. Impants and surrounding tissues were harvested after (FIG. 20a) 1 week; and (FIG. 20b) 4 weeks implantation for H&E staining. Samples that were implanted for 1 week produced a slight acute inflammation response (FIG. 20a), which was expected and consistent with the introduction of foreign materials into body. After 4 week of implantation, the number of infiltrating cells declined and a thin fibrous capsule was formed surrounding the POMC implanting indicating the degradation products of POMC are not toxic. The preliminary in vivo biocompatibility evaluation suggested that POMC is a biocompatible polymer.

Figure 21A:
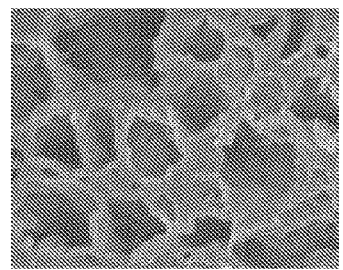
FIG. 21a is a SEM photograph of POMaC scaffold fabricated by salt-leaching method.
Figure 21B:
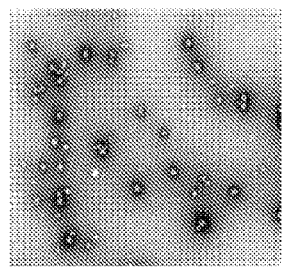
FIG. 21b is a transmission electron microscopy (TEM) picture of POMC nanoparticles. Scale bar: 500 nm.

PAMC porous scaffold and nanoparticle preparation: FIG. 21a is a SEM photograph of POMaC scaffold fabricated by salt-leaching method, and FIG. 21b is a transmission electron microscopy (TEM) picture of POMC nanoparticles. Scale bar: 500 nm. The processability of PAMCs was evidenced by the porous scaffold fabrication. FIG. 21a shows a SEM picture of a cross section of a POMaC scaffold produced by the salt leaching technique. The SEM picture verifies that pores were distributed throughout the scaffold with interconnectivity. The rough surface of pore walls is considered to favor the cell attachment. Small pores along the pore edge and inside the pores should aid in nutrient/waste exchange inside of the scaffolds. FIG. 21b shows the POMC nanoparticles prepared by a solvent displacement method.

Nanoparticle is the central theme in the field of drug delivery. Thus, it is potential that pre-POMC can be mixed with drugs such as proteins and form nanoparticles in aqueous solution and then in-situ photocrosslinked. This mild protein encapsulation process avoids any harsh conditions such as heating, toxic solvent, and the uses of surfactant. The crosslinking can be a way to control the drug release rate. The still available functional groups on POMC nanoparticles can be used to conjugate with ligands or antibodies for targeting. Therefore, PAMCs should find their broad applications in tissue engineering and drug delivery.

Figure 22A:
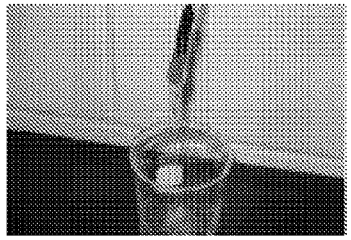
FIG. 22a is an image of pre-PMDC in a gel form and FIGS. 22b and 22c are images of pre-PMDC in a liquid form.
Figure 22B:
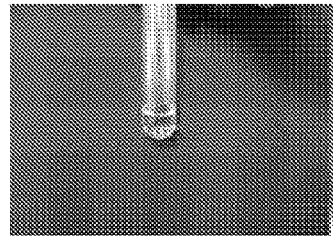
Figure 22C:
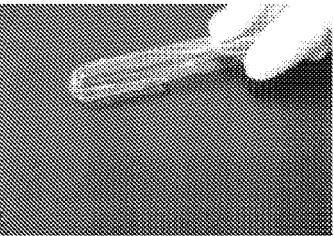

FIG. 22a is an image of pre-PMDC in a gel form and FIGS. 22b and 22c are images of pre-PMDC in a liquid form.

Figure 23A:
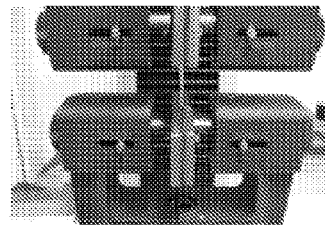
FIGS. 23a and 23b are images of POMC films under tensile mechanical tests on a MTS mechanical tester. Elongation of PMDC can be up to 500% or so under the synthesis conditions that have been tested.
Figure 23B:
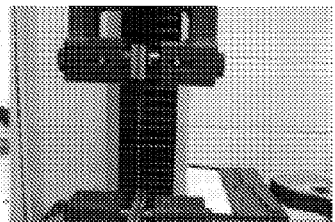

Would dressing application: The pre-polymers of POMC can be in a liquid or gel form. Thus it can be easily applied to the skin with any contour and then polymerized to form a film. The polymerization time of POMC is tunable and we have been able to polymerize PMDC within two minutes at room temperature. The mechanical test shows that PMDC has elongation up to 500% with prompt recovery at break. FIGS. 23a and 23b are images of POMC films under tensile mechanical tests on a MTS mechanical tester. Elongation of PMDC can be up to 500% or so under the synthesis conditions that have been tested.

Figure 24:
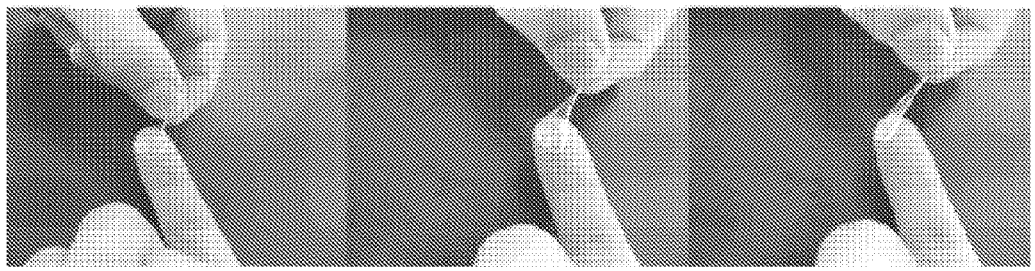
FIG. 24 is an image of PMDC adhered on skin very well and can be peeled off quickly without sacrificing the film integrity.

FIG. 24 is an image of PMDC adhered on skin very well and can be peeled off quickly without sacrificing the film integrity. The mechanical properties of POMC are tunable by varying the monomers and polymerization conditions. POMC films adhere well on skin and can be easily peeled off without sacrificing the film integrity (FIG. 24).

PMAC has tunable degradability according to the needs. It can potentially be absorbed on the skin when its mission is done. Or it can be disposed without polluting the environment after its job done. PMAC is transparent which could potentially allow ones to monitor the wound healing process visually. Finally, PMAC is not inflammable.

This is, for the first time, to polymerize a family of biodegradable crosslinked polyester hydrogel networks featured with dual-crosslinking mechanism for biomedical applications. The biomedical applications for these biomaterials can be soft tissue engineering, drug delivery, and wound dressing etc. The synthesis of PAMCs is simple, safe, and cost-effective. PAMCs hold great potential for soft tissue engineering due to their controlled, tunable mechanical properties and degradability. In addition to the tunable properties, the available hydroxyl and carboxylic groups can be used for bioconjugation or other surface modifications, and display excellent biocompatibility. In combination with microelectromechanical systems (MEMS) and the layer-by-layer scaffold sheet engineering technique, these materials may be fashioned into small diameter vascular grafts or any other tissue implants with the required strength and elasticity to be implanted in the body. The introduction of PAMCs should expand the repertoire of the available biodegradable polymers that meet the strict requirements of soft tissue engineering and other biomedical applications.

Biomaterials are the bases for many biomedical applications. The PAMC polymers are a family of versatile biomaterials that can mimic the mechanical properties of soft tissues to be repaired, and offer easy functionalization via the rich of available —COOH and —OH groups for biomimicing or targeting. Thus, the potential applications of this novel family of polymers can be soft tissue engineering, targeting drug delivery, and wound dressing. For tissue engineering, PAMCs can not only be used to fabricate solid pre-formed scaffolds but also be used as injectable form of scaffolds for cell encapsulation and in situ tissue engineering. PAMCs can be ideal wound dressing materials with enhanced patient compliance compared to the current wound dressing products. Any company who needs biodegradable polymers can be a potential target for this invention. For example, potential targets include J&J, Zimmer, Gore, Medtronic, 3M medical division, Abbott, Baxter, and many other biotechnological and pharmaceutical companies could benefit from this novel family of polymers.

Tissue engineered scaffolds made of PAMCs are soft, elastic, display excellent biocompatibility, and are able to retain their mechanical properties when hydrated. Thus, PAMCs would trigger minimal mechanical irritation to the surrounding tissues when implanted in the body. Mechanical cues can be transmitted easily to cells seeded on this type of soft and elastic material. The degradation rates and mechanical properties of PAMCs can be controlled by varying the combination of the monomers used during synthesis, and by the polymerization conditions under the dual crosslinking mechanism.

Complex tissue grafts can be created by using this new family of polymers in combination with micro-electromechanical systems (MEMS) technology to create soft, elastic, thin and micro-patterned scaffold sheets to stack them through a layer-by-layer scaffold sheet engineering strategy. The dual crosslinking mechanism also allows for the fabrication of constructs with crosslinking gradients to match the versatile nature of natural tissues. The potential applications of this novel family of polymers can be, but are not limited to engineering blood vessels, cardiac tissues, heart valves, skin, bladder, orthopedics, cell encapsulation, and drug delivery. PAMCs can quickly form a soft and elastic film on the skin via radical polymerization. The soft and elastic PAMC films can be quickly-peeled off without sacrificing their integrity. Thus PAMCs can also be used as a compliant wound dressing material or skin grafts with a great convenience for uses in the battle field.

In the past decades, extensive research has been made in the field of in situ crosslinkable materials. The use of these materials is not only limited to the formation of hydrogels [35], thin films, scaffolds [36-37], and nanoparticles, but also used as fluid sealants [38-39], post-surgical adhesives [40], cell and biomolecule encapsulation [37,41], localized drug delivery [42], gene delivery [43], and sutures [44]. The phenomenon of in situ polymerization can be initiated by the means of redox initiators or photoinitiators in presence of electromagnetic waves of various wavelengths from gamma rays to ultraviolet rays. These materials show great promise in the field of drug delivery and tissue engineering.

Figure 25:
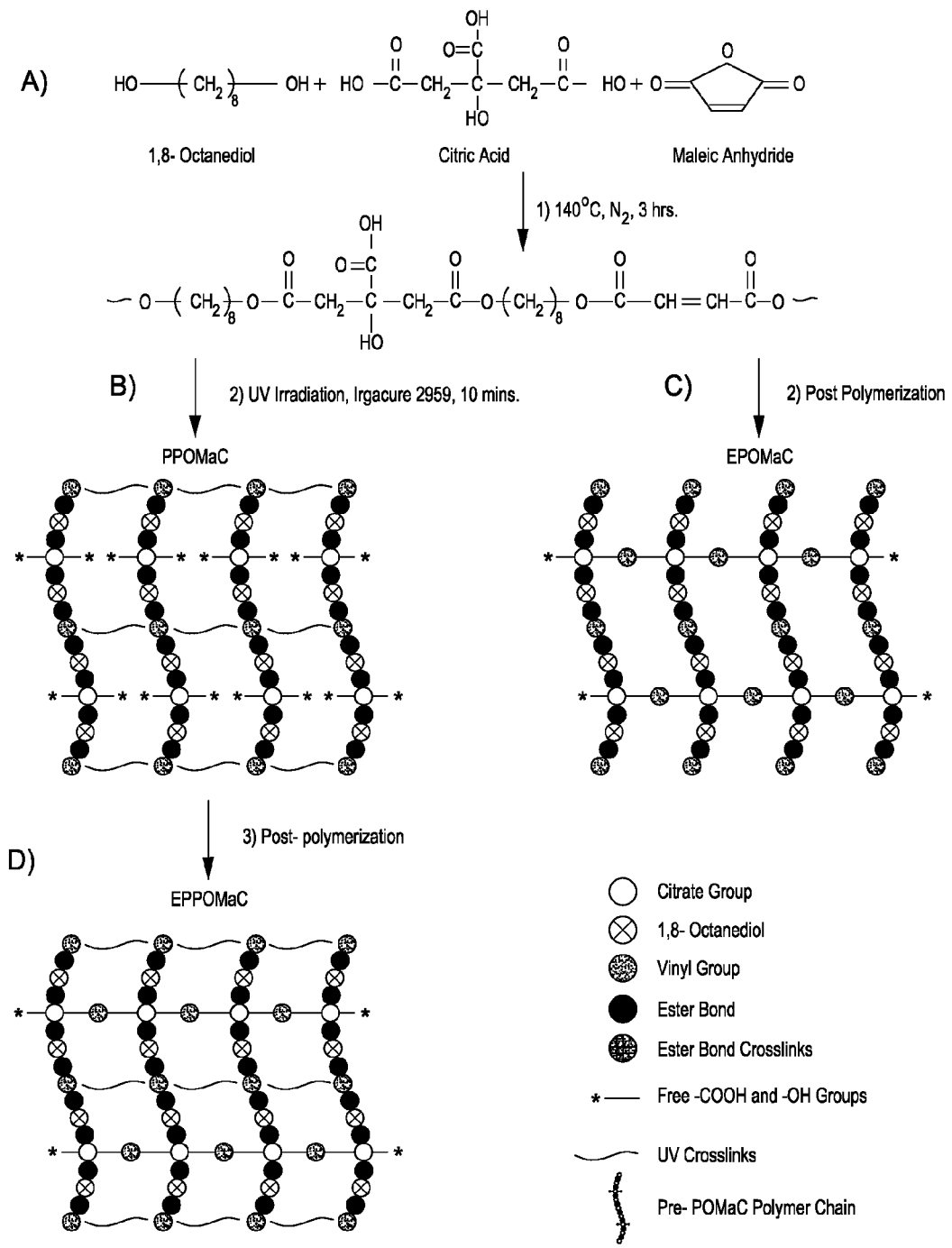
FIG. 25 is a schematic representation of POMaC synthesis, networks, and dual crosslinking mechanism.

FIG. 25 is a schematic representation of POMaC synthesis, networks, and dual crosslinking mechanism. FIG. 25a is a schematic representation of the monomers 1,8-octanediol, citric acid, and maleic anhydride underwent condensation polymerization to produce pre-POMaC with successful incorporation of vinyl carbons and degradable ester bonds located throughout the polymer backbone. FIG. 25b is a schematic representation upon exposure to UV irradiation, the free radical polymerization is initiated to crosslink pre-POMaC through the vinyl carrying carbons to yield photocrosslinked POMaC (PPOMaC). Notice the available free carboxylic acid and hydroxyl functional groups remaining from citric acid after photocrosslinking. FIG. 25c is a schematic representation of pre-POMaC can also be crosslinked through polycondensation without photocrosslinking to obtain ester bond crosslinked POMaC (EPOMaC). FIG. 25d is a schematic representation of post-polymerization can be used to further crosslink PPOMaC through the available free functional groups of citric acid to yield ester bond crosslinked photocrosslinked POMaC (EPPOMaC).

PAMCs are synthesized by reacting citric acid, diols, and unsaturated di-acids such as maleic anhydride to form a pre-polymer. The pre-polymer can be further crosslinked through free radical polymerization and/or polycondensation (Scheme 1).

Various ceramic composites have been employed in recent biomaterial designs to enhance the material mechanical properties for bone tissue engineering applications. Hydroxyapatite (HA) is a naturally occurring mineral found in teeth and bones within the human body. When combined with synthetic materials, HA has been shown to increase osteoconductivity and induce bone growth. PAMC biomaterials can be mixed with HA, $Ca_3(PO_4)_2$ and any other inorganic materials to form composite materials. For example, Due to the in situ crosslinking capabilities of PAMCs, promising injectable bone/dental fillers and bone tissue engineering scaffolds can be produced using PAMC/HA composites.

The pre-polymer of PAMC has been crosslinked by free radical polymerization. The purified pre-polymer was dissolved in solvent. To generate free radicals through ultraviolet (UV) crosslinking, a photo initiator was dissolved in the solution. Next, the solution was poured into a Teflon mold and placed under a UVP 365 nm Long Wave Ultraviolet Lamp (Upland, Calif.). The thermoset polymer network achieved through this process is shown in FIG. 25b. The polymer network was placed in an excess amount of DMSO for forty-eight hours to remove any unreacted polymer, and was placed in water for twenty-four hours to exchange DMSO. Finally, the purified crosslinked polymer was freeze-dried for 3 days to obtain photocrosslinked PAMC (PPAMC) as shown in FIG. 26.

FIG. 26 is an image of UV crosslinked PPOMC film. PPOMC was crosslinked using (30% polymer, 1% PI, and 3 minutes UV irradiation). PPOMC films are transparent and fully elastic after purification. In addition to the photocrosslinking method, the pre-polymer of PAMCs can also be crosslinked by a redox-initiated system. The purified pre-polymer was dissolved in solvent. A redox initiator (RI) such as ammonia persulfate was also dissolved in the polymer solvent solution and added to the pre-polymer solution. The redox initiator can also be added to the pre-polymer or pre-polymer solution directly. The solution was kept at 37° C. to achieve a thermoset hydrogel. The hydrogel was placed in an excess amount of DMSO for forty-eight hours to remove any unreacted polymer, and was placed in water for twenty-four hours to exchange DMSO. Finally, the purified crosslinked polymer was freeze-dried for 3 days.

PPAMC Crosslinkers The incorporation of various crosslinkers into the polymer network can be utilized to enhance the functionality of the thermoset polymer. Various terminal vinyl group containing molecules such as acrylic acid, acrylamide, 2-propene-1-thiol, allyl alcohol, and allylamine can be added to the polymer solution while crosslinking through free radical mechanism as mentioned previously to add additional functional groups to the bulk material.

PAMC Composites The purified pre-polymer was dissolved in solvent. Then, various amounts of HA were thoroughly mixed with the polymer solution until homogeneous mixing was observed. Finally, a redox initiator (RI) was also dissolved in the polymer solvent solution. The solution was kept at 37° C. to achieve a thermoset hydrogel.

Pre-PAMC Characterization The average molecular weights of the pre-PAMCs were analyzed by an Autoflex Matrix Assisted Laser Desorption/Ionization Mass Spectroscopy (MALDI-MS) (Bruker Daltonics, Manning Park, Mass.). 2-(4-hydroxyphenyl-azo)-benzoicacid (HABA) was used as the matrix to mix with the pre-PAMCs in a 1:1000 pre-polymer:matrix molar ratio. The functional groups present in the pre-polymers were analyzed by Fourier Transform Infra Red (FT-IR) spectroscopy using a Nicolet 6700 FT-IR (Thermo Scientific, Waltham, Mass.). Pre-PAMCs were dissolved in dimethyl sulfoxide-d6 (DMSO-d6) in a 5-mm-outside diameter tube and analyzed by Proton Nuclear Magnetic Resonance spectroscopy (1H-NMR) using a 250 MHz JNM ECS 300 (JEOL, Tokyo, Japan). The chemical shifts for the 1H-NMR spectra were recorded in parts per million (ppm), and were referenced relative to tetramethylsilane (TMS, 0.00 ppm) as the internal reference.

PAMC Characterization FT-IR spectra were also obtained for crosslinked PPAMC and EPPAMC films at room temperature. Pre-PAMC solutions were cast onto KBr crystals and crosslinked as mentioned previously to study the bond vibrations of resulting crosslinked polymer network. The thermal behavior of the polymer of different ratios has been studied on a DSC550 (Instrument Specialists Inc., Spring Grove, Ill.) and TGA (Thermogravimetric Analysis, Mettler Toledo, Columbus, Ohio). For the DSC analysis, samples are first scanned up to 150° C. with a heating rate of 10° C./min under nitrogen purge (50 ml/min) to remove any trace water from the sample. Thereafter, the sample was cooled with a cooling rate of −40° C./min to −60° C. The sample was then scanned a second time up to 230° C. The glass transition temperature (Tg) is determined as the middle of the recorded step change in heat capacity from the second heating run. TGA thermograms have been observed under the flow of nitrogen gas (50 ml/min) at a scanning speed of 101° C./min in the range of 50-600° C. The decomposition temperature (Td) was defined as the temperature at which 10% weight loss of the samples occurred.

Tensile mechanical testing was conducted according to ASTM D412A on an MTS Insight 2 fitted with a 500 N load cell (MTS, Eden Prairie, Minn.). Values were converted to stress-strain and the initial modulus was calculated from the initial gradient of the curve (0-10% elongation). The results are presented as means±standard deviation (n=6). The density was measured by the fluid displacement method using a density measurement kit (Mettler Toledo, Columbus, Ohio). The auxiliary liquid used was deionized water. The crosslink density ($\eta$) and molecular weight between crosslinks (Mc) was calculated by equation (1) according to the theory of rubber elasticity described elsewhere [34]:

$$\eta = \frac{E_0}{3RT} = \frac{\rho}{M_c} \tag{1}$$

Where $\eta$ represents the number of active network chain segments per unit volume; Mc represents the molecular weight between crosslinks (mol/m3); E0 represents the initial modulus (Pa); R is the universal gas constant (8.3144 J/mol K); T is the absolute temperature (K); and $\rho$ is the polymer density (g/m3) as measured via the method above.

The sol content and swelling percentage was measured by the mass differential after incubation of the polymer network in DMSO. DMSO was chosen as the swelling agent due to its high boiling point.

Briefly, polymer cylindrical discs (7 mm diameter; 2 mm thick) were cut from unpurified crosslinked films using a cork borer. The discs were weighed to find the initial mass (Wi), and suspended in DMSO for 72 hours. The DMSO was changed every 24 hours. The samples were removed from the DMSO, blotted dry with filter paper, and weighed (Ws). Next, the discs were suspended in deionized water for 24 hours to exchange the DMSO, and lyophilized for 72 hours. The dried samples, absent of any unreacted polymer, were weighed to find the dry mass (Wd). The sol gel fraction was calculated using the formula from equation 2[35]:

$$sol(\%) = \frac{W_i - W_d}{W_i} \times 100 \tag{2}$$

The swelling percentage was calculated using the formula from equation 3[36]:

$$swelling(\%) = \frac{W_s - W_d}{W_s} \times 100 \tag{3}$$

The reported values are the means±standard deviation (n=6). In addition to DMSO, swelling in water (37° C.) and phosphate buffered saline (PBS) (pH 7.4; 37° C.) were also performed using the same procedure.

Degradation studies were conducted in both PBS (pH 7.4) and NaOH solutions (0.05 M). NaOH degradation was used to screen the polymer degradation in a relatively short period of time [37]. Cylindrical disc specimens (7 mm in diameter; 2 mm thick) were cut from purified crosslinked films using a cork borer. The samples were weighed, placed in a tube containing 10 ml of PBS or NaOH for up to 10 weeks or 24 hours respectively, and incubated at 37° C. After incubation, samples were thoroughly washed with deionized water, lyophilized for 1 week, and weighed. The mass loss was calculated by comparing the initial mass (W0) with the mass measured at the pre-determined time point (Wt), as shown in equation 4[38]. The results are presented as the means±standard deviation (n=6).

$$mass\ loss(\%) = \frac{W_0 - W_t}{W_t} \times 100 \tag{4}$$

Biocompatibility (PAMCs) Cell compatibility for PAMCs was evaluated in vitro using both qualitative and quantitative methods. EPPAMCs films and scaffolds were cut into cylindrical discs (7 mm in diameter) and sterilized in 70% ethanol for 3 hours. After incubation in ethanol, the samples were exposed to UV light for 30 minutes. NIH 3T3 fibroblasts (ATCC) were used as model cells for this study. The cells were cultured in Dulbecco's modified eagle's medium (DMEM), which had been supplemented with 10% fetal bovine serum (FBS) and 1% penicillin streptomycin. The culture flasks were kept in an incubator maintained at 37° C., 5% $CO_2$, and 95% relative humidity. The cells were allowed to grow to the fourth passage, trypsinized, centrifuged, and suspended into media to obtain a seeding density of $1 \times 10^5$ cells/ml for both the films and scaffolds Immediately prior to the trypsin treatment, 3T3 fibroblasts were labeled with carboxyfluorescein diacetate, succinimidyl ester (CFDA-SE) green fluorescent cell tracer using the manufacturer's protocol for the scaffold seeding. After 3 days of culture for the films, the cells were fixed with the addition of 5 ml of 2.5% (wt/v) gluteraldehyde PBS solution.

The fixed films were then sequentially dehydrated by treatment with a graded series of ethanol (50, 75, 90, and 100%), lyophilized, and sputter coated with silver. The samples were then observed under SEM to view the morphology of the attached cells. In addition to the SEM images, separate samples were hematoxylin and eosin (H&E) stained, and viewed under a Zeiss Auxiovert inverted microscope (Carl Zeiss MicroImaging, Thornwood, N.Y.). The seeded EPPOMaC scaffolds were allowed to culture, and imaged every other day for two weeks with re-staining on the third day. The scaffolds were removed from culture at day 2, 7, and 14 for fluorescent imaging of tracer dye stained cells. After imaging, the cell containing scaffolds were fixed in cold methanol for 10 minutes and dried under vacuum. Scaffolds were then embedded in a liquid gelatin-sucrose solution, placed under vacuum for 30 minutes, and frozen at −20° C. Cross-sections of the scaffold were cut at 10 μm and H&E stained to visualize cell penetration and growth throughout the scaffold.

A quantitative assessment of the cell proliferation on EPPOMaCs scaffolds were also performed using a Methlythiazoletetrazolium (MTT) cell proliferation and viability assay kit. EPPOMaCs scaffolds were cut into cylindrical discs (7 mm in diameter), and sterilized as mentioned above. PLLA scaffolds were used as a relative control. 3T3 fibroblasts were seeded on the scaffolds in the same manner as mentioned previously. MTT Assay analysis was performed at 1, 3, and 7 days of culture. At the pre-determined time point, the assay was performed as per the manufacturer's protocol. Briefly, the old media was aspirated, and each sample was washed with PBS to remove any loosely attached or dead cells. Next, 100 μl of incomplete media was added to the specimens. 10 μl of 3-(4,5-dimethylthiazol-2yl)-diphenyltetrazolium bromide solution was then added to the samples, and allowed to incubate for 3 hours. At the end of the incubation period, the mixture of the MTT solution and incomplete media was aspirated and replaced with 100 μl of MTT solvent. Dissolution of the formazan crystals was facilitated by constant agitation of the well plate on an orbital shaker for 20 minutes. The absorbance was measured with an Infinite200 microplate reader (Teacan Group Ltd., Switzerland) at 570 nm, with a reference wavelength of 690 nm, within 30 minutes of MTT solvent addition.

PPAMC, EPPAMCs, and PLLA (as relative control) were used to evaluate the in vivo response. The films were cut into discs (10 mm diameter; 1 mm thickness), and sterilized under UV at 30 minutes per side and soaked in 70% ethanol. The films were then exchanged with PBS to remove the ethanol and dried under vacuum for 30 minutes. The sterilized films were then implanted subcutaneously in the back of healthy Balb/C mice (The Jackson Laboratories, Bar Harbor, Me.) Animals were cared for in compliance with regulations of the animal care and use committee of University of Texas at Arlington. 12 mice were divided into three groups of four (2 male and 2 female) for the different time points of the study. The mice were anesthetized in a chamber through which an isofluorane-oxygen mixture was passed. Test samples were randomly implanted in upper or lower part of the back of the mice by blunt dissection. The mice were monitored through recovery from anesthesia and placed into single housing and monitored throughout the study. At the end of each time point, the mice were sacrificed by $CO_2$ inhalation, and the implant and surrounding tissue were frozen in OCT embedding media (Polysciences Inc., Warrington, Pa.) at −80° C. for histological analyses. To assess the tissue responses to the implants, 10 μm tissue sections were H&E stained. Images of stained sections were taken at 10× magnifications using a Leica DMLP microscope (Leica Microsystems Inc., Bannockburn, Ill.) fitted with a Nikon E500 camera (Nikon Corp., Japan). Three images per section were collected from different parts of the section for analysis. A total of four sections per animal were examined in this manner Response capsule thickness was measured in each of the images using the Image J analysis software. At least 25 readings from different parts of the images were collected and averaged to determine the capsule thickness.

PAMC Fabrication. In order to prepare PAMC nanoparticles, a 5% (w/v) solution of PAMC pre-polymer in acetone was prepared. The polymer solution was then added dropwise into stirred DI water. The mixture was allowed to stir at 1200 rpm for 6 hours to let the solvent evaporate. Dynamic Laser scattering test was used to measure the size distribution of the obtained nanoparticles. Transmission electron microscope (TEM 2 JEOL 1200EX II) was also used to observe the morphology of the nanoparticles solution.

FIG. 27a is a schematic representation of the microchannel fabrication process: pre-PAMC, PI, and 1,4-dioxane are mixed together and cast over the PDMS master. Following the removal of air trapped in the channels, the pre-PAMC is exposed to UV irradiation to form PPAMC channels. FIG. 27b is a schematic representation of the scaffold addition process: pre-PAMC, PI, salt, and 1,4-dioxane are mixed together to create a thick slurry and cast over the PPAMC channels. The slurry is then exposed to UV irradiation, and cured at 80° C. to fuse the scaffold to the microchannels. FIG. 27c is a schematic Following post-polymerization, the entire scaffold/microchannel construct is suspended in deionized water to leach out the salt from the scaffold. The construct is then peeled away from the PDMS master and lyophilized to remove any water. The resulting scaffold is soft, flexible, and biodegradable with microchannels that can be used for cellular alignment (schematic not drawn to scale).

To fabricate PAMC scaffold sheets with MEMS technology, microchannel patterns were transferred from the polydimethylsiloxane (PDMS) mold to PAMC according to the procedures illustrated in FIG. 27. Briefly, pre-PAMC was dissolved in 1,4-dioxane to make a 30 wt.-% solution and mixed with PI (1 wt.-%). The pre-polymer solution was cast onto the PDMS microchannel mold, and placed in a desiccator to remove any air trapped in the channels. The microchannels filled with pre-PAMC were then exposed to a 365 nm long wave ultraviolet light for 10 minutes (FIG. 27a). Once the PPAMC was formed in the microchannels, the particulate leaching method was used to fabricate porous PAMC scaffolds onto the microchannels. Pre-PAMC was dissolved in 1,4-dioxane to make a 30 wt.-% solution, followed by the addition of sieved sodium chloride salt (99% purity) with an average size in the range of 106-150 pm in a (1:9) polymer: salt ratio by weight. The polymer solution was mixed thoroughly with the salt and PI (1 wt.-%) until a viscous paste was formed. The resulting slurry was cast onto the previously fabricated PPAMC microchannels. The scaffold was exposed to a 365 nm long wave ultraviolet light for 30 minutes. Following UV crosslinking, the entire scaffold/microchannel construct was placed in an oven and cured at 80° C. to ensure that the scaffold bonded to the PPAMC microchannels (FIG. 27b). Next, the salt in the scaffold was leached out by immersion in deionized water for 72 hours with water changes every 12 hours. Finally, the scaffolds were lyophilized for 36 hours to remove any traces of water. To view the cross-sectional morphology, the sample was freeze fractured using liquid nitrogen, sputter coated with silver, and examined under a Hitachi S-3000N Scanning Electron Microscope (SEM) (Hitachi, Pleasanton, Calif.). Image J analysis software was used to determine the dimensions of the fabricated microchannels and scaffold pore sizes. To characterize the geometries, 3 random locations were selected and a total of 30 measurements performed. The dimensions reported are expressed as the means±standard deviation.

Drug Loading and in Vitro Release. BSA was chosen as the model drug for the controlled release study. A BSA solution was first prepared by dissolving 2.0 g of BSA in 40 mL of PBS solution (pH 7.4). Then, the appropriate amount of the drug solution was mixed with the polymer solution to make a 1:20 drug to polymer ratio. Due to its solubility in water, PPEGMC was used as a polymer network in this experiment. The in vitro release was carried out at 37° C. to investigate the effect of the pH sensitivity of the PPEGMC hydrogel on protein release profiles. BSA release study was performed by immersing the above BSA-loaded hydrogel sample in a glass bottle filled with a 10 mL of buffer solution (pH 7.4) and buffer solution (pH 2.4). At a predetermined period, BSA released buffer solution was removed from the glass tube and hydrogel was placed on fresh 10 ml of buffer solution. The concentration of the BSA was measured by using a UV spectrophotometer at 280 nm. The results were presented in terms of cumulative release as a function of time, and the cumulative BSA release (%) was calculated as: cumulative release (%)) (Mt/M0)×100, where Mt is the amount of BSA released from the hydrogel at time t and M0 is initial BSA loaded in the hydrogel.

Wound Dressing. An excision of underlying tissue of porcine skin (Walmart, Arlington, Tex.) was performed for handling purposes. Several random contour geometries were made using a razor blade on the skin. Meanwhile, PAMC was mixed thoroughly with 2% (w/w) of PI until a homogeneous paste was achieved. The paste was carefully smeared onto the various contour and placed under UV light for 3 minutes.

Data are expressed as mean±standard deviation. Statistical analysis was performed using one way-ANOVA with post hoc Neuman-Keuls testing to ensure that groups are statistically different. The swelling data and mechanical properties of the polymer were compared with one-way ANOVA. Data were taken to be significant, when a p-value of 0.05 or less was obtained.

Figure 28:
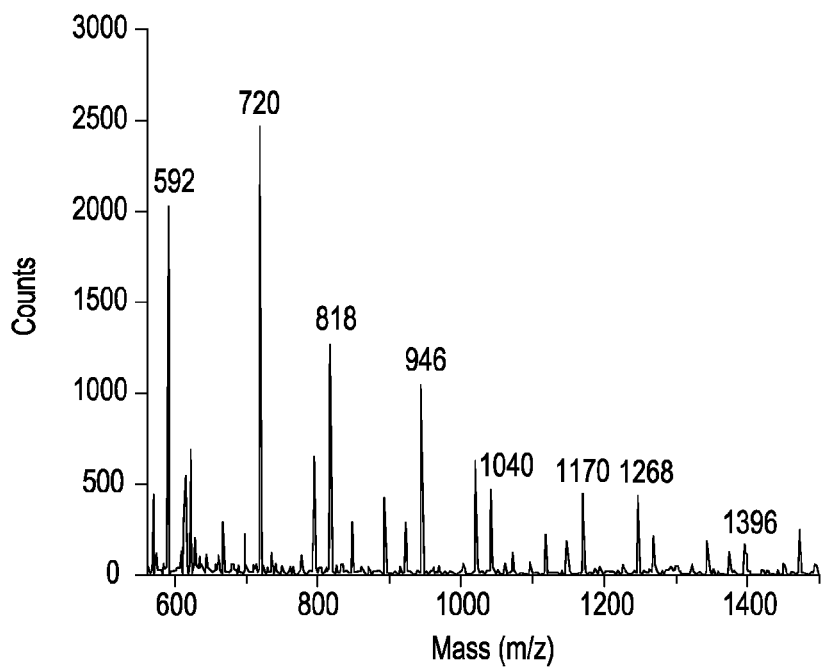
FIG. 28 is a plot of a MALDI-MS spectra of pre-POMC 8/2.

Characterization of pre-PAMC. FIG. 28 is a plot of a MALDI-MS spectra of pre-POMC 8/2. The average molecular weight of pre-PAMC was measured by MALD-MS, and a typical spectrum of pre-PAMC can be seen in FIG. 28. The peaks from the main distribution and all the sub-distributions were taken in consideration in the calculation of average molecular weight of the pre-polymer. These spectra confirmed that a low molecular weight pre-polymer was synthesized with average molecular weight below 2000 Da.

Figure 29:
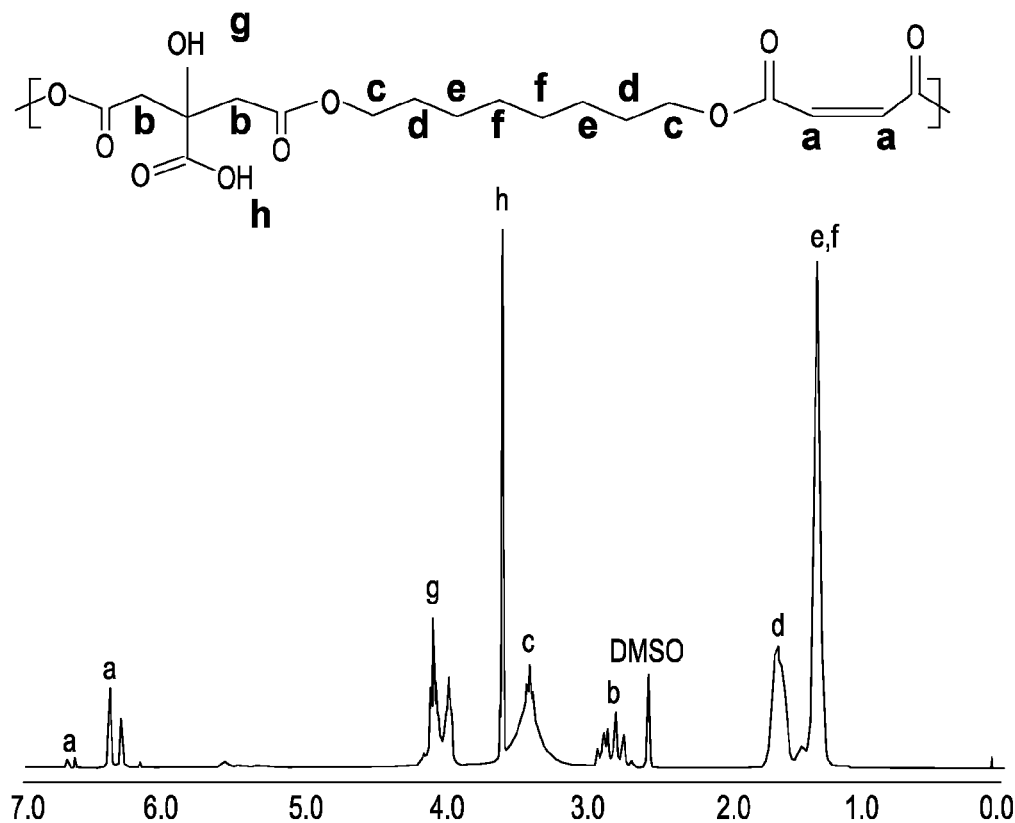
FIG. 29 is an image of a 1H-NMR spectrum of PAMC.

A typical 1H-NMR spectrum of PAMC could be seen in FIG. 29. The peaks (d) located at 1.53 ppm were assigned to in —O—CH$_2$CH$_2$— from 1,8-octanediol. The peaks (b) located at 2.79 ppm were assigned to —CH$_2$— from citric acid. The peaks located between 6 and 7 ppm were assigned to the protons of —CH=CH— incorporated into the polymer chain. The actual compositions of the pre-polymer were calculated based on the integration of the area under the characteristic proton peaks from each monomer: diol (d/4), CA (b/4), and MA (a/2). The actual polymer composition can be well controlled by varying the feeding ratio of the monomers.

Figure 30:
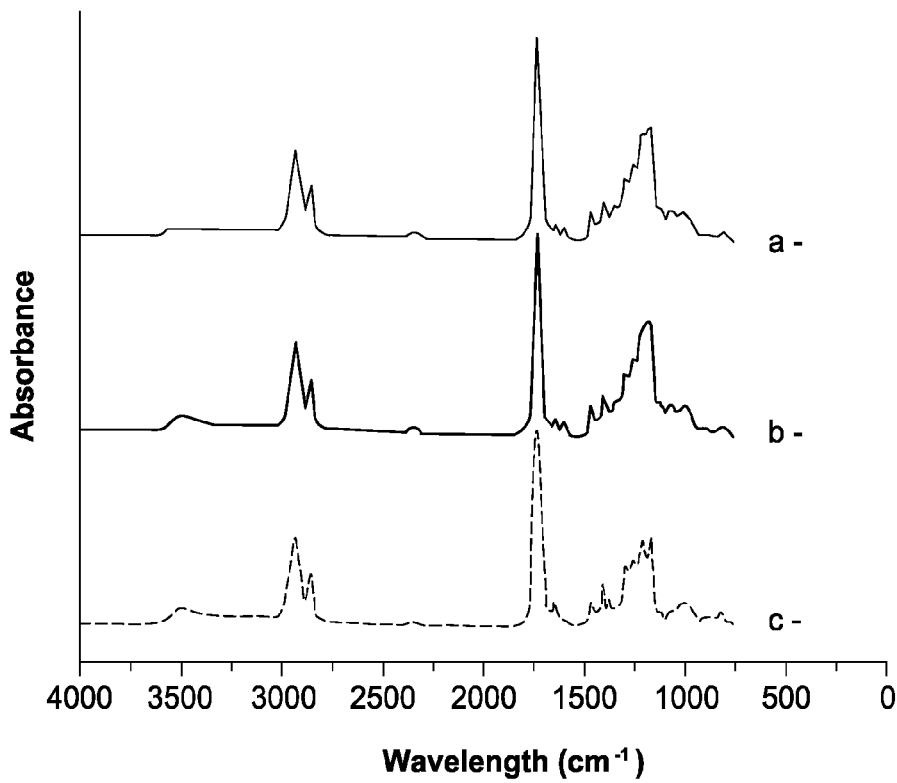
FIG. 30 is a FT-IR absorbance spectra of PAMC polymers with different modes of crosslinking where A) EPPOMaC, B) PPOMaC, and C) pre-POMaC.

FIG. 30 is a FT-IR absorbance spectra of PAMC polymers with different modes of crosslinking where A) EPPOMaC, B) PPOMaC, and C) pre-POMaC. The pronounced peaks within 1690-1750 cm-1 suggest the presence of carbonyl (C=O) groups from the ester bond and pendent carboxylic acid from the citric acid. The shoulder peak of lower wavelength at 1650 cm-1 proves the presence of olefin moiety from maleic acid. Similarly, the peak centered at 2931 cm-1 is evidence of the methylene groups from 1,8-octanediol. Hydrogen bonded hydroxyl functional groups showed absorbance as a broad peak centered at 3570 cm-1.

The glass transition temperature (Tg) of the POMC films was analyzed with the aid of DSC. No crystallization or melting temperatures were observed in the thermograph. FIG. 32 is a DSC thermograph of a. POMC4/6; b. POMC8/2; and c. POMC10/0 films with respective Tg at −9.10° C., −28.38° C., and −36.37° C. As seen in FIG. 32, the Tg of all the pre-polymers were below 0° C., which indicated that all the polymers are amorphous at body temperature. The Tg of the polymer with 40% MA acid POMC4/6 was as high as −9.10° C. Similarly, the polymer containing the 100% MA acid POMC10/0 has the lowest Tg (−36.37° C.). Thus, the results from the figure shows that as the amount of maleic acid was increased, the Tg of the polymer was decreased.

Figure 31:
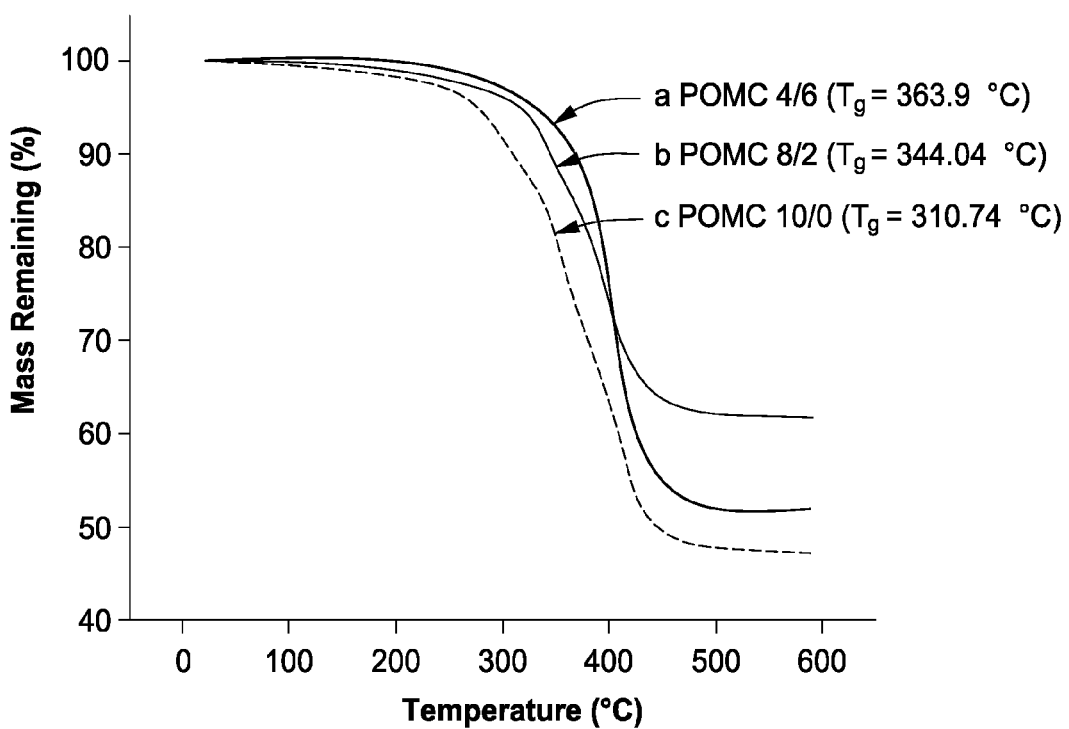
FIG. 31 is a TGA graphs.

FIG. 31 is a TGA graph of a. POMC4/6, b. POMC8/2, and c. POMC10/0 films decompose 10% of its total mass at 363.9° C., 310.74° C. and 344.04° C. respectively. The thermal stability of the POMC was analyzed by TGA. FIG. 31 graphically depicts the decomposition of the polymer as the temperature was increased. The polymer composed of 40% MA acid content (POMC4/6) exhibits 10% decomposition at 363.6° C. On the other hand, the polymer with 100% MA acid content (POMC10/0) shows 10% decomposition at 310.74° C. These results confirm that as the amount of maleic acid is decreased, the polymer gains more thermal stability.

Three different networks using two different modes of crosslinking were utilized to polymerize POMaCs into a thermoset polyester elastomer as summarized in FIG. 1: free radical polymerization, ester bond crosslinking, and a combination of both free radical polymerization followed by ester bond polymerization. The former crosslinking mechanism utilized the vinyl groups present in the pre-polymer, which can be directly polymerized into a hydrogel like material within 10 minutes (FIG. 26B). Whereas the ester bond crosslinking utilized pendant carboxylic and hydroxyl groups through post-polycondensation in the presence of heat (FIG. 26C). Furthermore, both crosslinking mechanisms can be combined in order to produce a higher crosslinked network as needed for a particular application (FIG. 26D).

FT-IR analysis on UV crosslinked films shows a significant reduction of the peak located at 1647 cm-1, which was designated to the vinyl group from maleic anhydride. On the other hand, when the pre-polymer was crosslinked via ester bond formation, a significant reduction in the hydroxyl peak located at 3570 cm-1 was evident.

Three different networks using two different modes of crosslinking were utilized to polymerize POMaCs into a thermoset polyester elastomer as summarized in FIG. 1: free radical polymerization, ester bond crosslinking, and a combination of both free radical polymerization followed by ester bond polymerization. The former crosslinking mechanism utilized the vinyl groups present in the pre-polymer, which can be directly polymerized into a hydrogel like material within 10 minutes. Whereas the ester bond crosslinking utilized pendant carboxylic and hydroxyl groups through post-polycondensation in the presence of heat. Furthermore, both crosslinking mechanisms can be combined in order to produce a higher crosslinked network as needed for a particular application. FT-IR analysis on UV crosslinked films shows a significant reduction of the peak located at 1647 cm-1, which was designated to the vinyl group from maleic anhydride. On the other hand, when the pre-polymer was crosslinked via ester bond formation, a significant reduction in the hydroxyl peak located at 3570 cm$^{-1}$ was evident.

The mechanical properties of POMaC networks are summarized in Table 1. A significant reduction in the initial modulus (0.33 to 0.03 MPa) and Peak Stress (635 to 204 KPa) was exhibited as the molar concentration of the maleic anhydride was reduced from 8 to 4, respectively. However, the elongation at break increased (184 to 534%) when the maleic anhydride ratio was reduced in the same manner. The crosslinking density of photopolymerized POMaC films also decreased (39.78±4.76 to 5.48±1.38 mol/m3) as the molar ratio of the maleic anhydride was reduced from 8 to 4, respectively. The relative molecular mass between crosslinks of the PPOMaC films was shown to be inversely proportional to the density of the crosslinks within the polymer network.

The mechanical properties of POMaC were also tuned through the dual crosslinking mechanism. Table 2 shows the mechanical properties of POMaCs crosslinked using photopolymerization and/or ester bond crosslinking. When photopolymerization was avoided, in the case of EPOMaCs, a Peak Stress of 326.32±85.46 KPa, initial modulus of 0.12±0.02 MPa, and elongation at break of 327±56% was observed when crosslinked under 80° C. without vacuum for a 1 day time period. There was a significant increase in the Peak Stress (781.16±60.04 KPa) and initial modulus (1.36±0.16 MPa), but a decrease in elongation at break (90±6%) when the post-polymerization time was lengthened to 2 days (p<0.05). A similar trend in material properties was reported by the previously published elastomer poly(diol citrate) (POC) [39]. When photocrosslinking and ester bond crosslinking was combined as the mode of polymerization in EPPOMaC, there was a significant increase in the Peak Stress, initial modulus, and reduction in elongation at break for both EPPOMaC 6 (1 Day) (503.64±50.30 KPa, 0.25±0.01 MPa, and 269±22%) and EPPOMaC 6 (2 Days) (994.14±38 KPa, 1.52±0.02 MPa, and 51±3%), respectively. The mass densities of POMaC networks ranged from 1.07 to 1.18 g/cm3 and were dependent upon the composition and crosslinking method used. The crosslinking densities of both EPOMaCs and EPPOMaCs showed an increase when the post-polymerization time was increased from 1 to 2 days (15.79±2.58 to 185.63±22.15 and 34.71±1.77 to 206.92±3.28 mol/m3), respectively.

The sol content of PPOMaC networks varied between 52 and 18% by mass, and was reduced by increasing the maleic anhydride ratio, polymer concentration while crosslinking, and photoinitiator concentration (data not shown). POMaC networks exhibited a solvent uptake, which varied from 146 to 2265% by mass across composition and crosslinking conditions. The percentage of swelling was inversely related to the amount of maleic anhydride in the polymer network.

FIG. 33a is a graph of the degree of swelling and sol content as a function of the ratio of maleic anhydride in pre-POMaC. PPOMaC networks were crosslinked with 10 minutes UV irradiation, 30% polymer concentration, and 1 (wt.-%) PI. FIG. 33b is a graph of the degree of swelling in solvent and PBS as a function of the dual crosslinking mechanism. As seen in FIG. 33a, the swelling percentage decreased from 2143.12±121.90% to 1344.19±84.66% as the ratio of the maleic anhydride increased from 4 to 8. A similar trend was observed when PBS was used as the swelling agent (1011.23±137.23 to 276.55±11.32%). However, all molar ratios of PPOMaCs hydrated less than 33% in water with no significant difference (p>0.05). The swelling characteristics of the polymer networks were also evaluated on POMaCs using different modes of crosslinking. As shown in FIG. 33b, there was a significant reduction in swelling properties with all three swelling agents when the ester bond crosslinking time was increased from 1 to 2 days (p<0.05). For example, EPOMaC 6 (1 Day) exhibited a solvent uptake of 510.57±23.54%, whereas EPOMaC 6 (2 Days) swelled only 298.80±62.39%. The same decrease in swelling was observed for EPPOMaCs, and when PBS was used as the swelling agent for the dual crosslinking mechanism. Interestingly, a significant difference in the solvent uptake between EPOMaC and EPPOMaC was seen (p<0.05), but no significant difference was observed when PBS was used as the swelling agent (p>0.05). In addition to this, there was a significant increase in swelling percentage of the polymer network when incubated in higher pH solution.

Figure 34:
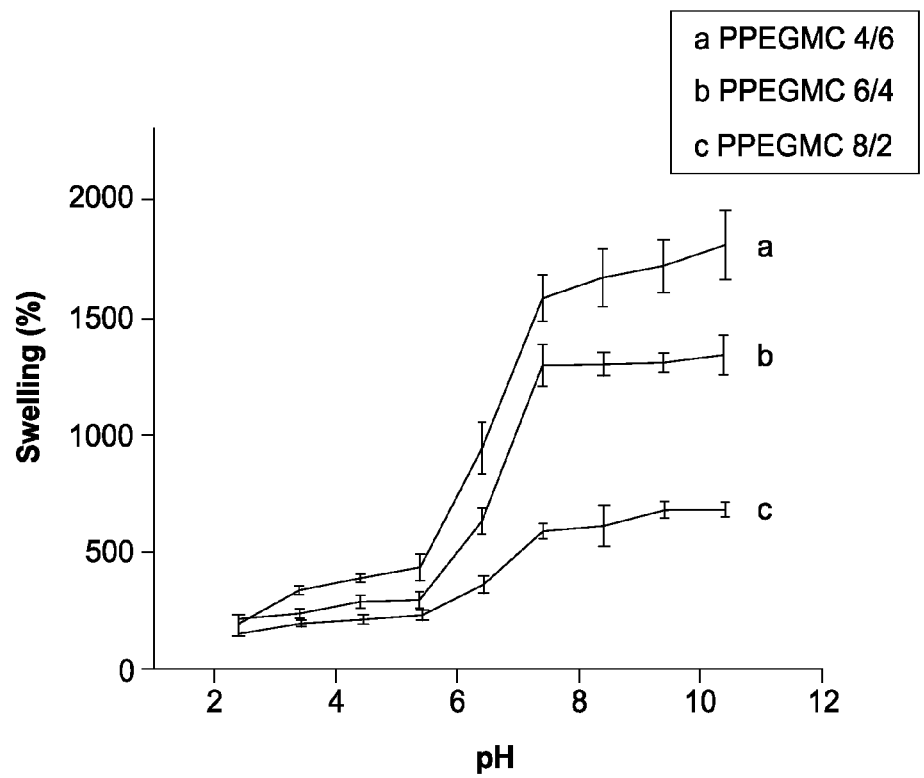
FIG. 34 is a graph of the degree of swelling of PPEGMC network at different pH solution.

FIG. 34 is a graph of the degree of swelling of PPEGMC network at different pH solution. As seen in FIG. 34, the polymer network of PPEGMC shows a drastic increase in the swelling capability between 5.4-7.4 pH for all three different molar ratio polymers. However, the higher the citric acid content in the polymer network, the higher the gradient was within this pH range. In Vitro release of BSA was observed over a 5-day period in both buffer solution (7.4 and 2.4).

Figure 35A:
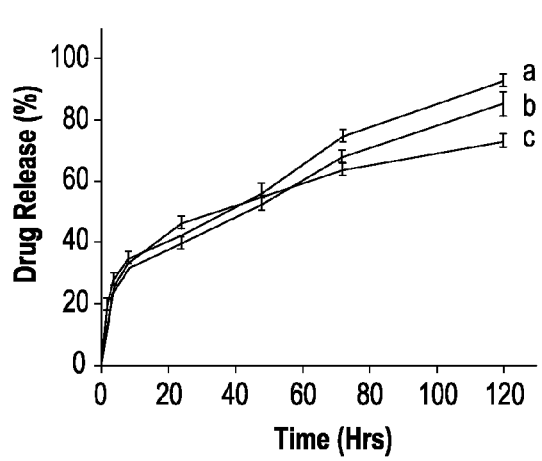
FIG. 35 is a plot of the In vitro BSA release profile of PPEGMC networks at 7.4 pH buffer solution and 2.4 pH buffer solution.
Figure 35B:
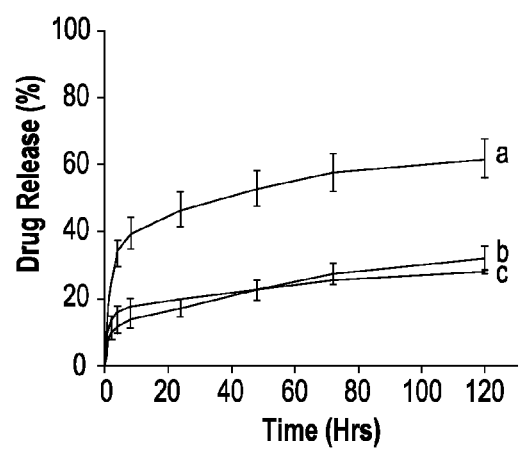

FIG. 35 is a plot of the In vitro BSA release profile of PPEGMC networks at A) 7.4 pH buffer solution and B) 2.4 pH buffer solution. (a: PPEGMC 4/6, b: PPEGMC 6/4, and c: PPEGMC 8/2). As seen in FIG. 35, over 80% of the BSA was release within 5 days from both PPEGMC4/6 and PPEGMC 6/4 in 7.4 buffer solution but the release was limited to 30% over the same period of time. Interestingly, there was no significant difference in release profile for PPEGMC 8/2 in both buffer solutions. All POMaC polymers in this study degraded in the presence of 0.05 M NaOH.

The data for degradation characterization of POMaC networks are presented in FIG. 36. FIG. 36a is a plot of the In vitro degradation in 0.05 M NaOH as a function of the ratio of maleic anhydride in pre-POMaC. PPOMaC networks were crosslinked with 10 minutes UV irradiation, 30% polymer concentration, and 1 (wt.-%) PI. FIG. 36b is a plot of the In vitro degradation in 0.05 M NaOH as a function of the dual crosslinking mechanism. FIG. 36c is a plot of the In vitro degradation of POMaC networks in PBS (pH 7.4; 37° C.). FIG. 36d is a plot of the In vitro degradation of PPEGMC networks in PBS (pH 7.4; 37° C.). The degradation rate of the polymer could be adjusted by varying the molar ratio of the maleic anhydride, and through the dual crosslinking mechanism. PPOMaC polymers with higher maleic anhydride ratios resulted in slower degradation rates. The additional crosslinking through ester bond formation also resulted in longer degradation rates. PPOMaC 4 was shown to have degraded 77.50±1.93%, whereas EPPOMaC 8 (2 Days) degraded only 18.45±4.44% by week 10 in PBS. Furthermore, when PEG200 was used as diol, more than 80% of the polymer network was degraded within a 30-day period of incubation in PBS.

The microchannels and microchannel scaffold shown in FIG. 37 demonstrated the processability of POMaCs. FIG. 37 is a representative SEM images of the PPOMaC microchannel negatives produced from PDMS molds. FIGS. 37a-c show the characterization of the replica-molded PPOMaC substrate. Channels 78.24±0.84 µm wide and columns 210.77±0.82 µm wide are shown from this technique. FIG. 37d shows a cross-section of EPPOMaC salt leached scaffold (salt size 150-250 µm) bonded to EPPOMaC channels. The surface topology of micropatterned PPOMaCs created by a replica molding technique was determined using SEM. FIGS. 36a and 36b show that the fabricated microchannels resulted in column and channel widths of 210.77±0.82 and 78.24±0.84 µm, respectively. The SEM images of PPOMaC microchannel cross-sections show that the depth of each channel was 131.53±1.66 µm. The microchannel scaffold construct produced pore sizes ranging from 106-150 µm in size with some interconnectivity as seen in FIG. 34d. All POMaC scaffolds were soft and could recover from bending deformations.

Figure 38:
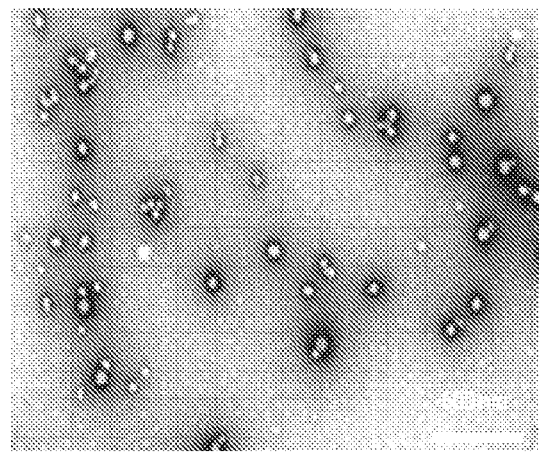
FIG. 38 is a transmission electron microscopy (TEM) picture of POMC nanoparticles.

FIG. 38 is a transmission electron microscopy (TEM) picture of POMC nanoparticles with particles size in the range of 65-100 nm. FIG. 38 shows the POMaC nanoparticles prepared by a solvent displacement method. The average size distribution of the nanoparticles was 65-100 nm.

Figure 39A:
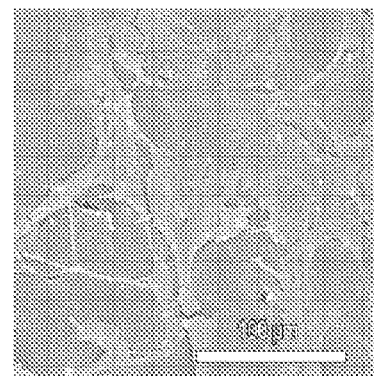
FIG. 39a is a representative SEM image of NIH 3T3 fibroblast spreading after 72 hours of culture on EPPOMaC 8.
Figure 39B:
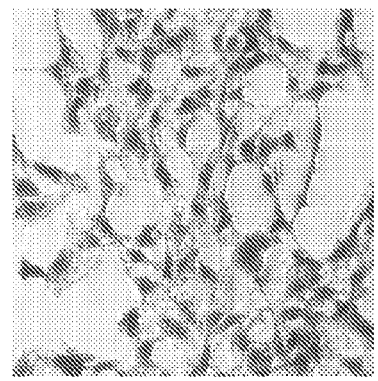
FIG. 39b is a representative photomicrograph of the H&E stained confluent cell monolayer after 72 hours of culture on EPPOMaC.
Figure 39C:
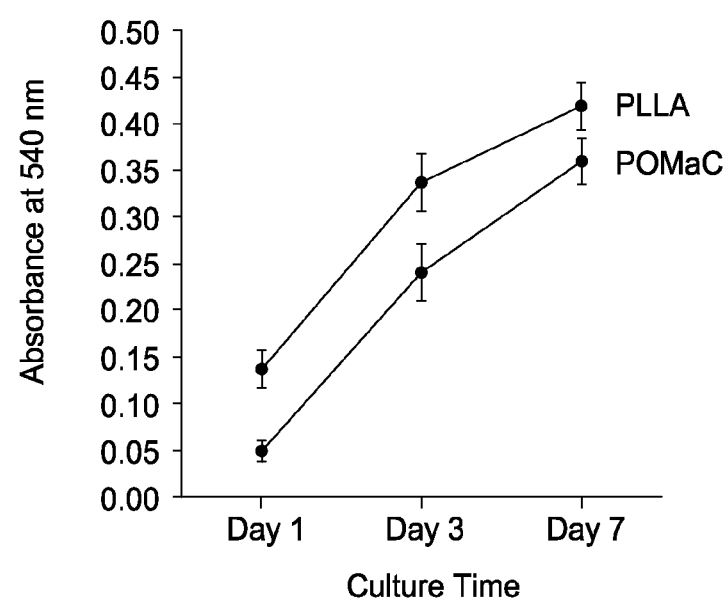
FIG. 39c is a plot of 3T3 fibroblast growth and proliferation on PLLA (relative control) and EPPOMaC 8 scaffolds.

FIG. 39a is a representative SEM image of NIH 3T3 fibroblast spreading after 72 hours of culture on EPPOMaC 8. FIG. 39b is a representative photomicrograph of the H&E stained confluent cell monolayer after 72 hours of culture on EPPOMaC. FIG. 39c is a plot of 3T3 fibroblast growth and proliferation on PLLA (relative control) and EPPOMaC 8 scaffolds. MTT absorption was measured at 570 nm (n=6). Initial cell adhesion of POMaCs was observed 24 hours after cell seeding. As shown in FIGS. 39a and 39b, 3T3 fibroblasts cultured on EPPOMaC films attached and displayed a normal morphology. Cell adhesion and proliferation were quantitatively evaluated on EPPOMaC and PLLA porous scaffolds using MTT Assay. Results indicated cell adhesion and proliferation were higher initially on the PLLA scaffold (day 1 and 3). However, by day 7 EPPOMaC scaffolds showed a higher rate of cell proliferation and were almost comparable to the PLLA cell numbers ($p>0.05$).

Figure 40:
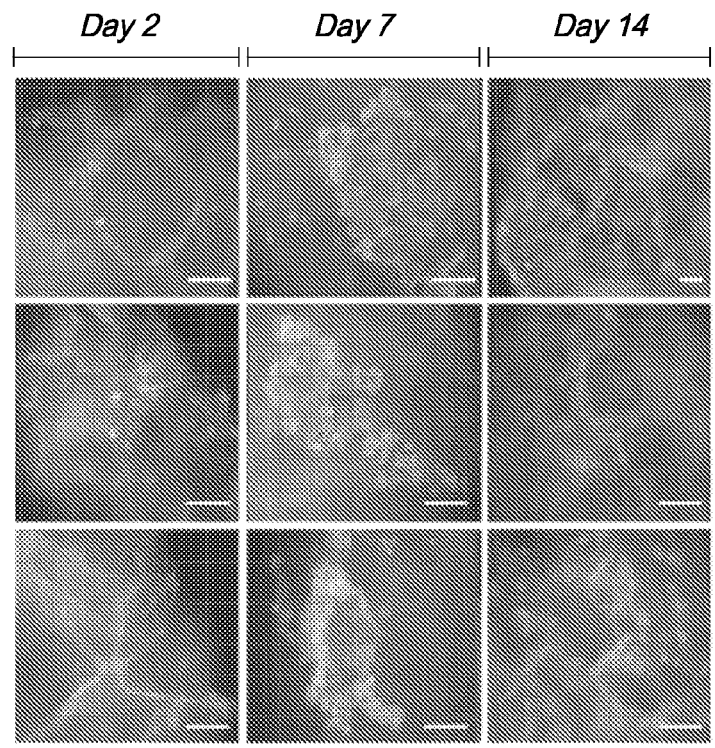
FIG. 40 is an image of cell growth on porous EPPOMaC scaffolds.

FIG. 40 is an image of cell growth on porous EPPOMaC scaffolds. The behavior of CFDA-SE labeled 3T3 fibroblasts seeded onto EPPOMaC scaffolds was monitored for 2 weeks. Initially, a light density of cells located along the scaffold surface could be seen (Day 2). By Day 7, the cell density elevated as evident by dense cell clusters located on the scaffold surface. After 14 Days, the cells were integrated with the material and could be observed growing along the edges of surface pores as well as along the polymer between the pores (scale bar=50 μm). To evaluate the cell growth on porous POMaC scaffolds, FIG. 40 shows the behavior of CFDA-SE labeled 3T3 fibroblasts seeded onto EPPOMaC scaffolds monitored for 2 weeks. Initially, a light density of cells accumulated along the scaffold surface (Day 2). By day 7, the cell proliferation and density increased along the scaffold surface as seen by the dense cell clusters. After 14 days, the cells were integrated with the material and could be observed growing along the edges of surface pores as well as along the polymer between the pores. H&E photomicrographs of 3T3 fibroblasts cultured up to two weeks show that cells were able to colonize POMaC scaffolds. EPPOMaC scaffold cross-sections at 1 and 2 weeks of cell culture are shown in FIG. 41.

Figure 41:
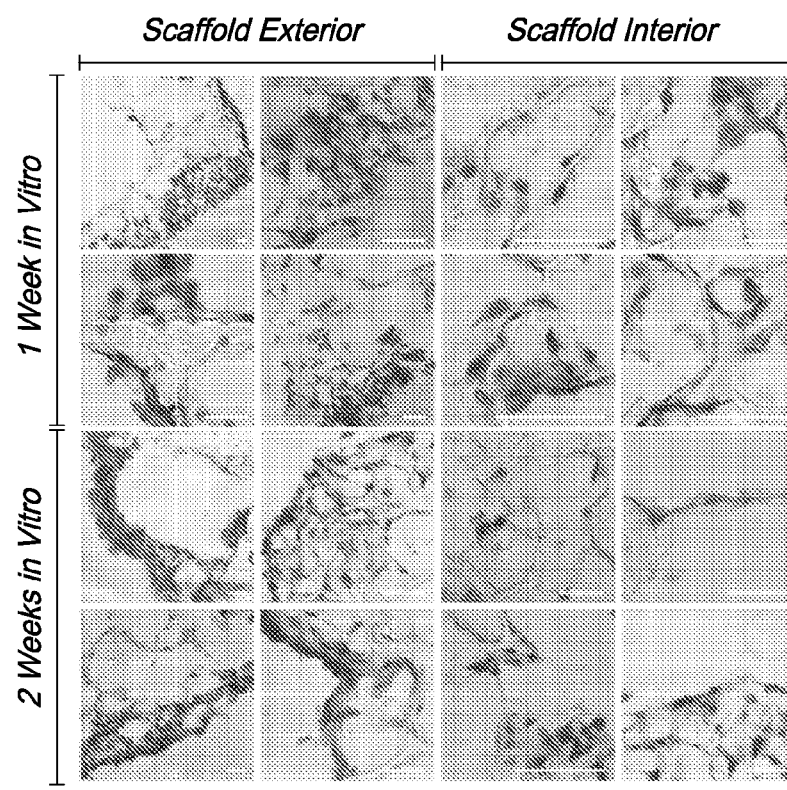
FIG. 41 is a photomicrographs of EPPOMaC scaffold cross-sections at 1 and 2 weeks of cell culture.

FIG. 41 is a photomicrographs of EPPOMaC scaffold cross-sections at 1 and 2 weeks of cell culture. Scaffolds were sectioned at 10 μm and H&E stained to visualize the presence of 3T3 fibroblast cells. At 1 week, cells are found scattered in dense groups on the scaffold surface. By week 2, thick bands of 3T3 fibroblasts are observed growing along the outside of the scaffold along with increased infiltration of cells through the porous scaffold network (scale bar=50 μm). At 1 week, cells are found scattered in dense groups on the scaffold surface. By week 2, thick bands of 3T3 fibroblasts are observed growing along the outside of the scaffold along with increased infiltration of cells through the porous scaffold network.

Figure 42:
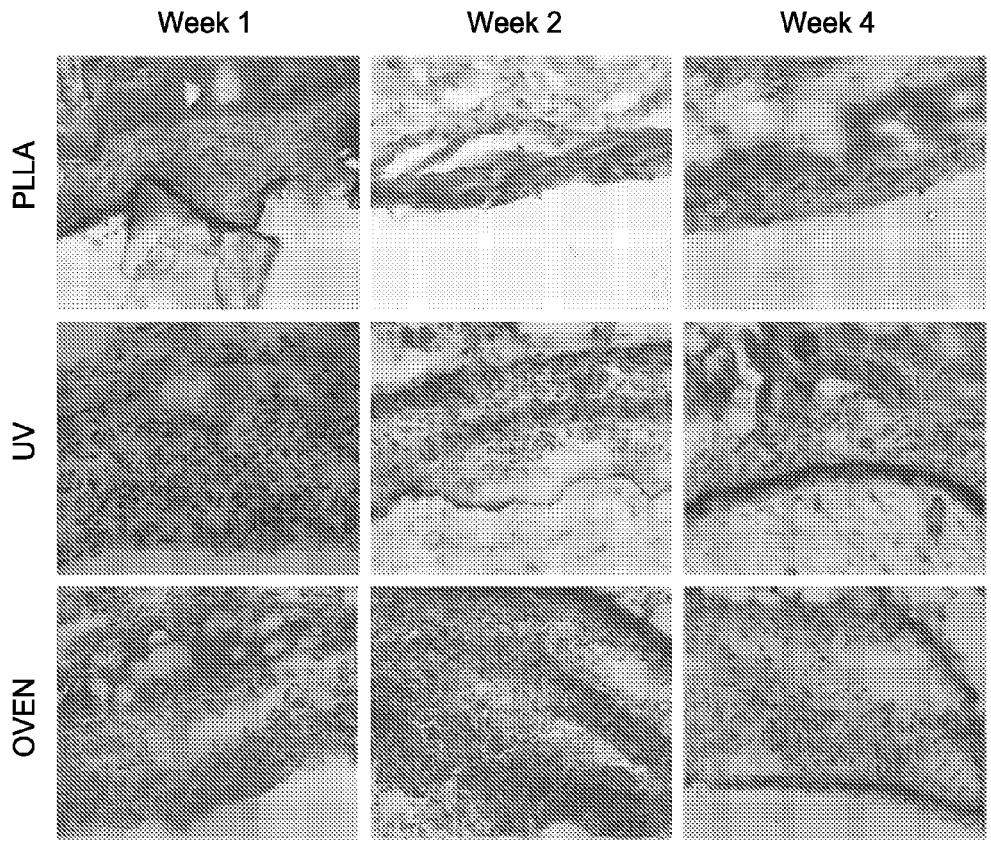
FIG. 42 is a representative images of H&E stained sections demonstrating the foreign body response of PLLA (control), PPOMaC, and EPPOMaC films implanted subcutaneously in Balb/C mice.

FIG. 42 is a representative images of H&E stained sections demonstrating the foreign body response of PLLA (control), PPOMaC, and EPPOMaC films implanted subcutaneously in Balb/C mice. Images are at 10× and scale bar represents 200 μm. "P" represents polymer section. The foreign body response of PPOMaC and EPPOMaC was evaluated via subcutaneous implantation in mice. FIG. 42 shows photomicrographs or H&E stained cross-sections of PPOMaC and EPPOMaC implants and the surrounding tissues. Samples that were implanted for 1 week produced a slight acute inflammatory response, which was expected, and confirmed by the presence of leukocytes and macrophages located in the tissue surrounding the polymer.

Figure 43:
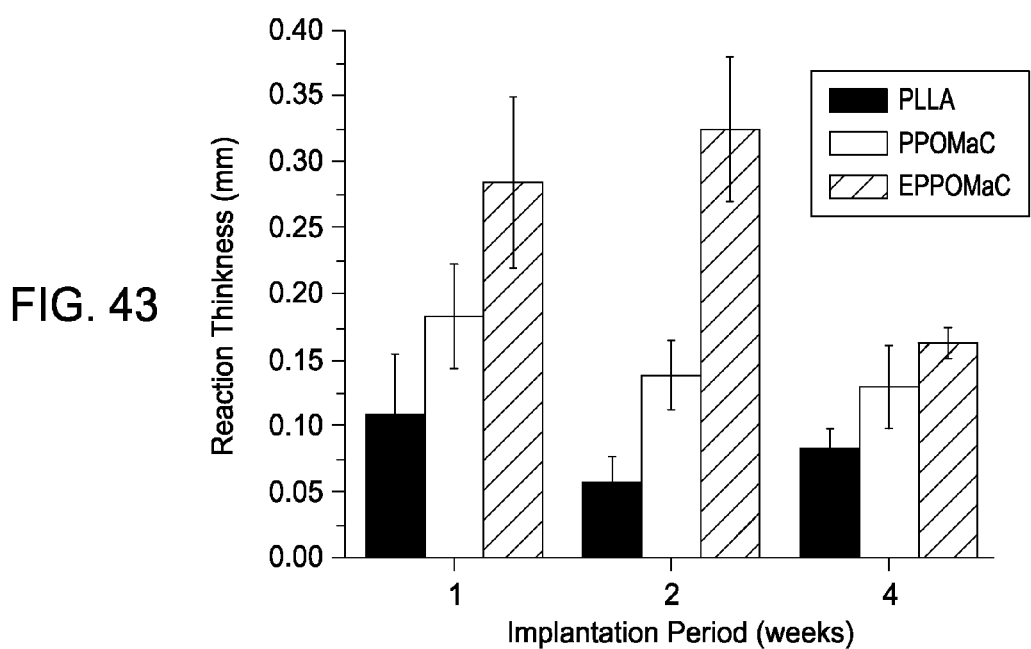
FIG. 43 is a plot of the characterization of the foreign body response to PLLA, PPOMaC, and EPPOMaC implants.

FIG. 43 is a plot of the characterization of the foreign body response to PLLA, PPOMaC, and EPPOMaC implants. The response thickness was found to be larger for EPPOMaC films when compared to PLLA at all time points, but was significantly reduced by 4 weeks. The response thickness of PPOMaC implants decreased throughout the implantation period and was found to be comparable to the PLLA implants. FIG. 43 18 shows a quantitative assessment of the response thickness due to the foreign body response. After 4 weeks of implantation, the response thickness for both PPOMaC and EPPOMaC significantly decreased by 30% (0.184±0.039 to 0.129±0.032) and 43% (0.285±0.065 to 0.163±0.010), respectively.

Figures 44A, 44B, 44C:
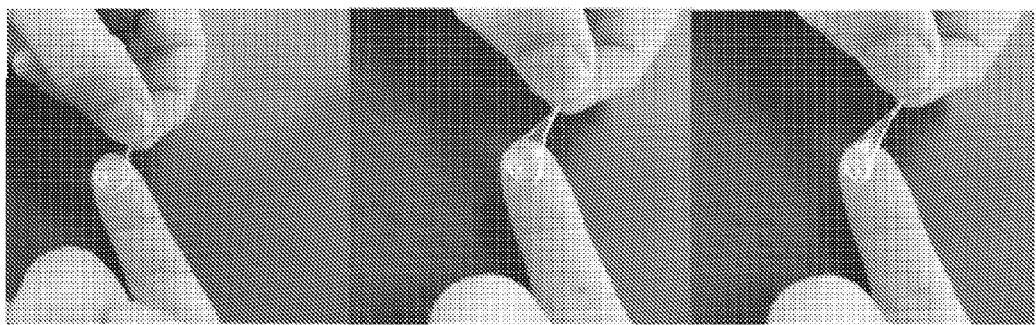
FIGS. 44a and 44b are images of the POMC adheres on skin and in FIG. 44c it can be peeled off quickly without sacrificing the film integrity.
Figures 44D, 44E, 44F:
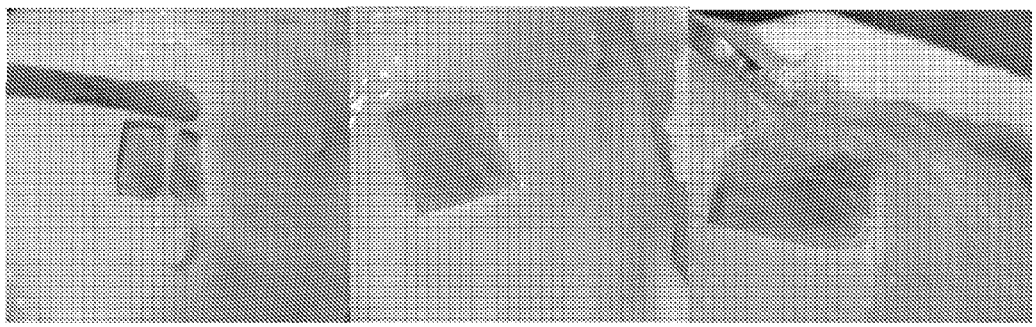
FIG. 44d illustrates viscous pre-POMC.
FIG. 44e smeared on any contour and FIG. 44f illustrates crosslinked into film.

FIGS. 44a and b are images of the POMC adheres on skin very well and that in FIG. 44c it can be peeled off quickly without sacrificing the film integrity. FIG. 44d illustrates viscous pre-POMC. FIG. 44e smeared on any contour and FIG. 44f illustrates crosslinked into film. In situ Crosslinking of POMC can be achieved within 3 minutes under 365 nm Ultra Violet light. The pre-POMCs were in a viscous state (FIG. 44d) and can be used without any solvent system. Thus, it can be easily smeared or injected onto any contour on the skin (FIG. 44e), and quickly polymerized into a film (FIG. 44f). Interestingly, POMC adhered perfectly with the skin and can be easily peeled off without sacrificing its integrity (FIGS. 44a, b, c, and f).

Engineering tissues such as skeletal muscle, spinal cord, and cardiac tissue has initiated an increase in research towards the development of new mechanically compliant materials. As a result, many groups have focused on the synthesis, characterization, and application of materials with a wide range of biodegradable and elastomeric properties. Over the course of the development, many hydrogels have shown to be a better option as scaffolding materials due to their excellent biocompatibility. However, the lack of mechanical strength and inabilities to fine tune the material properties of previous hydrogels limit their use in soft tissue engineering where the structural integrity of the implanted construct is a major concern during the healing process.

The purpose of this manuscript was to synthesize and evaluate a biodegradable elastic crosslinked platform biomaterial with pendent functionalities that can be utilized for further conjugation of biomolecules to enhance a cellular response or to fine tune the mechanical and degradation properties through the dual crosslinking mechanism. The basic components of PAMCs were based upon the previously reported biodegradable elastomer, poly(diol citrates) POC, which has shown excellent biocompatibility both in vitro and in vivo [37]. However, the crosslinking of POC is at the sacrifice of the available functionalities on the pre-POC backbone. In order to preserve all these functionalities, a different method of crosslinking must be adopted. Thus, the incorporation of a vinyl containing acid into the POC pre-polymer backbone provides free radical polymerization as an additional mode of crosslinking for PAMCs. Thus, the rapid crosslinking of the network in a minimally invasive manner is possible, and degradable crosslinks can be formed throughout the polymer network. Due to the mild nature of free radical crosslinking, PAMC can be also be used for various in situ crosslinking applications with various molecules or cell encapsulation. By combining the advantages of free radical polymerization and ester bond crosslinking, a new class of polyesters has been created with the ability to be crosslinked into a three-dimensional network.

The materials synthesized in this study cover a wide range of swelling ratios, mechanical properties, degradation profiles, and functionalities, which are important in controlling the biological response to an implanted material [41]. The free functional groups available after free radical polymerization are useful moieties for the potential modification of the material with proteins or peptides to activate a desired cellular response [39]. Unlike other materials, POMaCs offers an additional advantage in that the extra treatment to create these chemical moieties is not needed [42, 43].

The synthesis of PAMCs, which is conducted through a controlled polycondensation reaction between a multifunctional acid, diol, and vinyl group containing monomer, is simple and cost-effective. The reaction was driven forward by the removal of water through the addition of heat to produce a random copolymer with degradable ester bonds throughout the polymer chain. Maleic anhydride, fumaric acid, itaconic acid, and allylmalonic acid were chosen as a means to incorporate a vinyl group into the pre-PAMC backbone in order to crosslink the polymer network through free radical polymerization. Citric acid was chosen as a multifunctional monomer, which contributed pendant carboxylic acid and hydroxyl groups in the pre-polymer backbone for the future incorporation of specific factors, and the option for further post-polymerization. Whereas, diols containing various numbers of carbon ranging from 2 to 14 and PEG macromers with molecular weights ranging from 200 to 1000 DA can be used. The polycondensation reaction yielded a low molecular weight pre-polymer, which gives PAMC the option to be used without a solvent system for in situ applications.

Pre-polymer FT-IR analysis shows the successful incorporation of the vinyl group and preservation of the carboxylic and hydroxyl functionalities in the PAMC backbone. For example, in POMaC, as the maleic anhydride ratio is decreased; the ratio of the vinyl group peak to the hydroxyl group peak was reduced, which is also supported in the 1H-NMR evaluation. The reduction of the double bond peak located at 1647 cm-1 in the photocrosslinked films verified the consumption of the vinyl group during the free radical polymerization, and the preservation of the broad peak located at 3750 cm-1 confirmed the presence of the unreacted pendant functional groups, which were consumed in the oven crosslinked films.

The chemical compositions determined from 1H-NMR were consistent with the feed ratios to show that the molar ratios can be precisely controlled during synthesis. The two pairs of vinyl hydrogen peaks located between 6 and 7 ppm were contributed by maleic anhydride vinyl groups located in the middle and at the end of the polymer chain [44]. When the area under the peaks was integrated in the spectra, a similar decrease in the ratio of the vinyl proton to the hydroxyl proton was observed as seen in the FT-IR spectra. Thus, the functionalities in the pre-polymer can be easily modulated towards a specific application, which is an important parameter in the outcome of the material properties for PAMCs.

In the case of photocrosslinked films, the swelling capability of the polymer was directly correlated to the amount of vinyl group containing in the polymer. As shown in FIG. 8A, the total uptake ability of the polymer was significantly lowered for all swelling agents as the amount of vinyl group-containing monomer was increased. This is due to the fact that the vinyl functionality was solely responsible for the crosslinking of the network in the free radical polymerization. This was supported by the calculated values of the crosslinking density where the increased amount of maleic anhydride in the polymer resulted in a higher number of crosslinks in the network. In addition, a decrease in the maleic anhydride corresponded to an increase in the citric acid, which contained carbonyl and hydroxyl chemistries to increase the hydrophilicity of the polymer. Thus, swelling for the polymer with a higher molar ratio of maleic anhydride was restricted. Furthermore, PAMC network shows sensitivity towards the change in pH of the swelling agent. For example, when PPEGMC synthesized with various ratio of citric acid over maleic acid, it shows a drastic change in swelling ratio within the range of pH 5.4 to 7.4. The degradation rate for PAMC polymers was controlled through the hydrophilicity and crosslinking degree of the resulting network. Thus, increasing the citric acid content and lowering the crosslinking degree created a polymer with a faster degradation rate. In addition to this, if the hydrophobic segment, contributed by 1,8-octanediol, is replaced by hydrophilic PEG, more than 80% of the polymer network degrade within a month period.

Due to the in situ crosslinking capability, PAMCs can be used to encapsulate temperature sensitive drugs. The BSA release studies confirm the pH sensitivity of PAMC networks. At lower pH ranges, the drug can be maintained inside the polymer network, which can be seen from the restricted release at pH 2.4. However, a higher drug release profile is shown at higher pH ranges from a deprotonation of polymer network. This phenomenon can be very useful in targeted drug delivery applications such as in gastrointestinal diseases where changes in pH are a major factor for different locations throughout the gastrointestinal tract.

When the dual crosslinking mechanism was applied, the swelling of the polymer in both swelling agents was directly proportional to the calculated crosslinking density of the network (FIG. 33b). Interestingly, no trend in swelling across the different molar ratios of the monomers was observed when the polymer was soaked in water. This difference in swelling in PBS and water was due to the fact that the available pendant groups in the network were not able to deprotonate in water (pH 7.0) unlike what was observed in the PBS (pH 7.4) [45]. This effect in combination with the hydrophobic nature of 1,8-octanediol prevented excessive water uptake into the network, which may help to preserve the polymer's mechanical properties in a hydrated state. These results indicate that the swelling degree of the PAMCs can be fine-tuned to meet the needs a particular application.

Engineering soft and elastic tissues such as lung tissue (5-30 KPa), skeletal muscle (100 KPa), and cardiac muscle (20-150 KPa) have sparked the development of soft biodegradable elastomers [46]. The mechanical properties of the newly developed PAMCs can be fine-tuned to match these soft tissues by adjusting the degree of crosslinking through the monomer molar ratio and the dual crosslinking mechanism. For example, in case of POMaC, decreasing the maleic anhydride amount in the polymer backbone resulted in a very soft and elastic polymer when crosslinked only through the free radical polymerization. As seen in other studies, an increase in post-polymerization time created an increase in crosslinking density, which translated into higher tensile strength and a higher initial modulus [34, 37, 40]. However, in order to obtain a stronger polymer network through the dual crosslinking mechanism, the ratio of the maleic anhydride to the citric acid should be decreased to provide the maximum number of free pendant groups to participate in ester bond crosslinking. Thus, there is a fine balance between the amount of maleic anhydride and citric acid in order to achieve the proper material properties for the target application.

The preliminary in vitro and in vivo biocompatibility evaluations of POMaC confirm their potential as a suitable biomaterial. In vitro results of cell adhesion and proliferation demonstrate good cell-material interaction. However, quantitative analysis from MTT assay showed that cells did not initially proliferate as well as PLLA. The in vitro cell attachment and proliferation in this study were performed without pre-treating the polymer with adhesion proteins. Fortunately, POMaCs offer room for improvement through the available pendant groups available for the conjugation of proteins or other cell specific factors.

A mild acute inflammatory response was observed after 1 week of implantation, which was expected and consistent with the introduction of a foreign material into the body. The surrounding tissues did not show any signs of necrosis for all POMaC implants. In addition, the reduced response thickness and limited macrophage recruitment in response to the subcutaneous implants suggest that the in vivo response was stabilized. Thus, the development of a reduced tissue response and the time-dependent decrease in the initial mild inflammatory response suggest that POMaC and its degradation products are non-toxic.

The combination of elastomers with Micro-Electro-Mechanical Systems (MEMS) technologies has sparked a new area of research with increasing practical applications [47]. POMaC has also demonstrated versatile processability as shown by the microchannel scaffold (FIG. 12). Using a soft lithographic approach, replica-molded POMaC constructs were created for future research in contact guidance applications. Through contact guidance, the structure and function of cells seeded onto surfaces modified with micron and submicron topographies can be controlled [48]. POMaC constructs of various channel dimensions could possibly be used to control the alignment of cells seeded on the construct [49]. Future efforts will be focused on introducing pores into the microchannel layer and using this technology in combination with cell sheet tissue engineering to fabricate three-dimensional tissues with organized cellular alignment.

The short photopolymerization time makes the PAMC hydrogels more practical for in situ applications than other current biomaterials. As we have mentioned earlier, PAMCs can be made into water-soluble polymers when PEG is used as the diol or part of the diols for polymer synthesis. In addition, pre-POMC itself was also a gel-like liquid, which allowed for in situ polymerization under UV crosslinking. We have preliminary demonstrated the potentials of using PAMC as a rapidly forming and fast peeling wound dressing materials. There are potential two ways to use PAMC as wound dressing materials. PAMC can be prefabricated into films, which adhere to the skin and can be peeled off quickly without destroying the film integrity (FIG. 44a-c). In addition, the gel-like pre-PAMC can potentially act as a liquid bandage/dressing, which may easily be smeared or dropped onto any contour of the skin (FIG. 44d-f) and quickly photopolymerized to form a film or gel in situ with potential drugs encapsulated if needed. Since PAMC has tunable degradability, it can potentially be absorbed on the skin when its mission is completed or can be disposed of without polluting the environment. Furthermore the transparent nature of PAMC could potentially allow monitoring the wound healing process visually if needed.

This is, for the first time, a family of biodegradable crosslinked polyester networks featured with dual crosslinking mechanism for biomedical applications has been introduced. The biomedical applications for these biomaterials can be soft tissue engineering, drug delivery, and wound dressing etc. The synthesis of PAMCs is simple, safe, and cost-effective. PAMCs hold great potential for soft tissue engineering due to their controlled, tunable mechanical properties and degradability. In addition to the tunable properties, the available hydroxyl and carboxylic groups can be used for bioconjugation or other surface modifications, and display excellent biocompatibility. In combination with microelectromechanical systems (MEMS) technology, a micropatterned 3-dimensional (3-D) PAMC scaffold sheets have been fabricated. This is the first time to construct micropatterning structures on 3-D scaffolds. Stacking the micropatterned scaffold sheets may construct a 3-D tissue constructs within which the micro-channels can be used as a physical guide for vascularization. Through this layer-by-layer scaffold sheet engineering technique, these micropatterned scaffold sheets may be fashioned into small diameter vascular grafts or any other tissue implants with the required strength and elasticity to be implanted in the body. The introduction of PAMCs should expand the repertoire of the available biodegradable polymers that meet the strict requirements of soft tissue engineering and other biomedical applications.

The present invention also includes a method of making a dual crosslinked biodegradable tissue composition by forming a tissue engineering scaffold; adding a pre-polymer mixture to the tissue engineering scaffold, wherein the a pre-polymer mixture comprises a multifunctional monomer; a diol; and an unsaturated diacid; photocrosslinking at least a portion of the pre-polymer mixture to form a partially photocrosslinked network; polymerizing the partially photocrosslinked network to form a dual crosslinked polymer network to form a dual crosslinked biodegradable tissue. The tissue engineering scaffold forms a blood vessel, a cardiac tissue, heart valves, a ligament, a tendon, a lung, a bladder, skin, a trachea, a urethral, micro-fibers or nano-fibers.

The composition can be polymerized by radical polymerization including, but not limited to, UV irradiation, gamma irradiation, and photon irradiation using photoinitiators such as Irgacure 2959 (Ciba), Irgacure 784 (Ciba), Esacure DP 250 (Lamberti), phosphine oxide methylpropriophenone (Sigma), dimethoxyphenylacetophenone (Sigma), AAPH (Sigma), and any other photoinitiators that work for PAMC photopolymerization. Similarly, PAMCs can be crosslinked using redox initiated systems such as benzoyl peroxide, potassium persulfate, ammonium persulfate and Peroxydisulfate-Co(II) in combination with ascorbic acid, N,N,N,N-Tetramethyl-Ethylenediamine. In addition, various terminal vinyl group containing molecules such as acrylic acid, acrylamide, 2-propene-1-thiol, allyl alcohol, and allylamine can be used as crosslinker to crosslink PAMC to increase functionality of the network. Furthermore various drugs can be covalently or non-covalently linked with terminal vinyl containing group that can be further linked into the PAMC network as a control drug releasing system. The PAMCs can also be thermally crosslinked through the polycondensation of side groups (carboxylic acid and hydroxyl) under temperature of range 37° C. to 120° C. with or without vaccum. The PAMCs can be polymerized through the dual crosslinking mechanism, e.g., PAMCs can be Photocrosslinked first and then can be further crosslinked via ester-bond crosslinks by polycondensation of —COOH and —OH on the polymer backbone under temperature of range 37° C. to 120° C. with or without vacuum. The PAMCs can be used to fabricate scaffolds for tissue engineering via any method such as salt-leaching, freeze-drying, 3-D printing, etc. The available functional groups of PAMC include hydroxyl and carboxylic groups, which can be further used for surface modification with collagen, laminin, RGD, and various peptide chains to support cell adhesion, proliferation, and differentiation. The water-soluble PAMCs can act as in-situ crosslinkable hydrogels or as injectable cell encapsulation vehicles, which have potential uses in tissue regeneration. PAMCs can be used as a sealant for wound dressing applications where rapid crosslinking is required. PAMCs can be used as a "smart" biomaterial in pH sensitive applications to load and release desired drug amounts in the desired location. PAMCs can be used for constructing composites by mixing various ceramics micro- or nano-particles such as hydroxyapatite and calcium phosphate particles prior to crosslinking. PAMC composite can be used as bone or dental filler where rapid crosslinking is required. PAMC composite can be used for bone tissue engineering scaffold. PAMC can be combined with Bio-MEMS technology to create micropatterned 3-D scaffolds. This is the first time to construct the micropatterned channels or structures directly on 3-D porous scaffolds. Stacking the micropatterned 3-D scaffold sheets can make a thick tissue scaffold with channels inside the 3-D scaffold. The channels inside the 3-D scaffold can be used to guide the vascularization throughout the 3-D scaffold, a key for the success of tissue engineering. The micropatterned scaffold sheets can be used to fabricate various complex tissues including but not limited to blood vessels, cardiac tissues, heart valves, ligaments, bladders, tendons, lungs etc.

Biomaterials are the bases for many biomedical applications. The PAMC polymers are a family of versatile biomaterials that can mimic the mechanical properties of soft tissues to be repaired, and offer easy functionalization via the rich of available —COOH and —OH groups for bio-mimicking or targeting. Thus, the potential applications of this novel family of polymers can be soft tissue engineering, targeting drug delivery, and wound dressing. For tissue engineering, PAMCs cannot only be used to fabricate solid pre-formed scaffolds but also be used as injectable form of scaffolds for cell encapsulation and in situ tissue engineering. PAMCs can be ideal wound dressing materials with enhanced patient compliance compared to the current wound dressing products. PAMC can also form composite materials for a wide range of applications. Any company who needs biodegradable polymers can be a potential target for this invention. For example, potential targets include J&J, Zimmer, Gore, Medtronic, 3M Medical Division, Abbott, Baxter, and many other biotechnological and pharmaceutical companies could benefit from this novel family of polymers.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification, but only by the claims.

REFERENCES

1. Seongbong Jo, H. S., Albert K. Shung, John P. Fisher, and A. G. Mikos*, Synthesis and Characterization of Oligo (poly(ethylene glycol)fumarate) Macromer. Macromolecules, 2001. 34: p. 2839-2844.
2. Christiaan L. E. Nijst, J. P. B., Jeffrey M. Karp, Lino Ferreira, and C. J. B. Andreas Zumbuehl, and Robert Langer, Synthesis and Characterization of Photocurable Elastomers from Poly(glycerol-co-sebacate). Biomacromolecules, 2007. 8: p. 3067-3073.
3. Elisseeff, J., et al., Transdermal photopolymerization of poly(ethylene oxide)-based injectable hydrogels for tissue-engineered cartilage. Plast Reconstr Surg, 1999. 104 (4): p. 1014-22.
4. Venkata M. Nivasu, T. T. R., Shekharam Tammishetti, In situ polymerizable polyethyleneglycol containing polyesterpolyol acrylates for tissue sealant applications. Biomaterials, 2004. 25: p. 3283-3291.
5. Cruise, G. M., et al., In vitro and in vivo performance of porcine islets encapsulated in interfacially photopolymerized poly(ethylene glycol)diacrylate membranes. Cell Transplant, 1999. 8(3): p. 293-306.
6. Sawhney, A. S., et al., Optimization of photopolymerized bioerodible hydrogel properties for adhesion prevention. J Biomed Mater Res, 1994. 28(7): p. 831-8.
7. Elisseeff, J., et al., Photoencapsulation of chondrocytes in poly(ethylene oxide)-based semi-interpenetrating networks. J Biomed Mater Res, 2000. 51(2): p. 164-71.
8. Kretlow, J. D., L. Klouda, and A. G. Mikos, Injectable matrices and scaffolds for drug delivery in tissue engineering. Adv Drug Deliv Rev, 2007. 59(4-5): p. 263-73.
9. Ki Woo Chun, J. B. L., Sun Hwa Kim, Tae Gwan Park, Controlled release of plasmid DNA from photo-crosslinked pluronic hydrogels. Biomaterials, 2005. 26: p. 3319-3326.
10. Sierra D, S. R., editors, Surgical adhesives and sealants. Lancaster-Basel: Technomic Publishing Co, 1996.
11. STEPHANIE J. BRYANT, T. T. C., DAVID A. LEE, DAN L. BADER, and KRISTI S. ANSETH, Crosslinking Density Influences Chondrocyte Metabolism in Dynamically Loaded Photocrosslinked Poly(ethylene glycol) Hydrogels. Annals of Biomedical Engineering, 2004. 32(3): p. 407-417.
12. J. M. Goddard, J. H. H., Polymer surface modification for the attachment of bioactive compounds. Progress in polymer science, 2007. 32: p. 698-725.
13. A. D. Cook, J. S. H., N. N. Gao, I. M. Johnson, U. B. Pajvani, S. M. and R. L. Cannizzaro, Characterization and development of RGDpeptide-modified poly(lactic acid-co-lysine) as an interactive, resorbable biomaterial. J. Biomed. Mater. Res, 1997. 35: p. 513-523.
14. Nitschke, M. S., G. Janke, A. Simon, F. Pleul, D. Werner, C., Low pressure plasma treatment of poly(3-hydroxybutyrate): toward tailored polymer surfaces for tissue engineering scaffolds. J Biomed Mater Res, 2002. 59(4): p. 632-8.
15. Liu, X., Y. Won, and P. X. Ma, Surface modification of interconnected porous scaffolds. J Biomed Mater Res A, 2005. 74(1): p. 84-91.
16. Breunig, M., S. Bauer, and A. Goepferich, Polymers and nanoparticles: Intelligent tools for intracellular targeting? Eur J Pharm Biopharm, 2008. 68(1): p. 112-28.
17. Eisenbud, D., et al., Skin substitutes and wound healing: Current status and challenges. Wounds—a Compendium of Clinical Research and Practice, 2004. 16(1): p. 2-17.
18. Atiyeh, B. S., S. N. Hayek, and S. W. Gunn, New technologies for burn wound closure and healing—review of the literature. Burns, 2005. 31(8): p. 944-56.
19. Boyce, S. T., Design principles for composition and performance of cultured skin substitutes. Burns, 2001. 27(5): p. 523-33.
20. Tao Ding, Q. L., Rui Shi, Ming Tian, and L. Z. Jian Yang, Synthesis, characterization and in vitro degradation study of a novel and rapidly degradable elastomer. Degradation and Stability, 2006. 96: p. 733-739.
21. Jian Yang, A. R. W., Samuel J. Pickerill, Gretchen Hageman, Guillermo A. Ameer, Synthesis and evaluation of poly(diol citrate) biodegradable elastomers. Biomaterials, 2006. 27: p. 1889-1898.
22. Jian Yang, D. M., Josephine B. Allen, Antonio R. Webb, Melina R. Kibbe, Oliver Aalami, and T. J. C. Muneera Kapadia, and Guillermo A. Ameer, Modulating Expanded Polytetrafluoroethylene Vascular Graft Host Response via 23. Kim, S. H., C. Y. Won, and C. C. Chu, Synthesis and characterization of dextran-maleic acid based hydrogel. J Biomed Mater Res, 1999. 46(2): p. 160-70.
24. Peng Ye, J. J., Zhi-Kang Xu, Adsorption and activity of lipase from *Candida regosa* on the chitosan-modified poly (acrylonitrile-co-maleic acid) membrane surface. colloids and surfaces, 2006. 60: p. 62-67.
25. Bajpai, Swelling-deswelling behavior of poly(acrylamide-co-maleic acid) hydrogels. Journal of Applied Polymer Science, 2001. 80(14): p. 2782-2789.
26. Murat S, en, A. Y., Olgun Guven, Determination of average molecular weight between cross-links (Mc) from swelling behaviours of diprotic acid-containing hydrogels. Polymers, 1999. 40: p. 2969-2974.
27. Hande Kesim, Z. M. O. R., Sevil Dinçer and Erhan Pikin Functional bioengineering copolymers. II. Synthesis and characterization of amphiphilic poly(N-isopropyl acrylamide-co-maleic anhydride) and its macrobranched derivatives Polymers, 2003. 44(10): p. 2897-2909.
28. Pfister, P. M., et al., Surface-textured PEG-based hydrogels with adjustable elasticity: Synthesis and characterization. Biomaterials, 2007. 28(4): p. 567-75.
29. Chatterji, N. C. P. a. P. R., Structural Characteristics and Swelling Behavior of Poly(ethylene glycol) Diacrylate Hydrogels. Macromolecules, 1996. 29: p. 1976-1979.
30. Martens, P., and K. S. Anseth, Characterization of hydrogels formed from acrylate modified poly(vinyl alcohol) macromers. Polymer, 2000. 41: p. 7715-7722.
31. Metters, A. T., K. S. Anseth, and C. N. Bowman, Fundamental studies of a novel, biodegradable peg-b-pla hydrogel. Polymer, 2000. 41: p. 3993-4004.
32. Timmer, M. D., C. G. Ambrose, and A. G. Mikos, Evaluation of thermal- and photo-crosslinked biodegradable poly(propylene fumarate)-based networks. J Biomed Mater Res A, 2003. 66(4): p. 811-8.
33. Timmer, M. D., C. G. Ambrose, and A. G. Mikos, In vitro degradation of polymeric networks of poly(propylene fumarate) and the crosslinking macromer poly(propylene fumarate)-diacrylate. Biomaterials, 2003. 24(4): p. 571-7.
34. Wang, Y., et al., A tough biodegradable elastomer. Nat Biotechnol, 2002. 20(6): p. 602-6.
35. Fisher, J. P., et al., Photoinitiated cross-linking of the biodegradable polyester poly(propylene fumarate). Part II. In vitro degradation. Biomacromolecules, 2003. 4(5): p. 1335-42.
36. Tanodekaew, S., S. Channasanon, and P. Uppanan, Xylan/polyvinyl alcohol blend and its performance as hydrogel. J. Appl. Polym. Sci., 2006. 100(3): p. 1914-1918.
37. Yang, J., A. R. Webb, and G. A. Ameer, Novel Citric Acid-Based Biodegradable Elastomers for Tissue Engineering. Advanced Materials, 2004. 16(6): p. 511-516.
38. Zhu, W. and J. Ding, Synthesis and characterization of a redox-initiated, injectable, biodegradable hydrogel. J Appl Polym Sci, 2005. 99(5): p. 2375-2383.
39. Yang, J., et al., Synthesis and evaluation of poly(diol citrate) biodegradable elastomers. Biomaterials, 2006. 27(9): p. 1889-98.
40. Dey, J., et al., Development of biodegradable crosslinked urethane-doped polyester elastomers. Biomaterials, 2008. 29(35): p. 4637-49.
41. Ratner, B. D. and S. J. Bryant, Biomaterials: where we have been and where we are going. Annu Rev Biomed Eng, 2004. 6: p. 41-75.
42. Guan, J., et al., Biodegradable poly(ether ester urethane) urea elastomers based on poly(ether ester) triblock copolymers and putrescine: synthesis, characterization and cytocompatibility. Biomaterials, 2004. 25(1): p. 85-96.
43. Yang, J., et al., Plasma-treated, collagen-anchored polylactone: Its cell affinity evaluation under shear or shear-free conditions. J Biomed Mater Res A, 2003. 67(4): p. 1139-47.
44. Shi, P.-J., Y.-G. Li, and C.-Y. Pan, Block and star block copolymers by mechanism transformation X. Synthesis of poly(ethylene oxide) methyl ether/polystyrene/poly(image-lactide) ABC miktoarm star copolymers by combination of RAFT and ROP. European Polymer Journal, 2004. 40(7): p. 1283-1290.
45. He, C., S. W. Kim, and D. S. Lee, In situ gelling stimuli-sensitive block copolymer hydrogels for drug delivery. J Control Release, 2008. 127(3): p. 189-207.
46. Levental, I., P. C. Georges, and P. A. Janmey, Soft biological materials and their impact on cell function. Soft Matter, 2007. 3: p. 299-306.
47. Bashir, R., BioMEMS: state-of-the-art in detection, opportunities and prospects. Adv Drug Deliv Rev, 2004. 56(11): p. 1565-86.
48. Bettinger, C. J., et al., Microfabrication of poly(glycerol-sebacate) for contact guidance applications. Biomaterials, 2006. 27(12): p. 2558-65.
49. Glawe, J. D., et al., Influence of channel width on alignment of smooth muscle cells by high-aspect-ratio microfabricated elastomeric cell culture scaffolds. J Biomed Mater Res A, 2005. 75(1): p. 106-14.

The invention claimed is:

1. A crosslinked polymer composition comprising:
a condensation reaction product of monomers consisting of citric acid; at least one diol; and at least one unsaturated di-acid, wherein the monomers are at least partially polymerized to form a network and crosslinked into a crosslinked polymer network.

2. The composition of claim 1, wherein the diol comprises poly(ethylene glycol) and the unsaturated di-acid comprises maleic anhydride.

3. The composition of claim 1, wherein the diol comprises saturated aliphatic diols, macrodiols, or both.

4. The composition of claim 1, wherein the unsaturated di-acid comprises maleic acid, maleic anhydride, fumaric acid, or fumaryl chloride.

5. The composition of claim 1, wherein the citric acid is end capped with a vinyl group from acryloyl chloride.

6. The composition of claim 1, wherein the network comprises a polycondensation or free radical polymerization network.

7. The composition of claim 1, further comprising one or more crosslinkers.

8. The composition of claim 1, wherein the crosslinked polymer network forms a soft tissue selected from a blood vessel, a cardiac tissue, heart valves, a ligament, a tendon, a lung, a bladder, skin, a trachea, a urethra, micro-fibers or nano-fibers.

9. The polymer composition of claim 1 further comprising a drug covalently linked into the network through a terminal vinyl containing group.

10. The polymer composition of claim 1, wherein available hydroxyl or carboxylic acid groups of the network are modified with an oligonucleotide, a peptide chain, or a protein.

11. The polymer composition of claim 1, wherein available hydroxyl or carboxylic acid groups of the network are modified with collagen, laminin, or RGD.

12. The polymer composition of claim 1 further comprising an encapsulated cell.

13. A 3-D porous scaffold formed from the polymer composition of claim 1.

14. The scaffold of claim 13, wherein the scaffold comprises micropatterned channels inside the scaffold.

15. A composite comprising:
   a polymer composition comprising the condensation reaction product of monomers consisting of citric acid, at least one diol, and at least one unsaturated di-acid, wherein the monomers are at least partially polymerized to form a network; and
   an inorganic material mixed with the network.

16. The composite of claim 15, wherein the inorganic material comprises ceramic micro-particles or nano-particles.

17. The composite of claim 15, wherein the inorganic material comprises hydroxyapatite.

18. The composite of claim 15, wherein the inorganic material comprises calcium phosphate.

19. The composite of claim 15, wherein the diol comprises poly(ethylene glycol) and the unsaturated diacid comprises maleic anhydride.

20. The composite of claim 15, wherein the network is crosslinked.

* * * * *